United States Patent
Kohn et al.

(10) Patent No.: US 10,303,131 B2
(45) Date of Patent: May 28, 2019

(54) USING SENSOR DATA TO ASSIST IN CONTROLLING A TARGET SYSTEM BY MODELING THE FUNCTIONALITY OF THE TARGET SYSTEM

(71) Applicant: Veritone Alpha, Inc., Costa Mesa, CA (US)

(72) Inventors: Wolf Kohn, Seattle, WA (US); Michael Luis Sandoval, Bellevue, WA (US)

(73) Assignee: Veritone Alpha, Inc., Costa Mesa, CA (US)

( * ) Notice: Subject to any disclaimer, the term of this patent is extended or adjusted under 35 U.S.C. 154(b) by 130 days.

(21) Appl. No.: 15/410,647

(22) Filed: Jan. 19, 2017

(65) Prior Publication Data

US 2017/0329289 A1 Nov. 16, 2017

Related U.S. Application Data

(60) Provisional application No. 62/336,418, filed on May 13, 2016.

(51) Int. Cl.
| | |
|---|---|
| G05B 13/04 | (2006.01) |
| G05B 13/02 | (2006.01) |
| F24F 11/30 | (2018.01) |
| F24F 11/62 | (2018.01) |
| G05B 17/02 | (2006.01) |

(Continued)

(52) U.S. Cl.
CPC ............ *G05B 13/042* (2013.01); *F24F 11/30* (2018.01); *F24F 11/62* (2018.01); *G05B 13/0265* (2013.01); *G05B 17/02* (2013.01); *F24F 11/46* (2018.01); *F24F 11/63* (2018.01)

(58) Field of Classification Search
CPC ............ G05B 13/042; G05B 17/02; G05B 13/0265; F24F 11/62; F24F 11/30; F24F 11/46; F24F 11/63; H04W 4/00
See application file for complete search history.

(56) References Cited

U.S. PATENT DOCUMENTS

| | | |
|---|---|---|
| 5,727,128 A | 3/1998 | Morrison |
| 5,755,378 A | 5/1998 | Dage et al. |
| 5,963,447 A | 10/1999 | Kohn et al. |

(Continued)

OTHER PUBLICATIONS

Ge et al., "Hybrid Systems: Chattering Approximation to Relaxed Controls," *Lecture Notes in Computer Science* vol. 1066: *Hybrid Systems III*, 1996, 25 pages.

(Continued)

*Primary Examiner* — Carlos R Ortiz Rodriguez
(74) *Attorney, Agent, or Firm* — VLP Law Group LLP; James A. D. White

(57) ABSTRACT

Techniques are described for implementing automated control systems to control operations of specified physical target systems. In some situations, the described techniques include obtaining and analyzing sensor data about operations of a target system in order to generate an improved model of a current state of the target system, and using the modeled state information as part of determining further current and/or future automated control actions to take for the target system, such as to generate a function and/or other structure that models internal operations of the target system, rather than merely attempting to estimate target system output from input without understanding the internal structure and operations of the target system.

25 Claims, 31 Drawing Sheets

(51) Int. Cl.
    *F24F 11/63*     (2018.01)
    *F24F 11/46*     (2018.01)

(56) References Cited

U.S. PATENT DOCUMENTS

| | | | |
|---|---|---|---|
| 6,088,689 | A | 7/2000 | Kohn et al. |
| 2003/0069868 | A1 | 4/2003 | Vos |
| 2006/0229769 | A1 | 10/2006 | Grichnik et al. |
| 2011/0178622 | A1 | 7/2011 | Tuszynski |
| 2012/0143356 | A1 | 6/2012 | Berg-Sonne et al. |
| 2013/0080530 | A1 | 3/2013 | Frees et al. |
| 2013/0253942 | A1 | 9/2013 | Liu et al. |
| 2014/0250377 | A1 | 9/2014 | Bisca et al. |
| 2015/0058078 | A1 | 2/2015 | Ehrenberg et al. |
| 2016/0004228 | A1 | 1/2016 | Kohn et al. |

OTHER PUBLICATIONS

Kohn et al., "Multiple Agent Hybrid Control: Carrier Manifolds and Chattering Approximations to Optimal Control," 33$^{rd}$ Conference on Decision and Control Lake Buena Vista, FL, Dec. 1994, 7 pages.

Kohn et al., "A Hybrid Systems Approach to Computer-Aided Control Engineering," *IEEE Control Systems* 15(2), 1995, 30 pages.

Kohn et al., "Hybrid Systems as Finsler Manifolds: Finite State Control as Approximation to Connections," *Lecture Notes in Computer Science* vol. 999: *Hybrid Systems II*, 1995, 28 pages.

Kohn et al., "Viability in Hybrid Systems," *Theoretical Computer Science* 138, 1995, 28 pages.

Kohn et al., "Digital to Hybrid Program Transformations," IEEE International Symposium on Intelligent Control, Dearborn, MI, Sep. 15-18, 1996, 6 pages.

Kohn et al., "Hybrid Dynamic Programming," *Lecture Notes in Computer Science* vol. 1201: *Hybrid and Real-Time Systems*, 1997, 7 pages.

Kohn et al., "Implementing Sensor Fusion Using a Cost-Based Approach," American Control Conference, Albuquerque, NM, Jun. 1997, 5 pages.

Kohn et al., "Control Synthesis in Hybrid Systems with Finsler Dynamics," *Houston Journal of Mathematics* 28(2), 2002, 23 pages.

Kohn et al., "A Micro-Grid Distributed Intelligent Control and Management System," *IEEE Transactions on Smart Grid* 6(6), Nov. 2015, 11 pages.

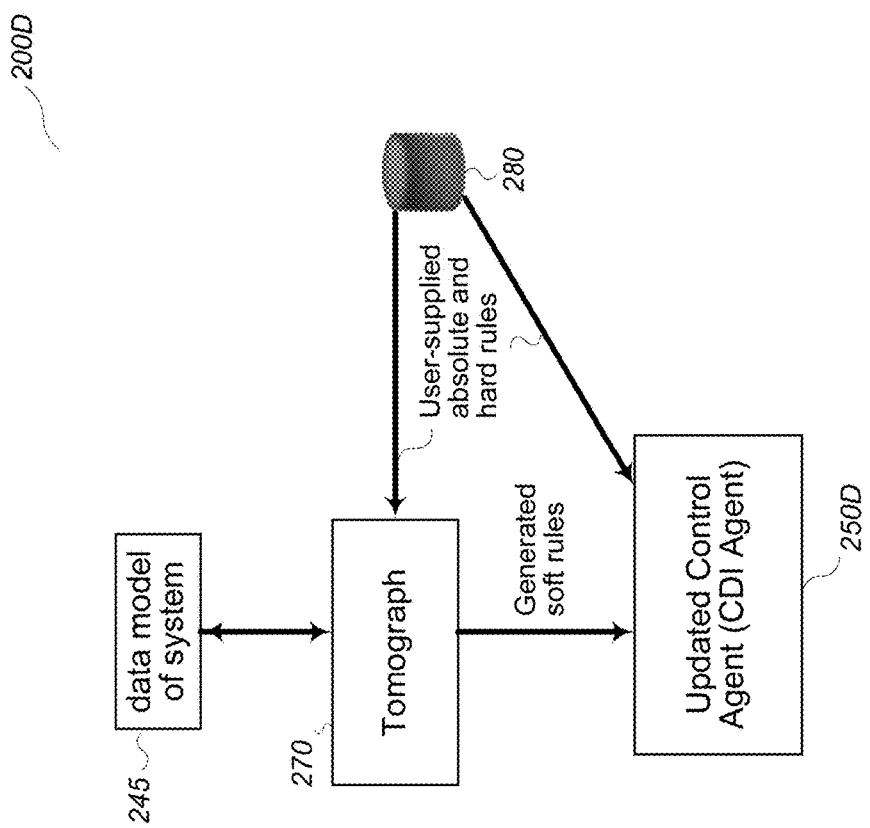

Example Battery Operational Data

| | Internal Temp | External Temp | Actuator Control Signal | Battery Charge | Time | ... | Voltage In/Out | Current In/Out | Power In/Out | ... |
|---|---|---|---|---|---|---|---|---|---|---|
| 290 | 292a | 292b | 292c | 292d | 292e | | 292u | 292v | 292w | |
| 294-1 | A1 | B1 | C1 | D1 | E1 | ... | U1 | V1 | W1 | ... |
| 294-2 | A2 | B2 | C2 | D2 | E2 | ... | U2 | V2 | W2 | ... |

Example Absolute And Hard Rules

296

Internal_Temp < $Temp_{max}$
Internal_Temp > $Temp_{min}$
Current_In/Out <= $CurrentOut_{max}$
$Charge_{min}$ <= Battery_Charge <= $Charge_{max}$

Example Tomograph Queries And Answers

297

What is Voltage_In/Out if input variable set is $IVS_1$?   $V_{IVS1}$
What is Voltage_In/Out if input variable set is $IVS_2$?   $V_{IVS2}$
What is Voltage_In/Out if input variable set is $IVS_3$?   $V_{IVS3}$

⋮

Is Power-In/Out in desired_power_range if input variable set is IVS1?   Yes/No $_{IVS1}$

Example Soft Rules

298

Voltage_In/Out decreases with Battery_Age according to formula P, with probability Q
Battery_Life has decreased by M%, with probability N

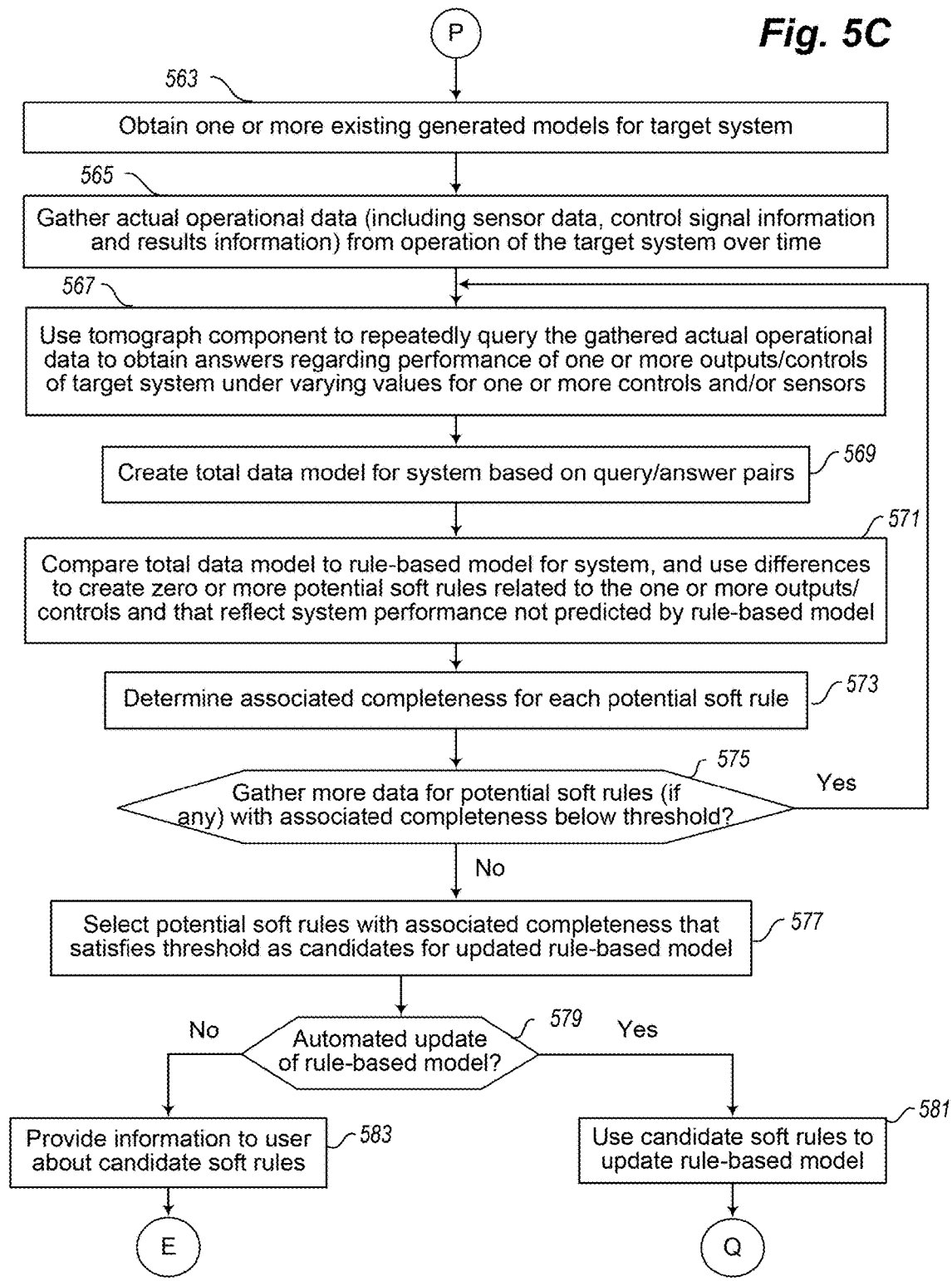

USING SENSOR DATA TO ASSIST IN CONTROLLING A TARGET SYSTEM BY MODELING THE FUNCTIONALITY OF THE TARGET SYSTEM

CROSS-REFERENCE TO RELATED APPLICATIONS

This application claims the benefit of U.S. Provisional Patent Application No. 62/336,418, filed May 13, 2016 and entitled "Using Sensor Data To Assist In Controlling A Target System By Modeling The Functionality Of The Target System," which is hereby incorporated by reference in its entirety.

BACKGROUND

Attempts have been made to implement automated control systems for various types of physical systems having inputs or other control elements that the control system can manipulate in an attempt to provide desired output or other behavior of the physical systems. Such automated control systems have used various types of architectures and underlying computing technologies to attempt to implement such functionality, including to attempt to deal with issues related to uncertainty in the state of the physical system being controlled, the need to make control decisions in very short amounts of time and with only partial information, etc. One example of such an automated control system includes a system for controlling operations of a battery that is discharging electrical power to support a load and/or is charging using electrical power from a source, with uncertainty about an internal temperature and/or chemical state of the battery, and potentially with ongoing changes in load, source and/or internal state of the battery.

However, various difficulties exist with existing automated control systems and their underlying architectures and computing technologies, including with respect to managing uncertainty in a current state of a system being controlled and in how different types of inputs will affect operation of the automated control systems.

BRIEF DESCRIPTION OF THE DRAWINGS

FIGS. 2A-2F are block diagrams illustrating example components of an embodiment of a system for performing automated control of DC power from a battery based in part on a state of the battery that is modeled using sensor data.

FIGS. 2G-2J illustrate examples of analyzing battery system operational data to improve automated control of the battery system.

FIGS. 5A-5C illustrate a flow diagram of an example embodiment of a CDD Decision Module Construction routine.

DETAILED DESCRIPTION

Figure 1A:
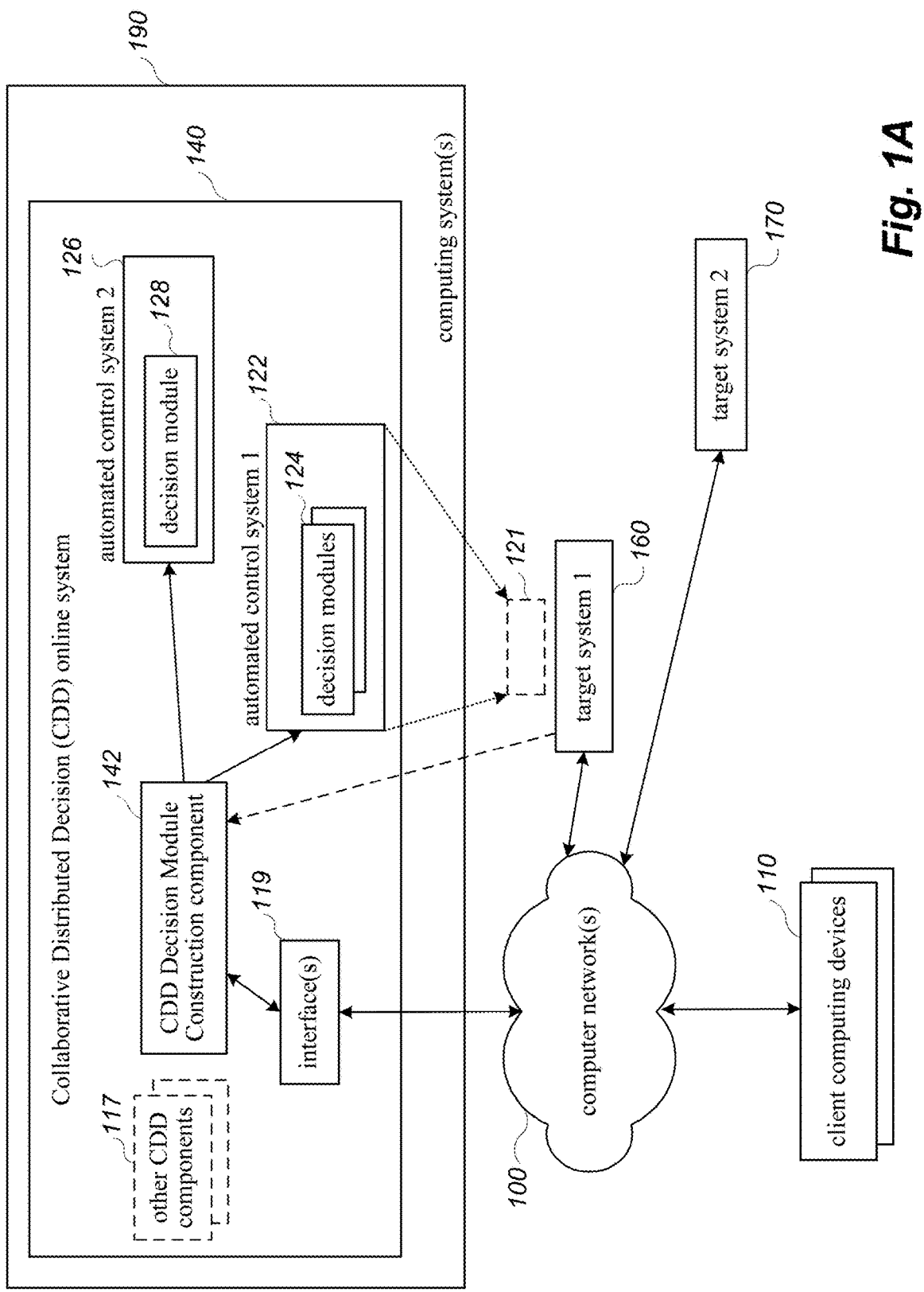
FIG. 1A is a network diagram illustrating an example environment in which a system for performing cooperative distributed control of target systems may be configured and initiated.

Techniques are described for implementing automated control systems to control or otherwise manipulate at least some operations of specified physical systems or other target systems. In at least some embodiments, the described techniques include obtaining and analyzing data (e.g., from sensor devices) about operations of a target system in order to generate an improved model of a current state and operational characteristics of the target system, and using the improved model as part of determining further current and/or future automated control actions to take for the target system. In at least some such embodiments, the analyzing of the data and modeling of the current state and operational characteristics of the target system may include analyzing prior input data to the target system and resulting behavior of the target system to generate a function and/or other structure that models internal operations of the target system (referred to generally herein as using "tomography" or "tomographic" techniques, such as by a "tomography" component), rather than merely attempting to estimate target system output from input without understanding the internal structure and operations of the target system (referred to as instead performing "system identification"). In addition, the modeling of the current state of the target system may in at least some embodiments be performed to complete or repair or otherwise address conflicts in state information for one or more parts of the target system, such as from lack of sufficient internal state structure information or other information, and to enable learning of or other improvements to a function or other model of the target system's internal state and operational characteristics. Additional details related to performing and improving such modeling of a target system's state and operational characteristics, and to using a resulting improved model of the target system in particular manners, are described below, and some or all of the described techniques are performed in at least some embodiments by automated operations of one or more 'tomograph' components, optionally as part of or in conjunction with one or more CDD (Collaborative Distributed Decision) systems controlling specific types of target systems.

As noted above, various types of data may be obtained and used as part of modeling a current state and operational characteristics of a target system, including information about prior input data to the target system and resulting behavior of the target system. In some embodiments and situations, such data may include data that is gathered in an automated manner from one or more hardware sensors of various types, and in some embodiments and situations, such data may include information about actions of human users or otherwise information about such humans. The term "sensor' and "sensor data" as used herein generally refers to such data regardless of source or type, including data from hardware sensors and/or data from or about human users, unless otherwise indicated with respect to a particular situation. Additional details are included below related to obtaining and using such sensor data.

The described techniques for modeling a current state and operational characteristics of a target system, and using a resulting model of the target system as part of determining current and/or future automated control actions to take for the target system may be performed for various types of target systems in various embodiments. As one non-exclusive example, the physical target system may include one or more batteries used to store and provide electrical power (e.g., for a local load, for an electrical grid that supports various loads in various locations, etc.), and the automated operations to control the target system may include using characteristics of each battery's state to perform automated control of DC (direct current) power that is provided from and/or stored by the battery. In such embodiments, the automated operations of one or more tomograph components may include receiving information about inputs to, outputs from, control signal instructions provided to and other state of the one or more batteries (e.g., internal temperature readings, electrical current and/or voltage being output for use, electrical current and/or voltage being input for storage, temperature readings external to the one or more batteries as part of their surrounding environment, etc.), and using such information as part of modeling a current state and operational characteristics of the one or more batteries—given such improved modeled information, a CDD system that controls the one or more batteries may then use such information to make decisions on current and/or future control actions that better reflect an actual current state and behavior of the target system. As another non-exclusive example, the physical target system may include a multi-room building that includes heating and/or cooling capabilities (e.g., one or more HVAC, or heating, ventilation and air conditioning, units), and the automated operations to control the target system may include using characteristics of a subset of the rooms (e.g., temperatures measured in a subset of the rooms that have temperature sensors) to perform automated control of heating and/or cooling that is provided from the heating and/or cooling capabilities to all of the rooms. In such embodiments, the automated operations of one or more tomograph components may include receiving information about inputs to, outputs from, control signal instructions provided to and other state of the heating and/or cooling capabilities and of at least some rooms of the building (e.g., internal temperature readings, amount of time and/or energy usage of the heating and/or cooling capabilities, temperature readings external to the building as part of its surrounding environment, etc.), and using such information as part of modeling a current state of the temperatures of the rooms of the building—given such improved modeled information, a CDD system that controls the heating and/or cooling capabilities may then use such information to make decisions on current and/or future control actions that better reflect an actual current state and behavior of the target system.

Additional details are included below related to such modeling of a target system's current state and operational characteristics, and to such use of the modeled information, although it will be appreciated that the described techniques may further be used with various other types of target systems, whether instead of or in addition to a target system with one or more batteries used to store and provide electrical power and/or heating/cooling capabilities, some of which are further discussed below. Non-exclusive examples of target systems in which such tomographic techniques may be used to model the target system's current state include the following: a micro-grid electricity facility, such as at a residential location that includes one or more electricity sources (e.g., one or more solar panel grids, one or more wind turbines, etc.) and one or more electricity storage and source mechanisms (e.g., one or more batteries); a biodegradable waste or other solid waste system used to generate energy; intelligent micro-grid dispatch for dynamic loads; a micro-grid with a ship-based generator; a harmonic harvesting system (e.g., for use with furnaces and other thermal processes with radiation and convection mechanisms; DC-AC inverters; AC-DC power converters and rectifiers; radiation systems; etc.); etc.

Figure 1B:
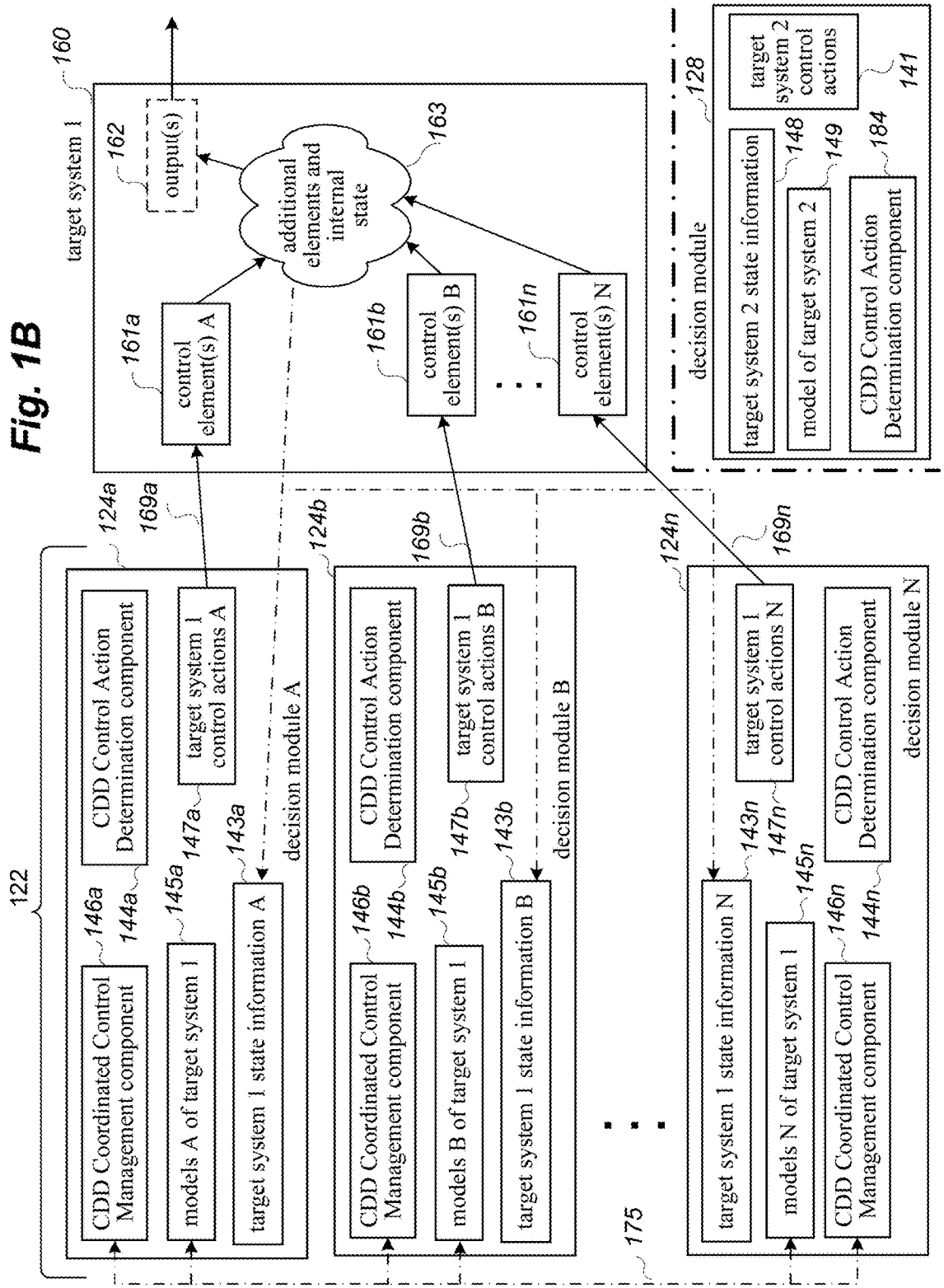
FIG. 1B is a network diagram illustrating an example environment in which a system for performing cooperative distributed control of target systems may be implemented.
Figure 1C:
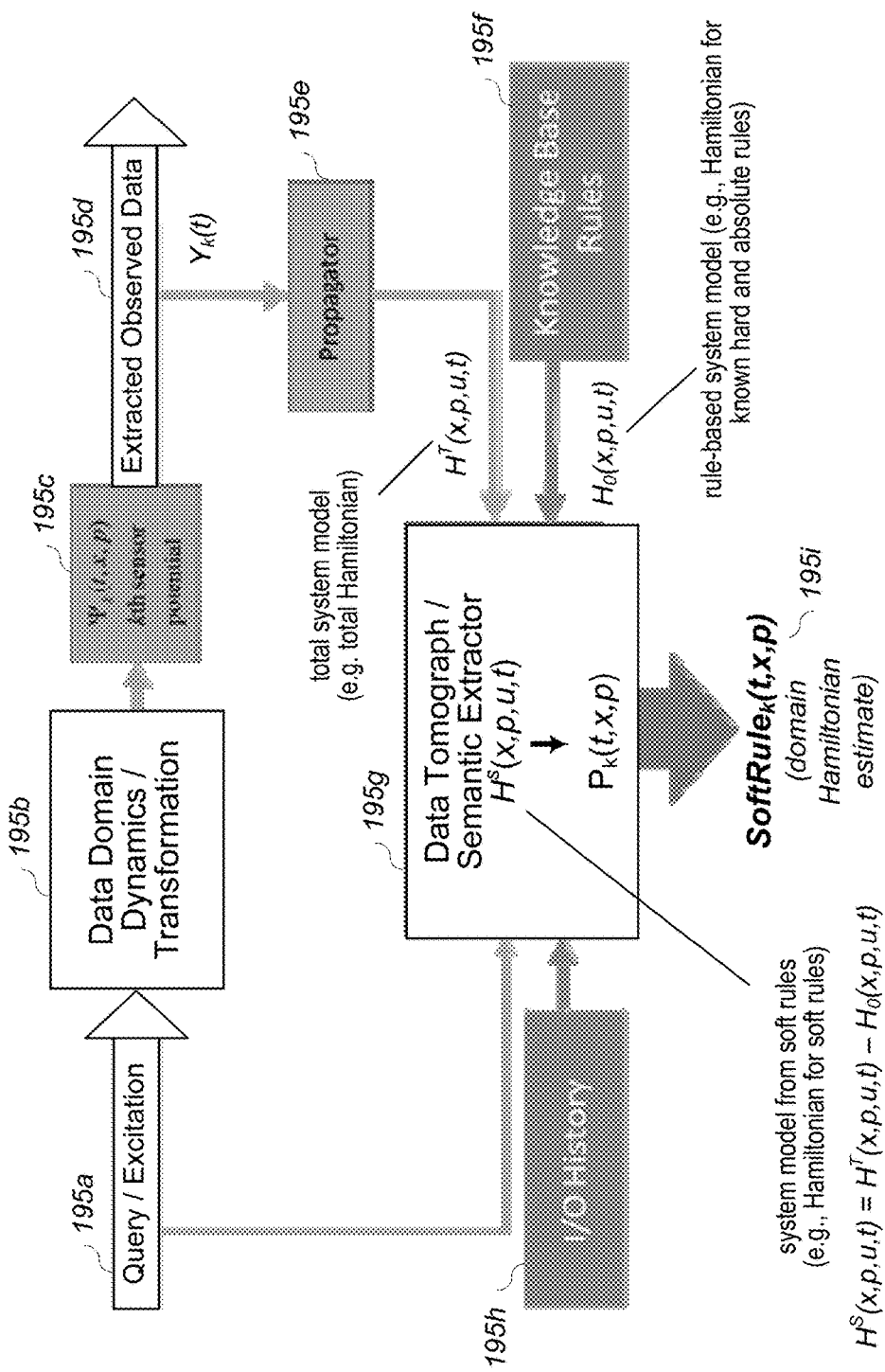
FIG. 1C is a flow diagram illustrating how a data tomograph component may be used to estimate state information for a corresponding target system.

FIG. 1C illustrates an example flow diagram 195 illustrating how a data tomograph component may be used to estimate state information for a corresponding target system. In particular, data may be obtained from actual operation of a target system over time (such as to identify some or all inputs supplied to the target system, resulting outputs from the target system, sensor data measured regarding operations of the target system, etc.), and used to generate a data model of the target system's operations, as shown in FIG. 1C with respect to element 195b. A series of queries 195a may then be supplied to the data model, such as to gather extracted observed data 195d corresponding to multiple situations involving different values for one or more inputs or sensors, referred to as determining the potential of a single "$k^{th}$" sensor 195c in this example. The observed data for the sensor is then supplied to a propagator component 195e in this example, which generates a total representation of the target system and its operations and supplies the generated representation to a data tomograph component 195g—in this example, the generated total representation is in the form of a total Hamiltonian function, as discussed in greater detail below. In addition, a knowledge base 195f with rules regarding operation of the target system (e.g., an initial model of the target system that uses those rules to represent the target system) generates a second rule-based representation of the target system and its operations and also supplies that generated second representation to the data tomograph component 195g, such as to enable behavior of the $k^{th}$ sensor that is predicted by the rules to be determined—in this example, the rules are binary rules that evaluate to true or false, and the generated second representation from the element 195f is in the form of a rule-based Hamiltonian function, as is also discussed in greater detail below. The data tomograph component 195g then evaluates differences between the two different generations (e.g., ways in which the second rule-based generated representation fails to predict the actual behavior of the target system in such situations as reflected in the first total generated representation), using I/O history information 195h as well, and creates a third generated representation of the target system and its operations that reflects those differences—in this example, the generated third representation is in the form of a Hamiltonian function that represents one or more soft rules (e.g., rules that may take multiple possible values, including one or more values other than true and false, and may further have an associated confidence in a particular value), as discussed in greater detail below. The data tomograph 195g then uses the generated third representation to produce one or more soft rules 195i to represent those differences, such that a combination of the generated second rule-based representation and the generated third soft-rule-based representation for the one or more soft rules may better model the target system and its operations. Additional discussion of the use of the data tomograph in this manner are included below.

However, before further discussion of the data tomograph component and its functionality, a more general description of the control of target systems using such representations and other models is provided. In particular, FIG. 1A is a network diagram illustrating an example environment in which a system for performing cooperative distributed control of one or more target systems may be configured and initiated. In particular, an embodiment of a CDD system 140 is executing on one or more computing systems 190, including in the illustrated embodiment to operate in an online manner and provide a graphical user interface (GUI) (not shown) and/or other interfaces 119 to enable one or more remote users of client computing systems 110 to interact over one or more intervening computer networks 100 with the CDD system 140 to configure and create one or more decision modules to include as part of an automated control system to use with each of one or more target systems to be controlled.

In particular, target system 1 160 and target system 2 170 are example target systems illustrated in this example, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In this example, the one or more users (not shown) may interact with the CDD system 140 to generate an example automated control system 122 for target system 1, with the automated control system including multiple decision modules 124 in this example that will cooperatively interact to control portions of the target system 1 160 when later deployed and implemented. The process of the users interacting with the CDD system 140 to create the automated control system 122 may involve a variety of interactions over time, including in some cases independent actions of different groups of users, as discussed in greater detail elsewhere. In addition, as part of the process of creating and/or training or testing automated control system 122, it may perform one or more interactions with the target system 1 as illustrated, such as to obtain partial initial state information, although some or all training activities may in at least some embodiments include simulating effects of control actions in the target system 1 without actually implementing those control actions at that time. In some embodiments and situations, such initial user interactions may be used to generate an initial rule-based system model of a target system that is based on binary rules, such as reflected in the knowledge base 195f of FIG. 1C—if so, the data tomograph component may then be used to improve such an initial rule-based system model by automatically learning additional soft rules to include in a revised model of the target system.

After the automated control system 122 is created, the automated control system may be deployed and implemented to begin performing operations involving controlling the target system 1 160, such as by optionally executing the automated control system 122 on the one or more computing systems 190 of the CDD system 140, so as to interact over the computer networks 100 with the target system 1. In other embodiments and situations, the automated control system 122 may instead be deployed by executing local copies of some or all of the automated control system 122 (e.g., one or more of the multiple decision modules 124) in a manner local to the target system 1, as illustrated with respect to a deployed copy 121 of some or all of automated control system 1, such as on one or more computing systems (not shown) that are part of the target system 1. In addition, in embodiments and situations in which initial user interactions are used to generate an initial rule-based system model of a target system that is based on binary rules, the initially deployed automated control system 122 may be based on such an initial rule-based system model, and data from the operation of the target system under control of that initially deployed automated control system 122 may be gathered and used for subsequent automated learning of additional soft rules to use, such as reflected in the data domain information 195b of FIG. 1C—if so, the data tomograph component may then be used to improve such an initial rule-based system model by automatically learning additional soft rules to include in a revised model of the target system, with a revised version of the automated control system 122 subsequently deployed to include functionality of those automatically learned soft rules.

In a similar manner to that discussed with respect to automated control system 121, one or more users (whether the same users, overlapping users, or completely unrelated users to those that were involved in creating the automated control system 122) may similarly interact over the computer network 100 with the CDD system 140 to create a separate automated control system 126 for use in controlling some or all of the target system 2 170. In this example, the automated control system 126 for target system 2 includes only a single decision module 128 that will perform all of the control actions for the automated control system 126. The automated control system 126 may similarly be deployed and implemented for target system 2 in a manner similar to that discussed with respect to automated control system 121, such as to execute locally on the one or more computing systems 190 and/or on one or more computing systems (not shown) that are part of the target system 2, although a deployed copy of automated control system 2 is not illustrated in this example. It will be further appreciated that the automated control systems 122 and/or 126 may further include other components and/or functionality that are separate from the particular decision modules 124 and 128, respectively, although such other components and/or functionality are not illustrated in FIG. 1A.

The network 100 may, for example, be a publicly accessible network of linked networks, possibly operated by various distinct parties, such as the Internet, with the CDD system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the CDD system 140 in the illustrated embodiment is implemented in an online manner to support various users over the one or more computer networks 100, in other embodiments a copy of the CDD system 140 may instead be implemented in other manners, such as to support a single user or a group of related users (e.g., a company or other organization), such as if the one or more computer networks 100 are instead an internal computer network of the company or other organization, and with such a copy of the CDD system optionally not being available to other users external to the company or other organizations. The online version of the CDD system 140 and/or local copy version of the CDD system 140 may in some embodiments and situations operate in a fee-based manner, such that the one or more users provide various fees to use various operations of the CDD system, such as to perform interactions to generate decision modules and corresponding automated control systems, and/or to deploy or implement such decision modules and corresponding automated control systems in various manners. In addition, the CDD system 140, each of its components (including component 142 and optional other components 117, such as one or more CDD Control Action Determination components and/or one or more CDD Coordinated Control Management components), each of the decision modules, and/or each of the automated control systems may include software instructions that execute on one or more computing systems (not shown) by one or more processors (not shown), such as to configure those processors and computing systems to operate as specialized machines with respect to performing their programmed functionality.

FIG. 1B is a network diagram illustrating an example environment in which a system for performing cooperative distributed control of target systems may be implemented, and in particular continues the examples discussed with respect to FIG. 1A. In the example environment of FIG. 1B, target system 1 160 is again illustrated, with the automated control system 122 (whether an initial or revised version) now being deployed and implemented to use in actively controlling the target system 1 160. In the example of FIG. 1B, the decision modules 124 are represented as individual decision modules 124a, 124b, etc., to 124n, and may be executing locally to the target system 1 160 and/or in a remote manner over one or more intervening computer networks (not shown). In the illustrated example, each of the decision modules 124 includes a local copy of a CDD Control Action Determination component 144, such as with component 144a supporting its local decision module 124a, component 144b supporting its local decision module 124b, and component 144n supporting its local decision module 124n. Similarly, the actions of the various decision modules 124 are coordinated and synchronized in a peer-to-peer manner in the illustrated embodiment, with each of the decision modules 124 including a copy of a CDD Coordinated Control Management component 146 to perform such synchronization, with component 146a supporting its local decision module 124a, component 146b supporting its local decision module 124b, and component 146n supporting its local decision module 124n.

As the decision modules 124 and automated control system 122 execute, various interactions 175 between the decision modules 124 are performed, such as to share information about current models and other state of the decision modules to enable cooperation and coordination between various decision modules, such as for a particular decision module to operate in a partially synchronized consensus manner with respect to one or more other decision modules (and in some situations in a fully synchronized manner in which the consensus actions of all of the decision modules 124 converge). During operation of the decision modules 124 and automated control system 121, various state information 143 may be obtained by the automated control system 122 from the target system 160, such as initial state information and changing state information over time, and including outputs or other results in the target system 1 from control actions performed by the decision modules 124. Such state information may, for example, be gathered and used for subsequent automated learning of additional soft rules to use, such as by a data tomograph component to improve an initial system model by automatically learning soft rules to include in a revised model of the target system, although such operations are not illustrated in FIG. 1B.

The target system 1 in this example includes various control elements 161 that the automated control system 122 may manipulate, and in this example each decision module 124 may have a separate group of one or more control elements 161 that it manipulates (such that decision module A 124a performs interactions 169a to perform control actions A 147a on control elements A 161a, decision module B 124b performs interactions 169b to perform control actions B 147b on control elements B 161b, and decision module N 124n performs interactions 169n to perform control actions N 147n on control elements N 161n). Such control actions affect the internal state 163 of other elements of the target system 1, including optionally to cause or influence one or more outputs 162. As operation of the target system 1 is ongoing, at least some of the internal state information 163 is provided to some or all of the decision modules to influence their ongoing control actions, with each of the decision modules 124a-124n possibly having a distinct set of state information 143a-143n, respectively, in this example.

As discussed in greater detail elsewhere, each decision module 124 may use such state information 143 and a local model 145 of the decision module for the target system to determine particular control actions 147 to next perform, such as for each of multiple time periods, although in other embodiments and situations, a particular automated control system may perform interactions with a particular target system for only one time period or only for some time periods. For example, the local CDD Control Action Determination component 144 for a decision module 124 may determine a near-optimal location solution for that decision module's local model 145, and with the local CDD Coordinated Control Management component 146 determining a synchronized consensus solution to reflect other of the decision modules 124, including to update the decision module's local model 145 based on such local and/or synchronized solutions that are determined. Thus, during execution of the automated control system 121, the automated control system performs various interactions with the target system 160, including to request state information, and to provide instructions to modify values of or otherwise manipulate control elements 161 of the target system 160. For example, for each of multiple time periods, decision module 124a may perform one or more interactions 169a with one or more control elements 161a of the target system, while decision module 124b may similarly perform one or more interactions 169b with one or more separate control elements B 161b, and decision module 124n may perform one or more interactions 169n with one or more control elements N 161n of the target system 160. In other embodiments and situations, at least some control elements may not perform control actions during each time period.

While example target system 2 170 is not illustrated in FIG. 1B, further details are illustrated for decision module 128 of automated control system 126 for reference purposes, although such a decision module 128 would not typically be implemented together with the decision modules 124 controlling target system 1. In particular, the deployed copy of automated control system 126 includes only the single executing decision module 128 in this example, although in other embodiments the automated control system 126 may include other components and functionality. In addition, since only a single decision module 128 is implemented for the automated control system 126, the decision module 128 includes a local CDD Control Action Determination component 184, but does not in the illustrated embodiment include any local CDD Coordinated Control Management component, since there are not other decision modules with which to synchronize and interact.

While not illustrated in FIGS. 1A and 1B, the distributed nature of operations of automated control systems such as those of 122 allow partially decoupled operations of the various decision modules, include to allow modifications to the group of decision modules 124 to be modified over time while the automated control system 122 is in use, such as to add new decision modules 124 and/or to remove existing decision modules 124. In a similar manner, changes may be made to particular decision modules 124 and/or 128, such as to change rules or other restrictions specific to a particular decision module and/or to change goals specific to a particular decision module over time, with a new corresponding model being generated and deployed within such a decision module, including in some embodiments and situations while the corresponding automated control system continues control operations of a corresponding target system. As one example, at least some such modifications may reflect operations of one or more data tomograph components to improve a target system model (or model for a particular control element) at one or more times, including to automatically learn one or more soft rules that are added (whether automatically or in response to additional user instructions or interactions) to produce the improved target system model that is then deployed. In addition, while each automated control system is described as controlling a single target system in the examples of FIGS. 1A and 1B, in other embodiments and situations, other configurations may be used, such as for a single automated control system to control multiple target systems (e.g., multiple inter-related target systems, multiple target systems of the same type, etc.), and/or multiple automated control systems may operate to control a single target system, such as by each operating independently to control different portions of that target control system. It will be appreciated that other configurations may similarly be used in other embodiments and situations.

In situations involving a physical target system that includes one or more batteries used to store and provide electrical power, the automated operations to control the target system may include using characteristics of each battery's state to perform automated control of DC (direct current) power that is provided from the battery, such as by using a DC-to-DC amplifier (e.g., a field-effect transistor, or FET, amplifier) connected to the battery to control an amount of electrical current and/or voltage being output from the battery, in a real-time manner and to optimize long-term operation of the battery. The DC-to-DC amplifier may, for example, be part of a buck converter (or step-down converter) that steps down voltage while stepping up current from its input (supply) to its output (load) and/or be part of a boost converter (or step-up converter) that steps up voltage while stepping down current from its input (supply) to its output (load), referred to generally at times herein as a "boost/buck controller" or "buck/boost controller". In addition, in some embodiments and situations, multiple batteries may be controlled in such a manner by using multiple control modules that are each associated with one of the batteries, and with the overall control of the multiple batteries being coordinated in a distributed manner, such as based on interactions between the multiple associated control modules for the multiple batteries. A system that includes one or more batteries to be controlled may further include additional components in some embodiments and situations, such as one or more electrical sources and/or one or more electrical loads, with one non-exclusive example of such a type of system being one or more home or business electrical power systems that may optionally include electrical generation sources (e.g., solar panels, wind turbines, etc.) as well as electrical load from the house or business.

Figure 2A:
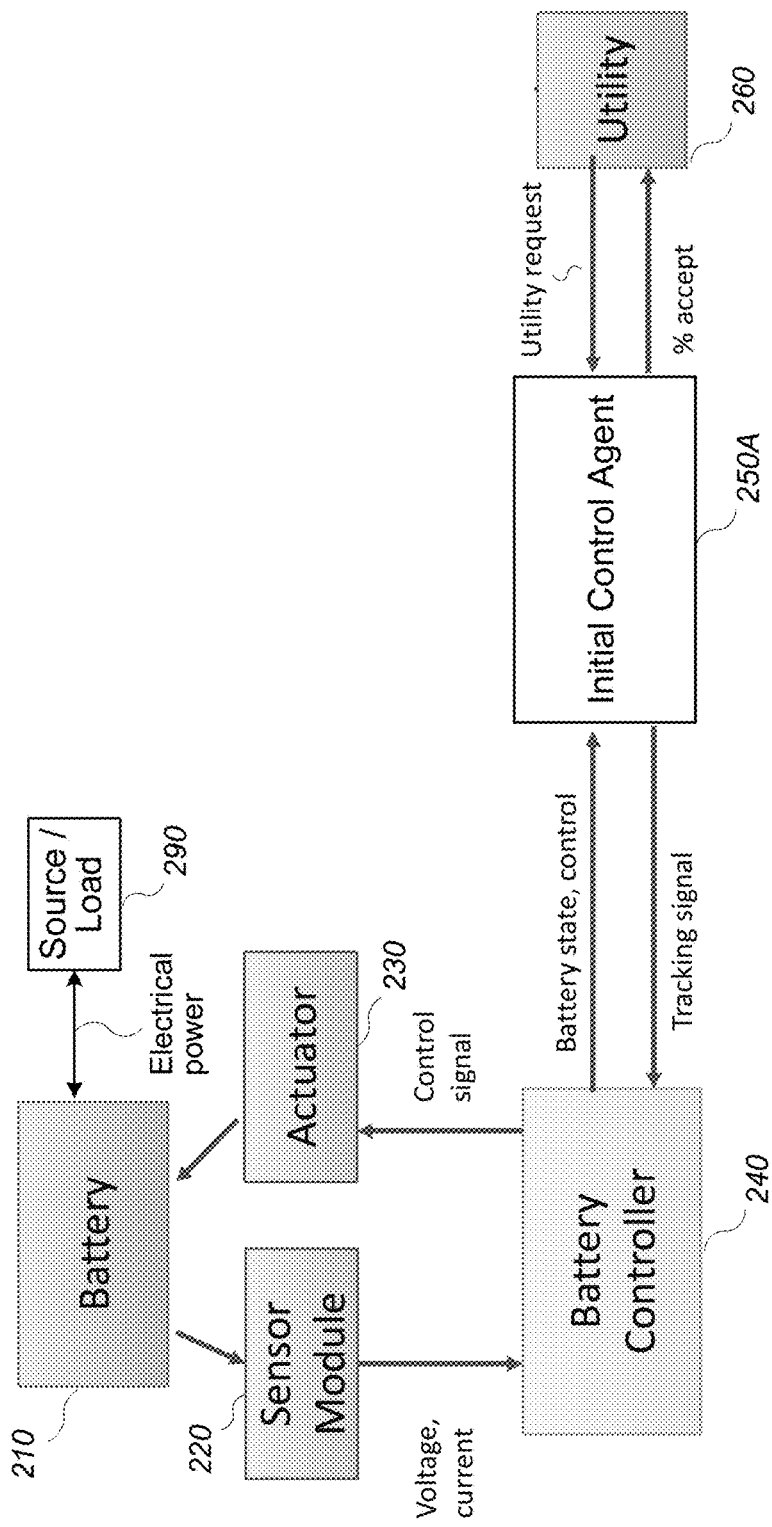

FIG. 2A includes a block diagram 200A illustrating example components of an embodiment of a system for using characteristics of a battery's state along with other related information to perform automated control of DC power from the battery—in particular, various components of example system 200A interact to control operations of the battery according to one or more defined goals in light of defined constraints, rules and other criteria, as discussed further below. In some embodiments, the automated activities to control the battery may be performed in a real-time manner and/or to optimize long-term operation of the battery (e.g., the life of the battery), while satisfying as many external requests for power (e.g., from a utility 260 to which the battery can supply power via one or more corresponding loads 290) as is possible (e.g., at least a defined percentage or quantity of such requests). In particular, a data tomograph component may be used to generate and use an updated improved control agent (referred to at times herein as a CDI agent, or a CDD decision module or system) with such a system 200A, as discussed in greater detail with respect to the examples of FIGS. 2C-2J.

In the illustrated example of FIG. 2A, a battery 210 is shown that is being controlled via an actuator 230 receiving a corresponding control signal from a battery controller component 240 (also referred to as a "tracking controller" and/or "battery tracking controller" at times herein), such as by the battery controller specifying an amount of power to be generated as DC output of the battery. The specified power amount to be generated may include information indicating, for example, to increase or decrease the power being output by a specified amount, or to not change the power output. The output of the battery may serve to provide power to one or more loads 290, and in at least some embodiments may be connected to an inverter/rectifier component (not shown) to convert the power output of the battery to AC power to support corresponding loads—such an inverter may, for example, control power being provided from the battery by regulating voltage and/or frequency of the AC power. Similarly, input of the battery may serve to receive power from one or more sources 290, and in at least some embodiments may be connected to an inverter/rectifier component (not shown) to convert AC power input from the sources to DC power for the battery—such a rectifier may, for example, control power being provided to the battery by regulating voltage and/or frequency of the AC power.

As part of determining how to control the battery, the battery controller component 240 receives input from one or more hardware sensor modules 220 regarding an internal state (not shown) of the battery, such as current values for voltage, electrical current, temperature, etc., and supplies corresponding information to an initial control agent 250A—while the battery controller component is illustrated in this example as providing the relevant information to the control agent 250A, in other embodiments the control agent 250A may obtain some or all such information in other manners, such as directly from the sensor modules. The control agent receives the information from the battery controller related to the state of the battery, and also receives power supply requests from a utility component 260, such as in a situation in which the battery supplies power at some or all times to an electrical grid (not shown) controlled by the utility. In particular, the control agent receives a particular request from the utility, receives and analyzes information about the state of the battery, and determines corresponding operations to take at the current time for the battery (e.g., an amount of output power to be supplied from the battery, and/or an amount of input power to be received and stored by the battery), which in at least some situations involve attempting to fully or partially satisfy the request from the utility for power in a real-time manner if the request can be satisfied in a way that also satisfies other constraints on the battery performance given the current state of the battery and the defined goal(s), such as to enable the battery to operate in a desired non-saturation range or level (e.g., with respect to an estimated internal temperature of the battery and/or estimated internal chemistry of the battery). After determining the corresponding operations to take at the current time for the battery, the control agent provides a corresponding tracking control signal to the battery controller, which determines how to currently modify or manipulate the actuator to effectuate the corresponding operations for the tracking control signal (e.g., an amount of positive or negative change to make in an amount of current being output from the battery), and sends a corresponding control signal to the actuator as discussed above.

While not illustrated in FIG. 2A, the control agent and/or battery controller may in some embodiments include a stored model of the battery that is used to estimate internal state of the battery and to select particular operations to perform based in part on that internal state, which may be later updated based on actions of a tomograph component to learn soft rules to use, as discussed in greater detail below with respect to FIGS. 2C-2J. For example, a generic battery model may be used in some embodiments that is applicable to any type of battery, while in other embodiments a battery model may be used that is specific to a type of the battery (e.g., a type of chemical reaction used to store and/or generate electricity, such as lithium ion or nickel cadmium), while in yet other embodiments a battery model may be used that is designed and/or configured specifically for the particular battery in use. Thus, such a battery model that is initially employed in a particular system with a particular battery may be updated over time, such as to reflect improvements to the underlying structure of the model and/or to train the model to reflect operational characteristics specific to the particular battery and/or system in use (e.g., by monitoring how changes in observable battery state correlate to corresponding external battery electrical load and/or electrical source), such as based at least in part on the actions of the tomograph to learn soft rules to use—when training or otherwise adapting a model to a particular battery and/or system, the training/adaption operations may in some embodiments be performed initially in a training phase before using the automated control system to control the battery, and/or in some embodiments may be performed continuously or periodically while the automated control system is controlling the battery (e.g., to reflect changes over time in an impedance profile of the battery). Additional details are included elsewhere herein regarding such models, including their construction and use. In addition, while in some embodiments the battery controller and control agent may be implemented as separate components (e.g., with the battery controller implemented in whole or in part in hardware and/or firmware that is attached to the battery or otherwise at a location of the battery, and with the control agent implemented in part by software instructions executing on one or more computing systems remote from the battery location and optionally communicating with the battery controller over one or more intervening computer networks), in other embodiments the control agent and battery controller may be implemented as a single component (whether at the location of the battery or remote from it). Similarly, while in some embodiments the data tomograph component and control agent may be implemented as separate components (e.g., with the tomograph component implemented in whole or in part at the location of the battery, and/or in whole or in part at a remote location), in other embodiments the control agent and tomograph component may be implemented as a single component (whether at the location of the battery or remote from it). Further details regarding operation of the control agent to determine operations to take for the battery are discussed in greater detail below.

In addition, while not illustrated with respect to FIG. 2A, in some embodiments multiple batteries (e.g., tens, hundreds, thousands, millions, etc.) may each have an associated control agent that controls actions of that battery in a similar manner, and with the various batteries acting together in a coordinated manner to supply aggregate power to the utility or to other entities. In such embodiments, the utility or other external entity may send synchronization and monitoring signals for use by the various systems including the batteries, and the multiple control agents associated with the various batteries may interact to exchange information and maintain at least partial coordination between the operations of the batteries. Some further aspects of performing automated operations to control such a target system with one or more batteries and/or other types are target systems are included in U.S. patent application Ser. No. 15/096,091, filed Apr. 11, 2016 and entitled "Using Battery DC Characteristics To Control Power Output," which is hereby incorporated by reference in its entirety.

In at least some embodiments, initial modeling of a state of a target system is performed using one or more data Hamiltonian functions, and the described techniques include using tomographic techniques to repair or otherwise improve the data Hamiltonian function(s) (e.g., in order to complete an underlying Hamiltonian-based model) based on analysis of one or more types of sensor data. A CDD system controlling such a target system may, in at least some embodiments and situations, implement multiple CDI control agents to distribute the control and management through an agent-based network with synchronization via a mean field Hamiltonian approach, such as with each agent characterized by a data Hamiltonian that defines the dynamics and interaction of one or more corresponding components in the target system, and with each such data Hamiltonian of an agent being dynamically computed from sensory data and actions. Such a data Hamiltonian (for a single target system component) and/or mean field Hamiltonian (for multiple coordinated target system components) can be thought of as a mathematical function that helps navigate a query through huge bodies of information by defining a spectrum of possible outcomes, including to model history, current situation and possible options. Non-exclusive example embodiments using such techniques are further described herein, but it will be appreciated that other embodiments may differ in one or more manners from these example embodiments.

A data Hamiltonian may be implemented as a function that captures the flow and interdependence of a data domain, and may have three types of variables (e.g., state variables, flow variables, and decision or control variables). A CDI control agent may be implemented as an optimization-based inference engine operating in a data domain that belongs to a multi-data domain, with agent optimization functionality encoded in the agent's Hamiltonian. The CDD system may be implemented as a formal, distributed inference rule-based optimization process for resolving time-based queries from a distributed agent based domain in real-time. A CDI control agent of the CDD system may be implemented using Horn clause rules of three types, as follows: absolute rules that characterize the physics of a physical target system being controlled (or otherwise describe unchangeable rules in other types of target systems), and have truth value equal to true in any Hamiltonian realization (e.g., a value of 0 for false or 1 for true); hard rules that characterize the desired behavior and goals, and have truth value equal to true in any Hamiltonian realization (e.g., a value of 0 for false or 1 for true); and soft rules that characterize the empirical knowledge of the operation, heuristic strategies, economic dispatch, and response to anomalies and learning strategies, and have a variable, probabilistic truth value in [0,1], as well as an associated confidence value for that variable, probabilistic truth value in some embodiments. Meta-rules are special kinds of soft rules used to transform sensory data and desired behavior into constraint data Hamiltonians. Soft rules can be thought of as being used to navigate queries through "gradients" (information that is neither true nor false), as a means of identifying what areas of data are pertinent to any given query. Thus, such rules for a CDI control agent define the constraints for a data Hamiltonian for the agent, and may be converted to a constraint optimization problem that a corresponding CDD system solves. For example, such conversion may include the following: transform truth values {0,1} to a [0,1] interval; transform variables and parameters to continuous variables and parameters; transform absolute rules to equality constraints; transform hard rules to equality constraints; transform soft rules to inequality constraints; transform inclusion sets to functional forms; transform algorithms to differential equations; etc.

Some further aspects of implementing such techniques for modeling target systems and performing automated operations to control such target systems, including in a distributed manner using multiple agents, are included in U.S. patent application Ser. No. 14/746,738, filed Jun. 22, 2015 and entitled "Cooperative Distributed Control Of Target Systems;" in U.S. Patent Application No. 62/182,968, filed Jun. 22, 2015 and entitled "Applications Of Cooperative Distributed Control Of Target Systems;" in U.S. Patent Application No. 62/182,796, filed Jun. 22, 2015 and entitled "Gauge Systems;" and in international PCT Patent Application No. PCT/US2015/037022, filed Jun. 22, 2015 and entitled "Cooperative Distributed Control Of Target Systems," each of which is hereby incorporated by reference in its entirety.

Figure 2B:
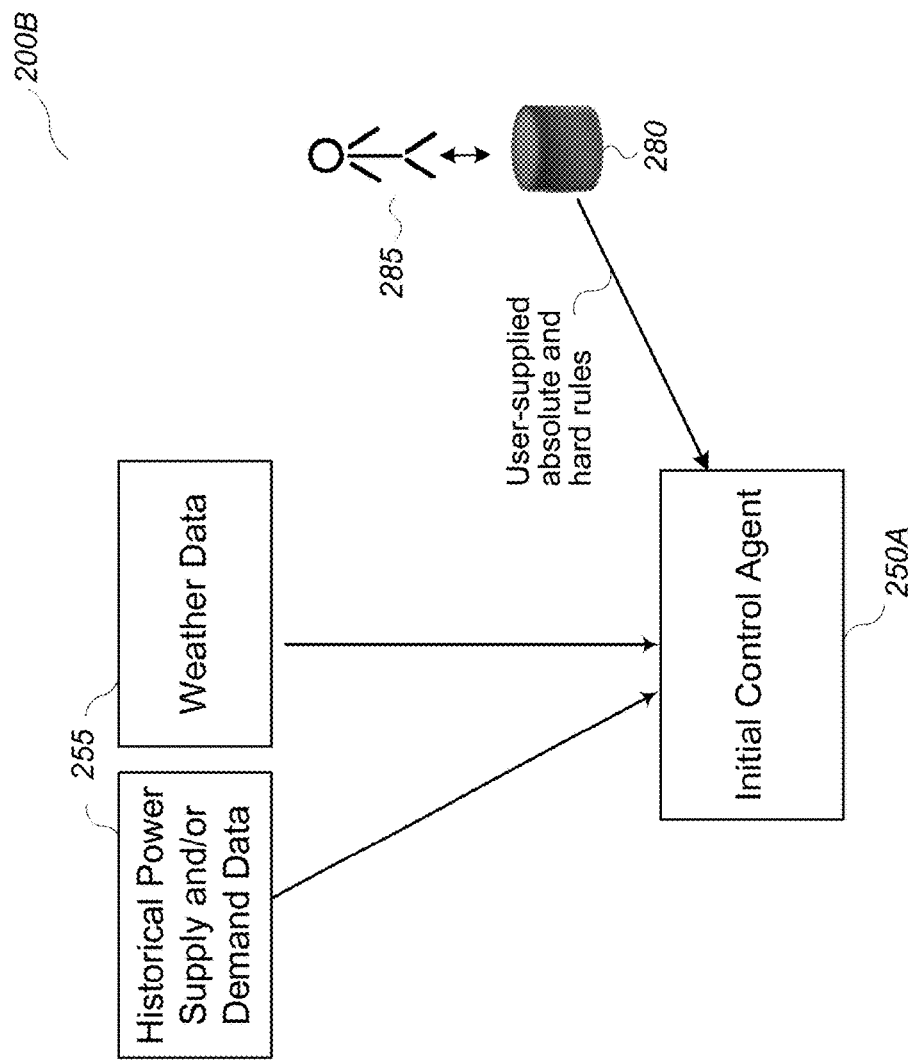

Furthermore, as noted above, some or all such soft rules may, in at least some embodiments and situations, be automatically learned by one or more data tomograph components for a particular target system, and used to improve a previous model of the target system for better control of the target system going forward. Accordingly FIG. 2B further includes information 200B that illustrates that in the example of FIG. 2A, the initial control agent 250A was constructed by one or more users 285 who supplied absolute and hard rules 280 for the system 200A. In some embodiments and situations, the initial control agent 250A may further include information from one or more sources 255, such as historical power supply and demand, and/or weather data, whether as incorporated by actions of the user(s) 285 or automatically included in the initial control agent 250A.

Figure 2C:
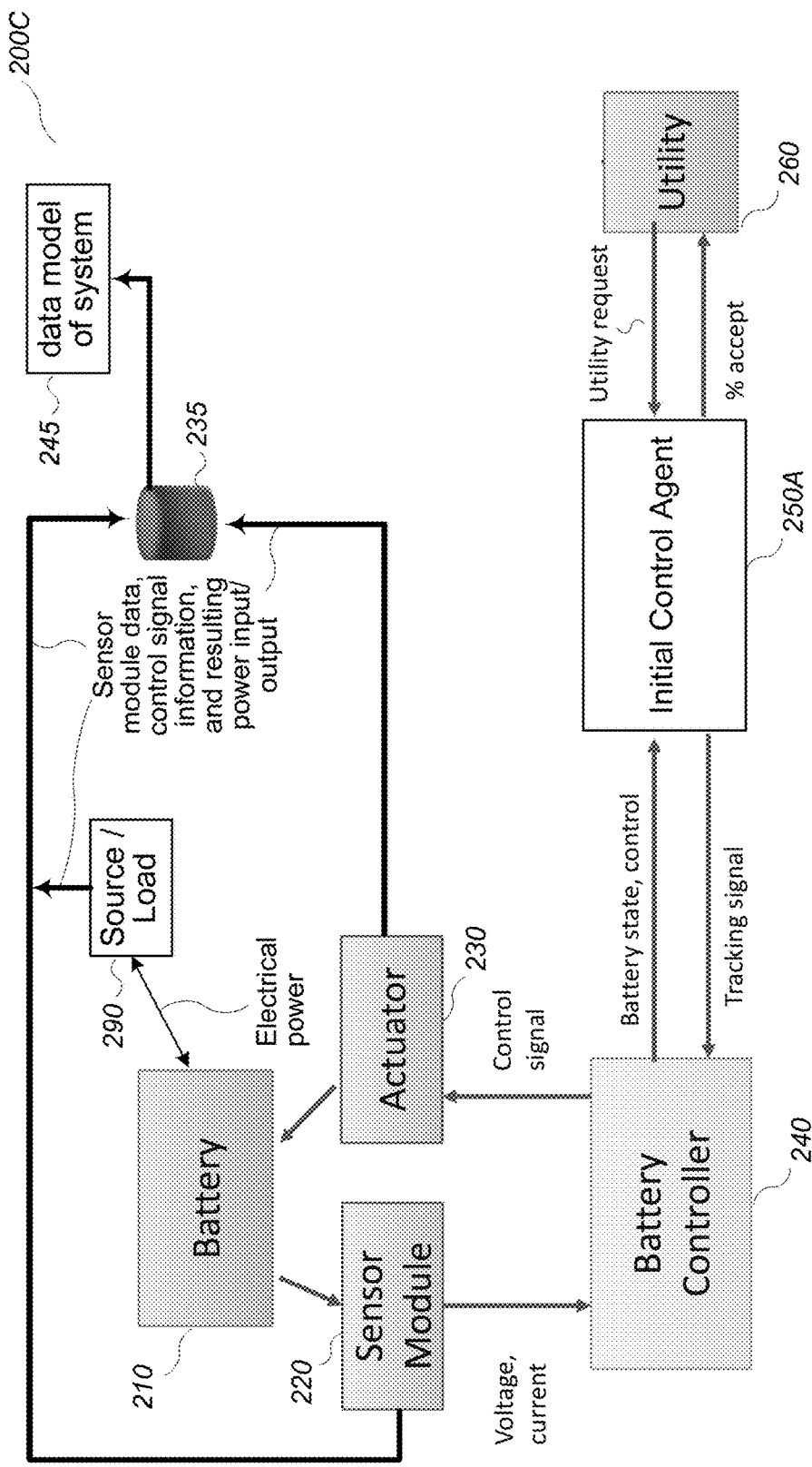

FIG. 2C further illustrates 200C that use of the initial control agent 250A may be used to gather various information 235 in order to build a data model 245 reflecting actual operation of the battery 210. Such information 235 includes, in this example, sensor module data from the one or more sensor modules 220, control signal information and/or resulting actions supplied via the actuator 230 to affect operation of the battery 210, resulting power input and/or output to or from the battery 210 from the one or more sources and/or loads 290, etc.

After the information 235 and data model 245 of FIG. 2C are gathered, FIG. 2D illustrates further information 200D regarding operations of a data tomograph component 270 to produce an updated improved control agent 250D for the battery 210. In particular, as discussed in greater detail with respect to FIG. 1C and elsewhere herein, the tomograph 270 uses the data model 245 to determine differences in actual operation of the battery 210 from that predicted by the absolute and hard rules used for the initial control agent, in order to generate new (or modified) soft rules that reflect those differences. That generated soft rule information is then used to update the initial control agent to produce the improved updated control agent 250D.

Figure 2E:
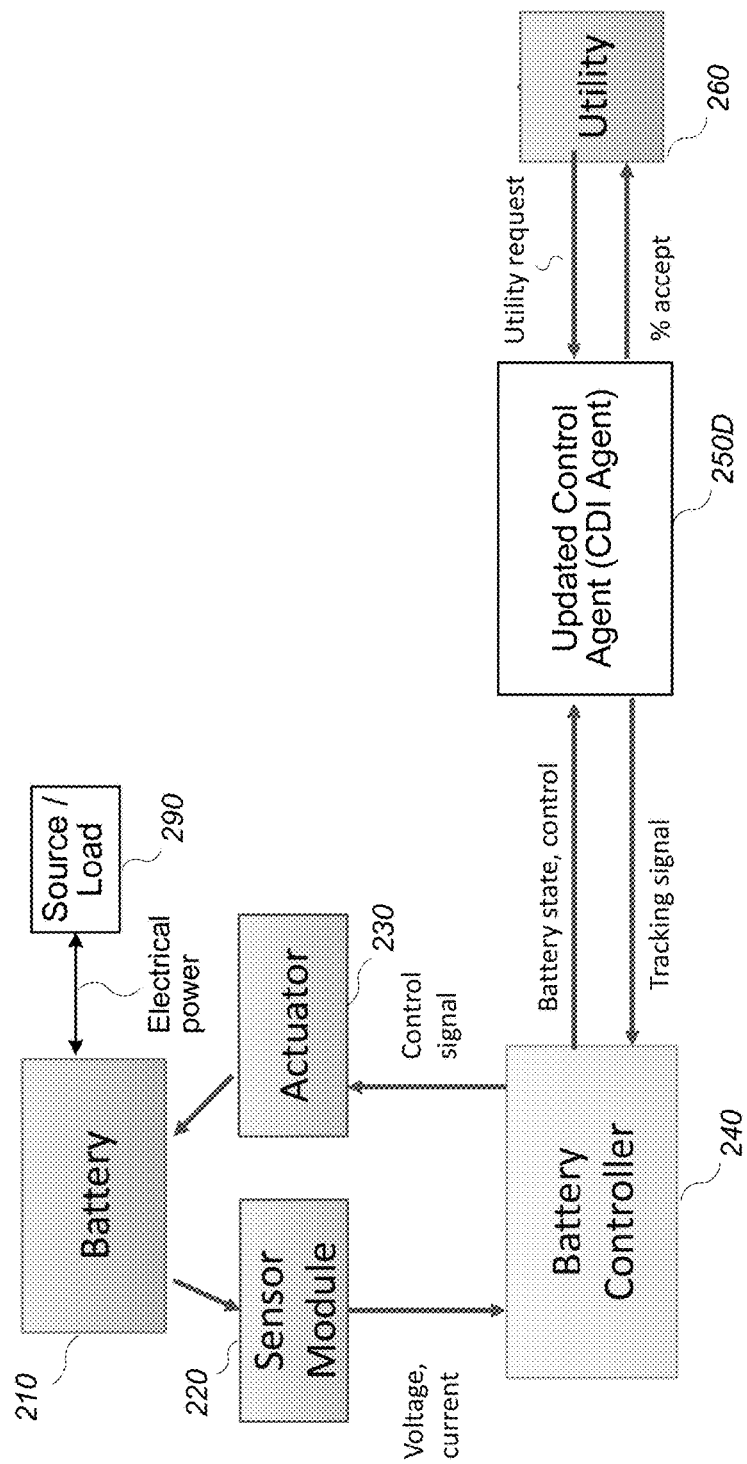
Figure 2F:
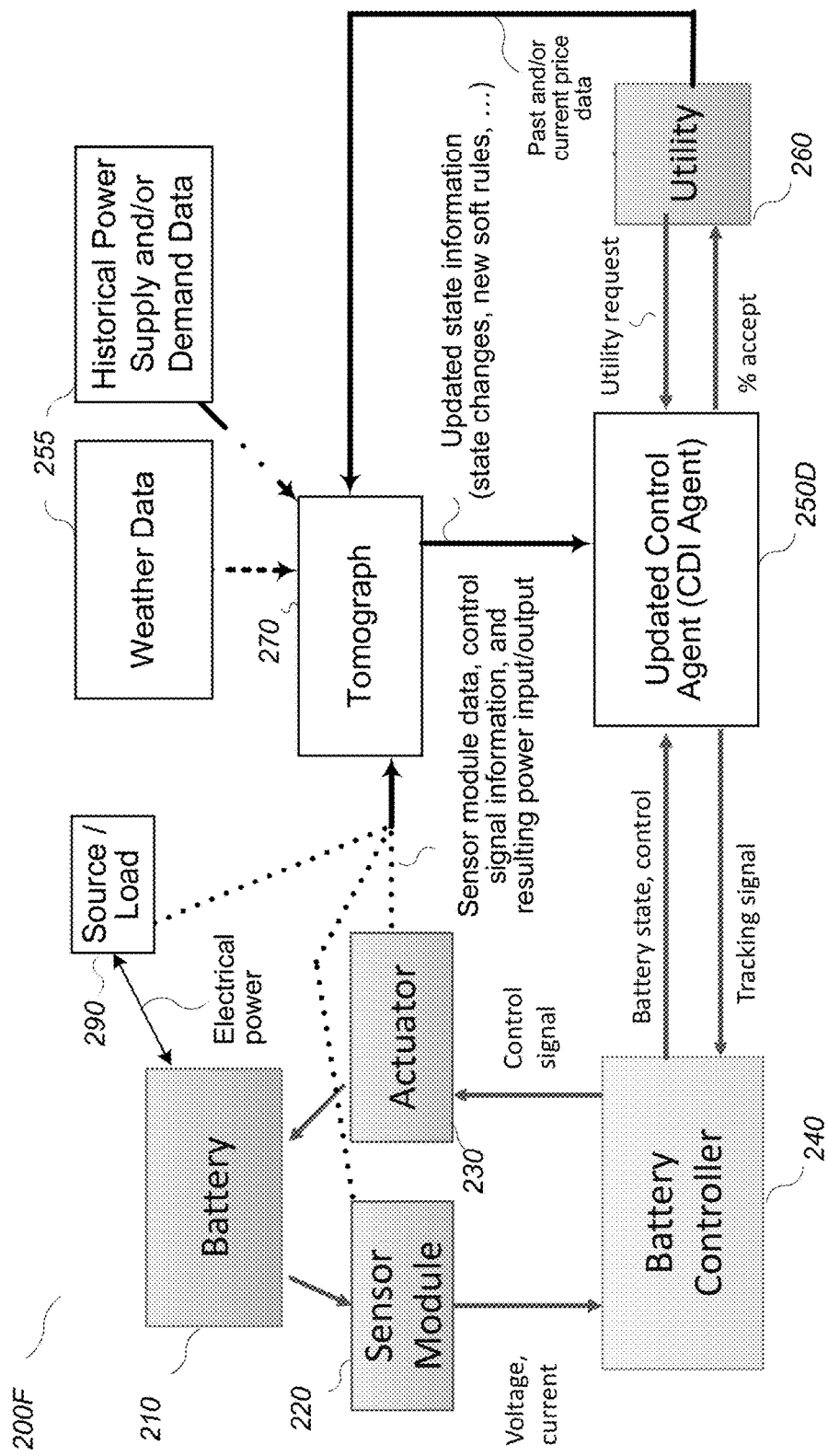

FIG. 2E then illustrates a modified version of the system 200E, in which the updated control agent 250D is now used in place of the initial control agent to control further operations of the battery 210 and other elements of the system 200E. While the operation of the tomograph component in FIG. 2D may be performed only once in some embodiments and situations, such as to learn soft rules that were not supplied by the one or more users 285, in other embodiments the tomograph component may be used in a similar manner multiple times (e.g., periodically, continuously or substantially continuously, etc.), such as to continue to improve the control agent over time (e.g., to structurally adapt the control agent to changes that occur to the system over time, such as the addition and/or removal and/or modification of one or more loads, the addition and/or removal and/or modification of one or more sources, changes to the internal state and operational characteristics of the battery 210, changes to one or more other elements 220 or 230 or 240 or 260, etc.). Thus, FIG. 2F illustrates a modified version of FIG. 2E, in which the system 200F of FIG. 2F includes the tomograph component 270, for use in further updating the control agent 250D at one or more additional times. As noted above, additional data source elements 255 may continue to be provided to allow the tomograph component 270 to obtain and use sensor information of one or more types as part of its operations (e.g., past and/or current weather data, past and/or current price data, past and/or current data about power supply and/or demand, current and voltage and internal temperature data from sensor module(s) 210, information about tracking and/or control signals used as input to control the battery 210, etc.).

FIGS. 2G-2J provide further example data related to the operation of the target system illustrated in FIGS. 2A-2F, and to the actions of the tomograph component 270 in improving the control agent for the target system.

In particular, FIG. 2G illustrates example data 290, such as to reflect a portion of the data 235 that is discussed with respect to FIG. 2C. The data 290 is shown as a table, with each row corresponding to a different time 292e, various columns 292a-292d showing various sensor data and control signal/action information for each time, and other columns 292u-292w showing various system output or results information for each time. It will be appreciated that the data is simplified for the sake of the example, and that various other types of data may be gathered and used in other embodiments and situations, whether in addition to or instead of the illustrated example data. FIG. 2H includes information 296 to illustrate example absolute and hard rules for use with the target system, such as to correspond to some of the rules 280 provided by user(s) 285. In this example, each rule evaluates to true or false depending on an indicated sensor value satisfying an indicated condition. For example, with respect to the first two indicated rules, they have an indicated condition to check whether a value of the Internal_Temp sensor is below a maximum temperature threshold or above a minimum temperature threshold, respectively. Thus, for time E1 (corresponding to row 294-1 of table 290), if Internal_Temp value A1 is below $Temp_{max}$ but not above $Temp_{min}$, then the first rule would evaluate to true and the second rule would evaluate to false. FIG. 2I includes information 297 to illustrate example queries that the tomograph component 270 may perform to determine one or more soft rules, such as by making 3 or more queries regarding values of Voltage_In/Out with different sets of one or more input values, with respect to one or more indicated sensors. The fourth illustrated query is of a different form, to result in a yes or no answer regarding a value of Power_In/Out with an indicated set of one or more input values with respect to one or more indicated sensors. FIG. 2J includes information 298 to provide examples of two soft rules that the tomograph component 270 may learn for the target system, such as to use as part of the updated control agent 250D. The first learned soft rule corresponds to a learned relationship of how the Voltage_In/Out values with the age of the battery, with an associated confidence level represented by probability Q, while the second learned soft rule corresponds to a learned change in the expected battery life, with an associated confidence level represented by probability N. It will be appreciated that the details of FIGS. 2A-2J are not intended to limit the scope of the invention, and are instead provided for illustrative purposes.

Figure 2K:
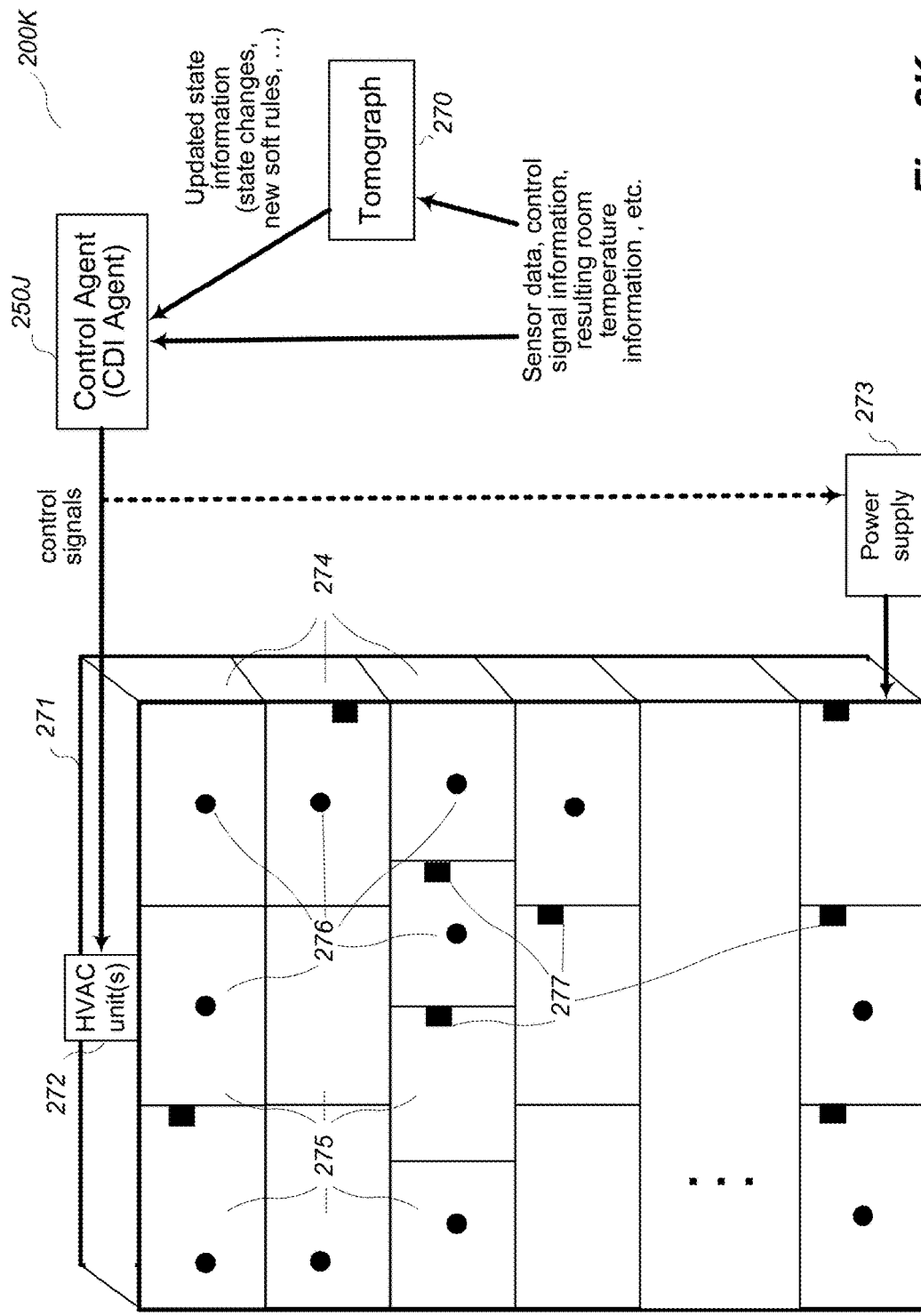
FIG. 2K is a block diagram illustrating example components of an embodiment of a system for performing automated control of DC power from a battery based in part on a state of the battery that is modeled using sensor data.

FIG. 2K includes a block diagram 200K illustrating example components of an embodiment of another target system being automatically controlled by a CDI control agent 250J, such as after a tomograph component 270 has automatically learned soft rules to use in the control agent. In this example, the control agent 250J performs automated operations to control heating and/or cooling of a building 271 via one or more HVAC units 272, such as to satisfy one or more defined goals in light of defined constraints, rules and other criteria that are represented in the control agent. In some embodiments, the automated activities to control the HVAC unit(s) may be performed in a real-time manner and/or to optimize the costs of the heating and/or cooling activities, while maintaining the heating and/or cooling of some or all rooms of the building according to one or more defined criteria (e.g., within a temperature range, to respond to occupant-supplied dynamic requests to increase or decrease the temperature in particular rooms at particular times, etc.).

In the illustrated example of FIG. 2K, the building has multiple floors 274, with each floor having multiple rooms 275. Some rooms have temperature sensors 276 to supply temperature for that room, and some rooms (whether the same or different rooms) may have occupant-selectable instruction boxes 277 to request heating and/or cooling for one or more rooms associated with those instruction boxes. The control agent 250J and/or tomograph 270 receive information from sensors for the target system (e.g., the in-room temperature sensors 276, one or more external temperature sensors, sensors associated with operation of the HVAC unit(s) 272 and/or a power supply 273 for the building, etc.), control signal information supplied from the control agent 250J to the HVAC unit(s) 272 and/or power supply 273, other information about output or results of the target system operation, etc.—while the control agent is illustrated in this example as providing instructions directly to the HVAC unit(s) and/or power supply, in other embodiments the control agent may instead supply control instructions to one or more intermediary systems (e.g., a smart building management system). It will be appreciated that activities similar to those described with respect to FIGS. 2A-2J may similarly be performed for target system 200K, although such details are not illustrated here for the sake of brevity.

Additional example details regarding operation of a tomograph component in at least some embodiments are as follows, although it will be appreciated that some embodiment may perform tomographic techniques in other manners.

The equation below corresponds to a k-th sensor for a target system, as illustrated in diagram 199 of FIG. 1G, and is solved algebraically, iterating over one sensor at a time, to obtain an approximation to the Hamiltonian of the system.

$$\frac{\partial^2 H_i^T}{\partial t \partial p_k} + \sum_j \left( \frac{\partial^2 H_i^T}{\partial x_j \partial p_k} \right)\left( \frac{\partial H_i^T}{\partial p_j} \right) - \left( \frac{\partial^2 H_i^T}{\partial p_j \partial p_k} \right)\left( \frac{\partial H_i^T}{\partial x_j} \right) =$$

$$\left(\frac{\partial \Psi_k(t, x, p)}{\partial x_k}\right)\left(\frac{\partial H_i^T}{\partial p_k}\right) - \dot{Y}_k$$

$$k = 1, \ldots, n$$

where: $Y_k$ is the signal associated with the kth sensor
$H_i^T$ is the data tomograph estimate by the tomograph of the ith agent
Rule Hamiltonian of each agent i includes the absolute, hard and soft rules:

$$H_R(x, p, u) = H_A(x, p, u) + \sum_j \lambda_j \phi_j(x, p, u)$$

If the Hamiltonian $H_R$ is complete, then $$\begin{bmatrix} 1. \ \phi_j(x, p, u) = 0 \text{ and} \\ 2. \ [\phi_j, H_R] = 0, \text{ for each potential } j \end{bmatrix} \Rightarrow \text{Rule Potential Conditions}$$

$$[\phi_j, H_R] = \frac{\partial \phi_j}{\partial x}\frac{\partial H_R}{\partial p} - \frac{\partial \phi_j}{\partial p}\frac{\partial H_R}{\partial x} \Leftarrow \text{Poisson Bracket}$$

If 2 is not satisfied, $$[\phi_j, H_R] \neq 0$$

Then $H_R$ is not complete, and its completion needs to be determined by a REPAIR PROCESS from sensory signals and data from other agents via Tomograph Dynamics Lemma: Given a Domain (e.g. SBIR) characterized a set of potentials $\{\phi_i(x, p, u)=0, i=1, \ldots n\}$ corresponding to a set of rules $\{r_i(x, p, u), i<1, \ldots m\}$. Let $G(x,u)=0$ be the potential associated with a query $g(x,u)$.
then we can find a resolution to g with respect to $\{r_i(x, p,u), i=1, \ldots n\}$
if and only if $$G(x, u) = \sum_{i=1}^{n} g_i(x, p, u)\phi_i(x, p, u)$$

(convex combination of potentials=query)
where $\{g_i(x, p, u)=0, i=1, \ldots n\}$ are continuous differentiable functions of the domain variables.
A resolution is a set of values of the variables in the query that staisfies the rules pf the domain
THEOREM 1
A comleted Hamiltonian must satisfy the tomographic condition,
$[\phi_j, H_R]+[\phi_j, H_T]=0$ j=1, \ldots, n, n the number of active rules where
$H_T$ is the tomographic completion $$H_R(x, p, u) = H_A(x, p, u) + \sum_j \lambda_j \phi_j(x, p, u) \text{ and } [\phi_j, H_R + H_T] = 0, j = 1, \ldots, n$$

The theorem above provides structural adaptation requirement for sensory data. From the tomographic condition, a structural observability condition can be derived to ensure that enough sensory information is available.

Let $Y_k(t)$ be the vector sensor signal generated by the kth sensor:
$Y_k(t)=\Psi_k(t, x, p)$ where $\Psi_k$ is the model of the sensor
THEOREM 2
$H_R+H_T$ must satisfy the sensor completion tomographic condition, $$\dot{Y}_k(t)=[\Psi_k, H_R]+[\Psi_k, H_T]$$

for all the sensor k, k=1, \ldots, $K_i$, of each agent i simultaneously.
COROLLARY
Structural observability corresponds to a unique solution for $H_T$.
In general, structural observability is only achieved in a relaxed sense, e.g., minimum least squares.
In general, the quality and speed of convergence of the tomographic equation increases with the number of independent sensory signals. The algorithm for implementing the tomograph is based on an application of inverse model methods.
Let $Y_k(t)$ be the vector sensor signal generated by the kth sensor:
$Y_k(t)=\Psi_k(t, x, p)$ where $\Psi_k$ is the model of the sensor, and $H_{T,k}$ is its Hamiltonian form $$\left(H_{T,k} = p_k^T \frac{\partial \Psi_k}{\partial x}\frac{\partial H_R}{\partial p} - p_k^T \frac{\partial H_R}{\partial x}\right)$$

THEOREM 3
Let $H_{k-1}=H_R+H_T^{k-1}$ satisfy the sensor completion tomographic condition for the first k–1 sensors with the "round robin condition" k=0 mod L
L=number of sensors, then the kth completion satisfies, $$\dot{Y}_k(t)=[\Psi_k, H_{K-1}]+[\Psi_k, H_{T,k}]$$

$$H_T^k = H_T^{k-1} + H_{T,k}$$

for each sensor k, k=0 mod L
The iterative procedure of theorem 3 can be implemented algebraically with a Segal, Dirac procedure.
Let $Y_k(t)$ be the vector sensor signal generated by the kth sensor:
$Y_k(t)=\Psi_k(t, x, p)$ where $\Psi_k$ is the model of the sensor
THEOREM 4
Let $H_{k-1}=H_R+H_{R,T}^{k-1}+H_T^{k-1}$ satisfy the sensor completion tomographic condition for the first k–1 sensors with the "round robin condition" k=0 mod L
L=number of sensors, then the kth completion satisfies, $$\left.\begin{array}{l}\dot{Y}_k(t) = [\Psi_k, H_{k-1}] + [\Psi_k, H_{T,k}] + [\Psi_k, H_{R,T}^{k-1}] \\ H_T^k = H_T^{k-1} + H_{T,k} + H_{R,T}^k \end{array}\right] \Leftarrow \text{repair condition}$$

for each sensor k, k=0 mod L,
where $HR_{R,T}^k$ is the Hamiltonian of sensor k, that minimizes the entropy introduced by the sensor
Further example details regarding operation of a tomograph component in at least some embodiments are as follows:
The operations and functionality of the data tomograph component described herein can be analogized to a tomograph approach that is used in imaging (e.g., X-rays, MRIs, etc.). As an example, consider constructing an image of a knee (for surgery). Several signals, or probes, are passed through the knee and the image is reconstructed from the density information associated with each signal. In the data tomograph component described herein, queries are submitted to obtain information, and the results of the queries are used to construct a data Hamiltonian function (also referred to herein as merely a "Hamiltonian") for the target system under investigation. For example, one query may be how many men experienced pain in the knee. Another query may be the age of patients who had knee surgery. Another query may be in regard to recovery time. The constructed data Hamiltonian is local to a region of interest, analogous to the way the image of a knee is local, and does not provide information about the shoulder or hip or other parts of the body. In some situations, a global Hamiltonian for the entire data set may not exist, however local Hamiltonians can be constructed with reference to the queries.

The described creation and learning of a data Hamiltonian combines inductive and deductive strategies in at least some embodiments. The deductive strategy presupposes properties of the data that are valid in the strong sense; they characterize these properties as logic rules (binary true/false rules). These logic rules are of two types, absolute rules that characterize what is generally valid in the data, and hard rules which are logic rules that characterize the particular methods for extracting desired information from the data. These rules may be historically valid, and can be used to construct an initial Hamiltonian.

The inductive strategy is characterized by a set of rules which have a truth evaluation between totally false (0) and totally true (1). These are called soft rules with values in the [0, 1] interval. Soft rules may have an additional element that depends on the data, called a threshold. The threshold is a function of the data associated with a rule that determines the truth evaluation of a query. The composition of absolute and hard rules determines a data encoding structure called a data Hamiltonian. The data Hamiltonian shares many properties with Hamiltonian physics, such as propagation mechanisms, positivity properties, correlation between data components, monotonicity, etc. The data Hamiltonian structure is a functional form of the variables characterizing the data domain, the variability of the data in the data domain (data momentum) and the modification parameters of the data domain.

For heterogeneous data, it can be useful to construct a separate Hamiltonian structure for each class of data (classes are not necessarily disjoint). For characterizing the overall data universe with a single data structure, an aggregated structure called the mean field Hamiltonian is constructed.

Soft rules are learned by extracting data via a learning algorithm that constructs a Hamiltonian structure: this component is called the data tomograph component. The data tomograph works as follows. For a given query on the data, it generates an answer (an empty answer is a possibility) by first generating a set of queries that act as probes on the particular data class associated with the initial query. The set of queries and associated responses (pairs of inputs and outputs) are used by the data tomograph to construct (or update) a functional structure from the responses to the set of queries. The Hamiltonian associated with the particular query may be approximated by splines or piecewise polynomials. The data tomograph generates soft rules associated with a particular query (or goal). The portion of the Hamiltonian that is only accessible from soft rules is called the soft tomograph.

The total Hamiltonian associated with a particular aspect of the data is the sum of the data Hamiltonians on that class and the rule-based Hamiltonians, including an absolute Hamiltonian constructed from the absolute rules, a hard Hamiltonian constructed from the hard rules, and a soft Hamiltonian constructed from the data extraction. This total Hamiltonian characterizes the data class.

Another aspect of the data tomograph is a set of conditions that indicate if the queries generated by the tomograph are providing new information, or if there is enough information and no more queries are needed. When the conditions are satisfied, then the Hamiltonian provides a close approximation, and no more soft rules are constructed. When the conditions are not yet satisfied, then the Hamiltonian is refined, or learned, by propagating the sensor equation associated with the particular query and adding more input-output pairs as needed for the specific data class.

Encoding data in a Hamiltonian structure has an advantage from other methods where cross correlation of data is important. The cross correlation of data from one data class and other data classes is mediated by interaction between the Hamiltonian of a class and the mean field Hamiltonian, rather than between direct correlation of the data Hamiltonian of a class with the Hamiltonians of the other classes. This approach provides polynomic complexity for such cross correlation. The quality of the cross correlation answers is determined solely by the iteration error allowed for the cross correlation computation (quantization error). This is also true for inference of a query across multiple data classes.

The described techniques are applicable to dynamic data, to data with high levels of uncertainty, to high dimensional data, to cross correlated data, etc., with low complexity computation (second order polynomic computation).

Learning, or inferencing from data, with the described techniques is based on generating convergent trajectories of data towards an answer that minimizes relative entropy. It approximates answers as a function of entropy reduction by assigning values (numeric or otherwise) as appropriate to the variables of the query relative to the data.

The characteristic dynamics of many complex systems, and especially systems involving computational processes (algorithms), are not easily modeled with traditional mathematical constraints. The use of the data tomograph component allows extraction of the dynamics of a system based on sensory data and rules, enabling the system to learn and adapt to changing environmental conditions in an optimal manner, referred to herein at times as structural adaptation.

The data tomograph component operation works in two ways. First, it converts a sensory signal into a Hamiltonian, and second, it extracts rules from a sensory signal, which can then be used in the Hamiltonian of the system. The tomograph provides structural adaptation of the dynamics of the system based on updated data and updated rules. The rules are soft rules that are able to quantify behavior. In this way, the tomograph enables a meta-control methodology to learn and update the Hamiltonian as the environment changes. In the reverse way, the tomograph can extract soft rules and thus provide the user with an understanding of the system as it evolves. The tomograph is a real-time system that learns the structure of the system (structural adaptation) and is able to discover and modify soft rules.

To extract rules from sensory data, the tomograph "excites" the data associated with a goal. The domain dynamics observed via a sensor associated with the excitation goal generates extracted observable data that feeds a propagator of a Hamiltonian associated with existing rules (in the Knowledge Base) and the new data. FIG. 1C illustrates how the tomograph generates soft rules.

The Hamiltonian propagator of FIG. 1C generates the total Hamiltonian of the domain associated with the excitation-sensor pair. The total Hamiltonian, including the rules and the observed data, is $$H^T(x,p,u,t).$$

and is generated by the propagator. It is additively decomposable into two Hamiltonians: the rule-based Hamiltonian $$H_0(x,p,u,t).$$

and the Hamiltonian associated with the extracted data $$H^S(x,p,u,t).$$

Thus we have $$H^T(x,p,u,t) = H_0(x,p,u,t) + H^S(x,p,u,t).$$

However for the purposes of the tomograph, we rewrite it as, $$H^S(x,p,u,t) = H^T(x,p,u,t) - H_0(x,p,u,t).$$

We know the total Hamiltonian and the rule-based Hamiltonian, so we can determine the Hamiltonian associated with the extracted data. The potential Hamiltonian represents a soft rule, which is determined by solving $$\ln(P_k(t,x,p) - \text{threshold}) = H^S(x,p,u,t)$$

to obtain the corresponding soft rule $$P_k(t,x,p) = \text{threshold} + e^{H^S(x,p,u,t)}$$

associated with the data measured by the $k^{th}$ sensor.

Figure 1D:
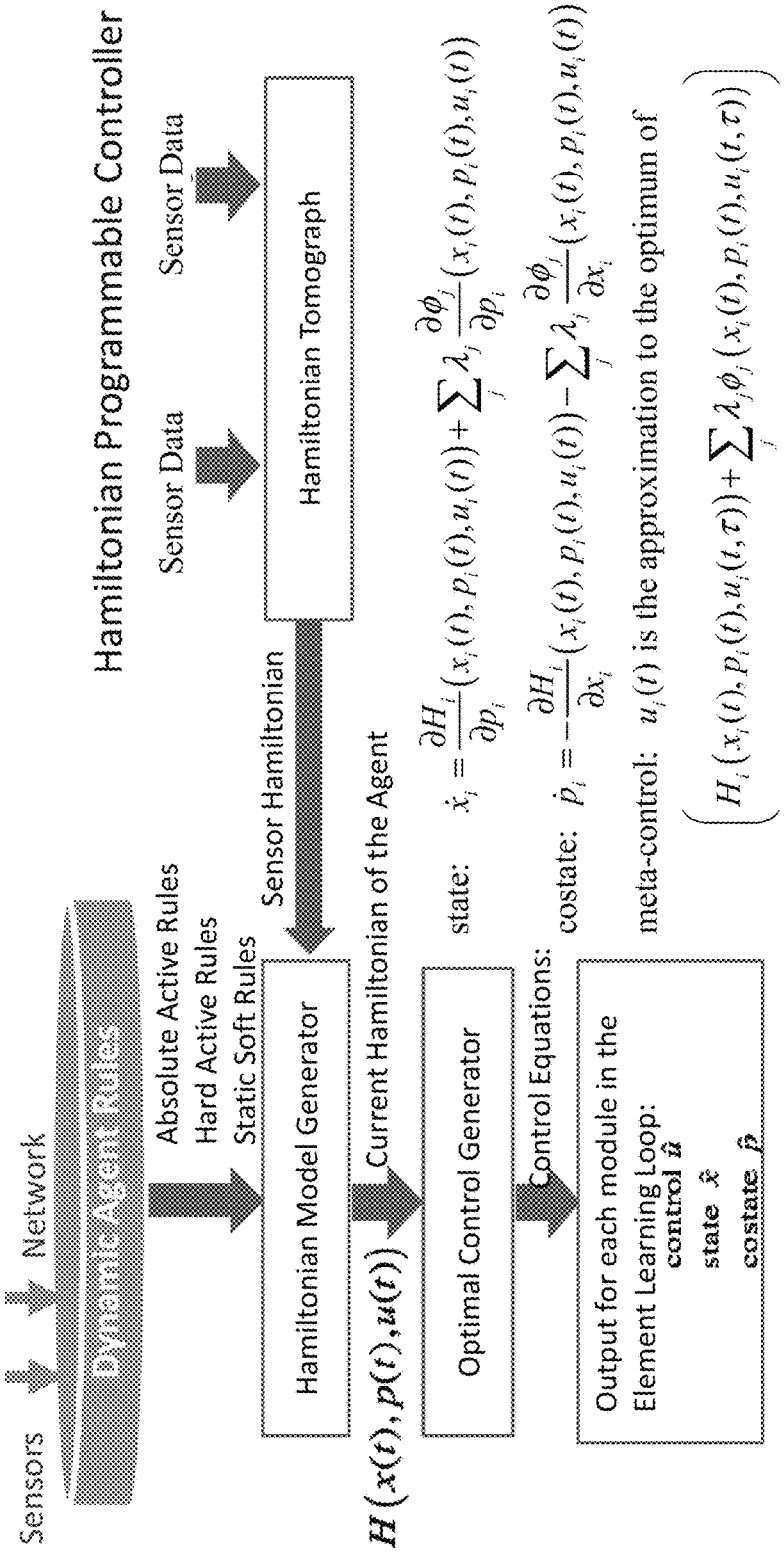
FIG. 1D is a flow diagram illustrating how tomographic techniques may be used to generate and add soft rules and other information to a data Hamiltonian function based on sensor data for a corresponding target system.
Figure 1E:
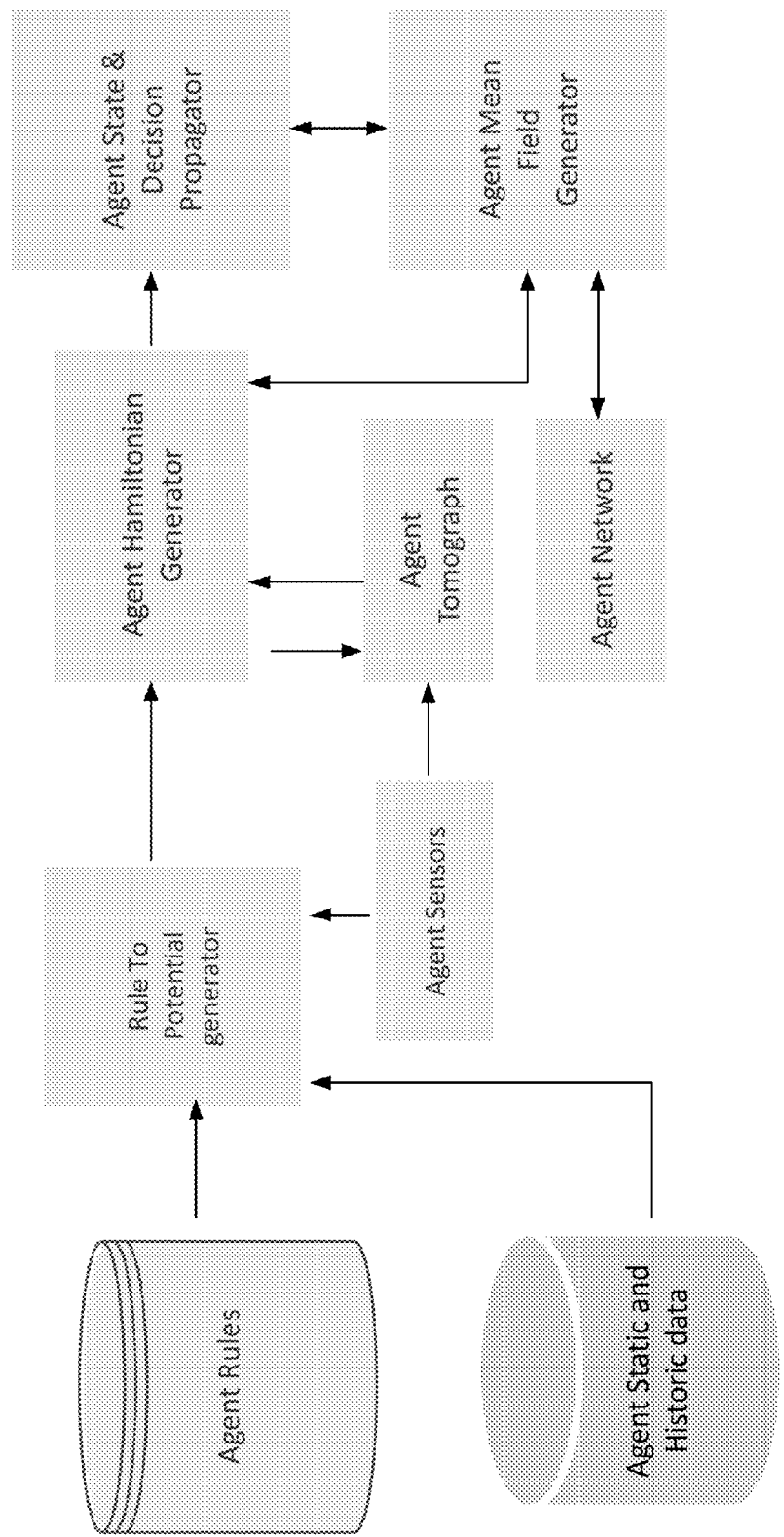
FIG. 1E is a block diagram illustrating an example of an agent architecture overview of a system that uses tomographic techniques to correct or otherwise complete information missing from a partially known state of a target system.
Figure 1F:
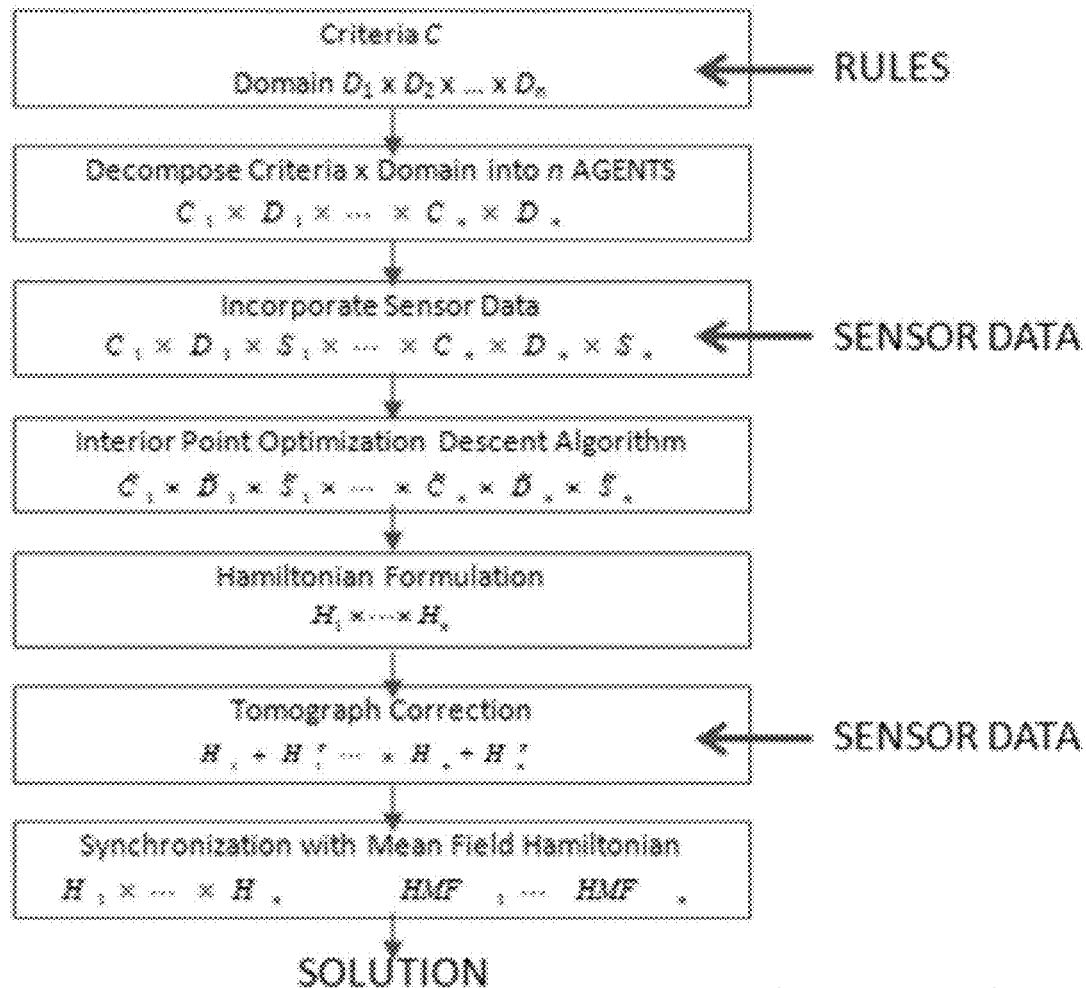
FIG. 1F is a flow diagram illustrating examples of using tomographic techniques to correct or otherwise complete information missing from a partially known state of a target system.
Figure 1G:
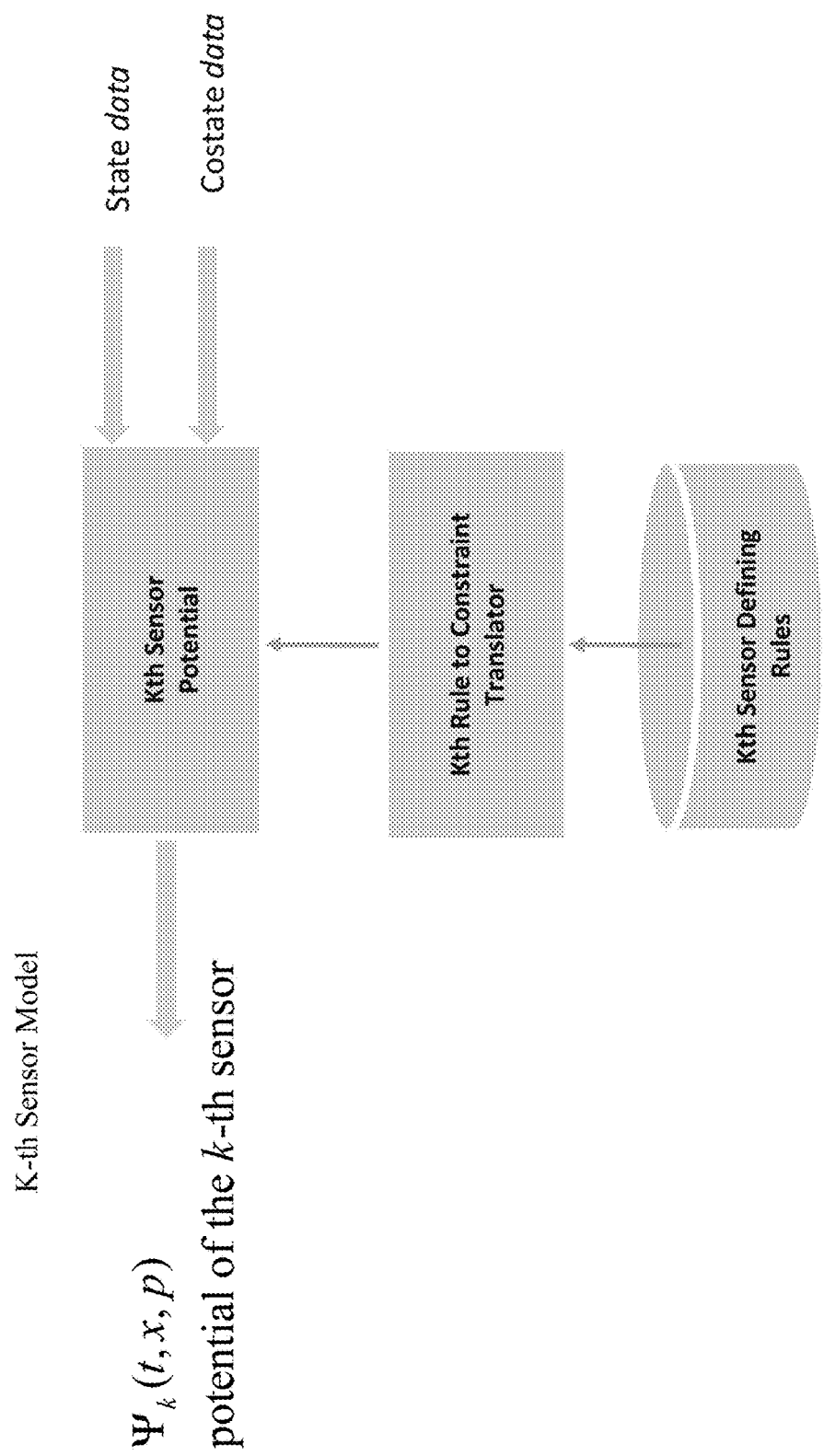
FIG. 1G is a block diagram illustrating operations involving an example sensor of a target system.

The $k^{th}$ sensor model, including data sources and rules, is depicted in FIG. 1G. The $k^{th}$ sensor is characterized by a set of rules that depend on the excitation used to force the data to generate the sensor signal, $Y_k(t, x, p)$, as a function of algorithmic time. The data history of the sensory data generated by the given excitation drives the total Hamiltonian propagator equation.

The following propagator is a hyperbolic equation on the total Hamiltonian of the system as it relates to the $k^{th}$ sensor signal, $$\frac{\partial^2 H_i^T}{\partial t \partial p_k} + \sum_j \left(\frac{\partial^2 H_i^T}{\partial x_j \partial p_k}\right)\left(\frac{\partial H_i^T}{\partial p_k}\right) - \left(\frac{\partial^2 H_i^T}{\partial p_j \partial p_k}\right)\left(\frac{\partial H_i^T}{\partial x_j}\right) =$$

$$\left(\frac{\partial \Psi_k(t, x, p)}{\partial x_k}\right)\left(\frac{\partial H_i^T}{\partial p_k}\right) - Y_k$$

for k=1, n, where $Y_k$ is the signal associated with the $k^{th}$ sensor, and $H_i^T$ is the data tomograph estimate by the tomograph of the ith agent.

Solving this equation (in real-time) gives an estimate of the total Hamiltonian. The state and costate trajectories are generated from the corresponding Hamilton-Jacobi equations. The rule Hamiltonian of each agent i includes the absolute, hard and soft rules:

$$H_R(x, p, u) = H_A(x, p, u) + \sum_j \lambda_j \phi_j(x, p, u)$$

where $H_A(x, p, u)$ is the Hamiltonian for the absolute rules, and each soft rule is encoded into its potential function $\phi_j(x, p, u)$ It is possible that a given sensor will not generate a modification to its Hamiltonian, either because the excitation does not produce a signal, or the signal produced is fully compatible with the total Hamiltonian (i.e., the sensor does not provide new information). If the signal is fully compatible, then we say the Hamiltonian is complete. If the rule Hamiltonian is complete, then the following two conditions are satisfied for each potential j:

$$\phi_j(x,p,u) = 0, \text{ and} \quad (1)$$

$$[\phi_j(x,p,u), H_R(x,p,u)] = 0. \quad (2)$$

These are called the rule potential conditions. The Poisson bracket is given by $$[\phi_j(x, p, u), H_R(x, p, u)] =$$

$$\frac{\partial \phi_j(x, p, u)}{\partial x}\frac{\partial H_R(x, p, u)}{\partial p} - \frac{\partial \phi_j(x, p, u)}{\partial p}\frac{\partial H_R(x, p, u)}{\partial x}.$$

If condition (2) is not satisfied, that is, if $[\phi_j(x, p, u), H_R(x, p, u)] \neq 0$ for at least one j, then $H_R$ is not complete, and its completion needs to be determined by a repair process that uses sensory signals and data from other agents via dynamics.

The following condition is numerically testable to decide whether the repair process is needed, or if the current Hamiltonian is complete.

Condition (3): Given a domain characterized by a set of potentials $\phi_{i(x, p, u)} = 0$, i=1, ..., n that correspond to a set of rules $\{r_i(x, p, u) = 0, i = 1, ..., n\}$. Let $G(x,u) = 0$ be the potential associated with a query $g(x,u)$. Then we can find a resolution to the query with respect to the set of rules $\{r_1(x, p, u) = 0, i=1, ..., n\}$ if and only if a convex combination of potentials equals the query, i.e., $$G(x, u) = \sum_{i=1}^{n} g_i(x, p, u)\phi_i(x, p, u)$$

where the functions $g_i(x, p, u) = 0$, i=1, ..., n are continuous differential functions of the domain variables.

If Condition (3) is numerically satisfied, then a resolution, that is, a set of values of the variables in the query that satisfies the rules of the domain, exists, and the rule Hamiltonian generated by the data tomograph is complete.

Even when the rule Hamiltonian is complete, it should also be compatible with existing rules. For the new data to be compatible with the existing rules, the following condition justifies the semantic generation of modifications to the total Hamiltonian via sensory data. It also provides structural adaptation for sensory data and rules. From the tomograph condition, the completed Hamiltonian is computable given the potentials and rules. A structural observability condition can be derived to ensure enough sensory information for a complete Hamiltonian.

Condition (4): A completed Hamiltonian satisfies the tomograph condition, $$[\phi_j(x,p,u), H_R(x,p,u)] + [\phi_j(x,p,u), H_T(x,p,u)] = 0$$

for j=1, ..., n, where $H_T$ is the completed Hamiltonian, $H_R(x,p,u) = H_A(x, p, u) + \Sigma \lambda_j \phi_j(x, p, u)$, and $[\phi_j(x, p, u), H_R + H_T] = 0$ for j=1, ..., n.

When the conditions are not met, then a new Hamiltonian is constructed, or learned, from the new information. Structural adaptation of the Hamiltonian is achieved by extracting information from data as described here. Let $Y_k(t)$ be the vector sensor signal generated by the kth sensor. Then we have $$Y_k(t)=\Psi_k(t,x,p)$$

where $\Psi_k(t, x, p)$ is the model of the sensor. The following conditions provide a relationship between the sensory data and structural observability. The algorithm for implementing the tomograph is based on an application of inverse model methods. In general, the quality and speed of convergence to solve for the Hamiltonian with the tomograph increase with the number of independent sensory signals.

Condition (5). $H_R(x, p, u)+H_T(x, p, u)$ satisfy the sensor completion condition, $$\dot{Y}_k(t)=[\Psi_k, H_R]+[\Psi_k, H_T]$$

for all of the sensors, k=1, . . . , $K_i$ of each agent i simultaneously.

Structural observability corresponds to a unique solution for $H_T$. In general, structural observability is only achieved in a relaxed sense.

Now, given a vector sensor signal Y_k(t), and a model of the sensor $\Psi_k(t, x, p)$ with $$Y_k(t)=\Psi_k(t,x,p)$$

the associated Hamiltonian, denoted $H_{T,k}$, has the form $$H_{T,k} = p_k^T \frac{\partial \Psi_k}{\partial x} \frac{\partial H_R}{\partial p} - p_k^T \frac{\partial H_R}{\partial x}.$$

The following iterative procedure provides a numerical implementation for structural adaptation. The procedure and notation are based on the Dirac theory for constrained Hamiltonians.

Structural adaptation procedure 1. Let $H_{k-1}=H_R+H_T^{k-1}$ satisfy the sensor completion condition for the first k−1 sensors with the "round robin condition" k=0 mod L, where L is the number of sensors. Then the kth completion satisfies, $$\dot{Y}_k(t)=[\Psi_k, H_{k-1}]+[\Psi_k, H_{T,k}]$$

where $H_T^k=H_T^{k-1}+H_{T,k}$ for each sensor k, with k=0 mod L.

The next following establishes an iterative procedure for incorporating many sensor signals in the Hamiltonian to guarantee that multiple sensors for a given agent are compatible with each other. Note that a repair condition also provides completion.

Structural adaptation procedure 2. Let $H_{k-1}=H_R+H_{R,T}^{k-1}+H_T^{k-1}$ satisfy the sensor completion condition for the first k−1 sensors with the "round robin" k=0 mod L, where L is the number of sensors. Then the kth completion satisfies the repair condition, $$\dot{Y}_k(t)=[\Psi_k, H_{k-1}]+[\Psi_k, H_{T,k}]+[\Psi_k, H_{R,T}^{k-1}]$$

where $H_T^k=H_T^{k-1}+H_{T,k}+H_{R,T}^k$ for each sensor k, with k=0 mod L, and where $H_{R,T}^k$ is the Hamiltonian of sensor k that minimizes the entropy introduced by the sensor.

Figure 10:
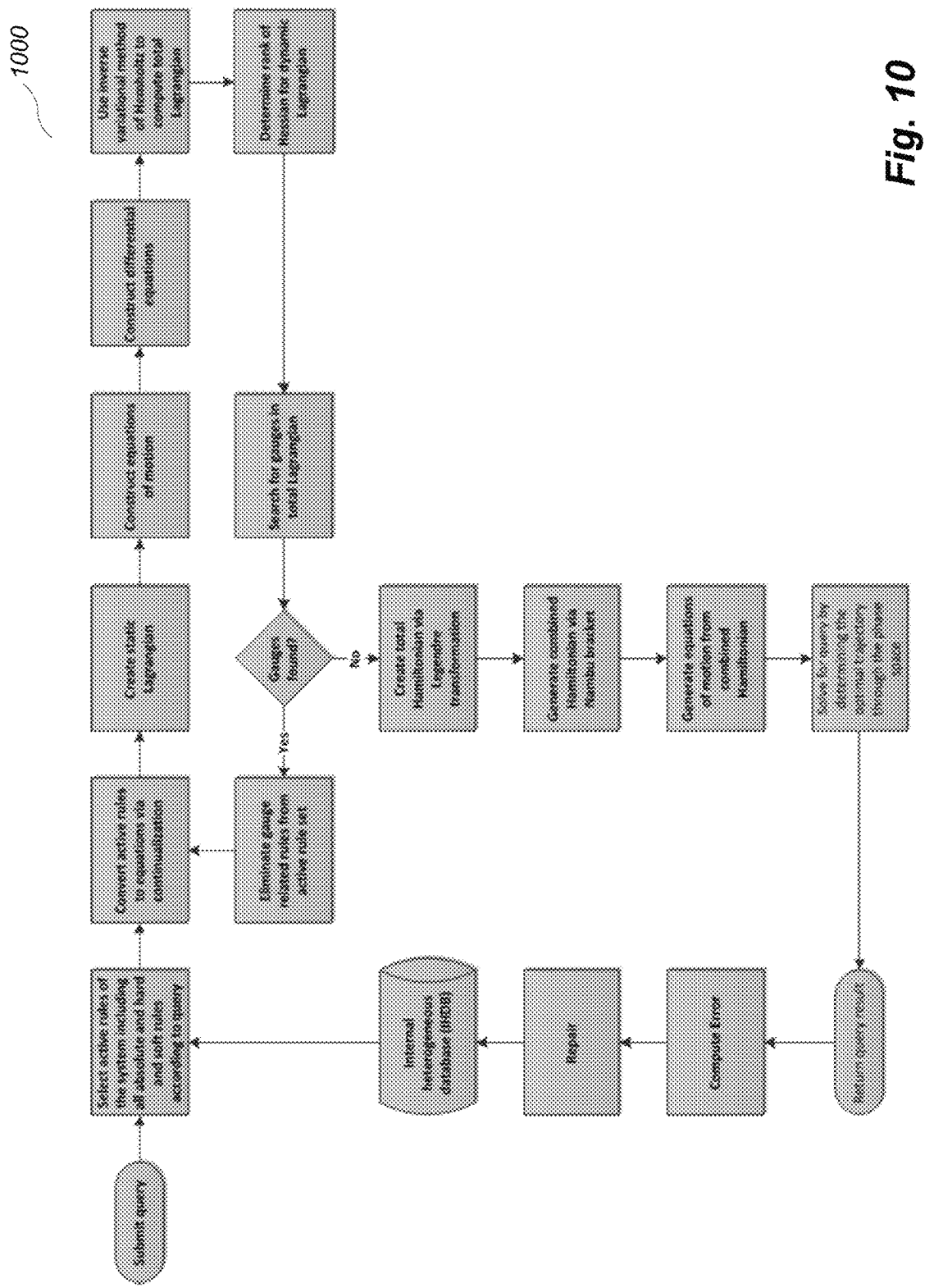
FIG. 10 is a flow diagram illustrating operation of an embodiment of an automated control system including a tomograph component implemented as part of a state information repair procedure.
Figure 11:
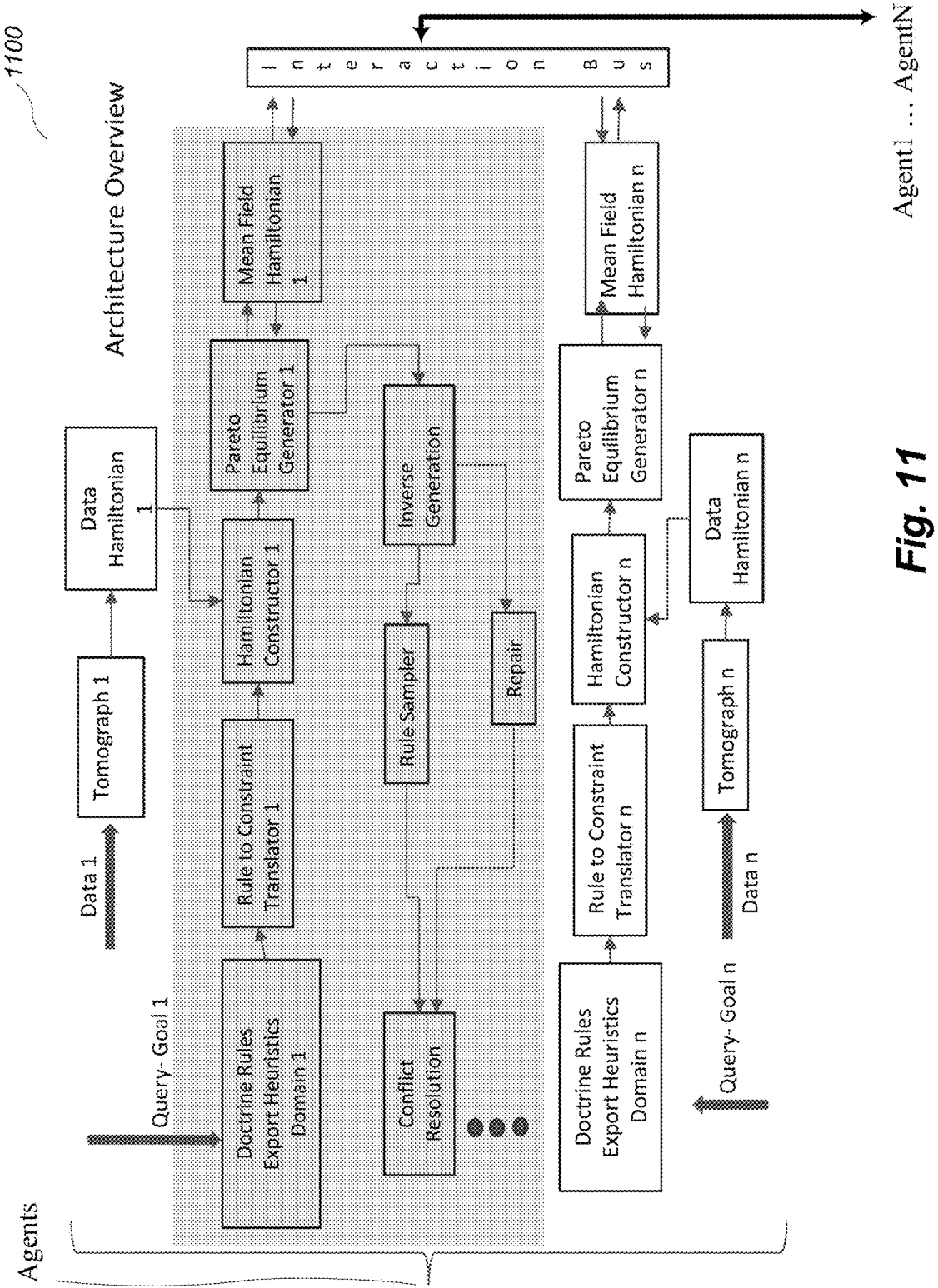
FIG. 11 is a block diagram illustrating an example embodiment of a distributed automated control system having multiple tomograph components each associated with one of multiple separate components of an underlying target system.

In addition to the details of FIGS. 1C and 1G, FIG. 1D illustrates an example flow diagram and additional information 196 that indicates how tomographic techniques may be used to generate and add soft rules and other information to a data Hamiltonian based on sensor data for a corresponding target system. FIG. 1E further illustrates an example block diagram 197 illustrating an example of an agent architecture overview of a system that uses tomographic techniques to correct or otherwise complete information missing from a partially known state of a target system. In addition, FIG. 1F illustrates an example flow and additional information 198 that indicates how rules and other state information of a CDD system may be optimized when a Hamiltonian representing a corresponding target system is only partially known, including by using a tomograph to correct or otherwise complete information missing from the partially known state. FIG. 10 further illustrates a high-level flow 1000 of operation of an embodiment of the CDD system, in which a tomograph component's activities may be implemented as part of the indicated repair procedure. FIG. 11 illustrates a block diagram 1100 with further example details of use of multiple tomograph components that are each associated with one of N CDI agents in a distributed CDD system embodiment.

The described techniques involving the use of tomographic techniques may provide a variety of benefits and advantages. Non-exclusive examples of such benefits and advantages include the following: improving how a current state of a target system is modeled, such as to generate a function and/or or structure that models internal operations of the target system rather than merely attempting to estimate target system output from input without understanding the internal structure and operations of the target system; increasing capabilities for handling uncertainty management and/or optimal dispatch and commitment and/or anomaly detection and response; performing structural adaptation to automatically learn new soft rules corresponding to changes in a target system; etc.

In addition, with respect to the embodiments in which power output of a battery is controlled on the DC side (e.g., by varying DC current and voltage of the battery), benefits and advantages of the describe techniques include allowing the battery to operate in its optimal or near-optimal physical state with respect to internal temperature and/or other battery parameters (e.g., by maintaining an internal chemistry of the battery within one or more chemical stoichiometric limits, such as a stoichiometric range), rather than fixing AC (alternating current) voltage and/or current being provided by an inverter connected to the battery at a single specified level, and forcing the battery to operate at a saturation level that provides maximum power but at the cost of possible non-reversible battery damage—in this manner, battery longevity and other operational performance may be optimized or otherwise enhanced by the described techniques, by allowing the battery to operate in a preferred range in which battery chemistry changes are reversible and in which short-circuits and other non-reversible damage is reduced or eliminated, in light of battery state information generated at least in part by tomographic techniques as describe herein. In addition, in at least some embodiments, the automated control of the battery may further include active control of the battery to enhance and maintain power output amount resonance with the other components (e.g., a load and/or an external power grid), such that the amount of power provided does not exceed what is needed, while also satisfying at least a defined percentage or other amount of power output requests or load amounts (e.g., 50%, 65%, 100% or any other defined percentage or other amount). In this manner, such embodiments may be conceptualized as an automated control system to manage the internal state and operational performance (including longevity) of a battery being controlled, while satisfying power output requests if possible, rather than existing systems that fix the output voltage or current of a battery and fulfill all power requests even if it causes battery damage or other problems (e.g., excessive heating). While the benefits and operations discussed above and in some other locations herein relate to controlling power being output from a battery, it will be appreciated that the same techniques may be used to control power being stored into a battery from one or more sources, so as to cause the battery to operate in its optimal or near-optimal physical state with respect to heat and other battery parameters while storing power, and to optimize or otherwise enhance battery longevity and other operational performance by allowing the battery to operate in a preferred range in which battery chemistry changes are reversible, while satisfying at least a defined percentage or other amount of power input requests (e.g., 50%, 65%, 100% or any other defined percentage or other amount) for power being supplied by one or more sources. Additional benefits and advantages include the following, with the term 'optimizing' a feature or result as used herein meaning generally improving that feature or result (e.g., via partial or full optimization), and with the term 'real-time' as used herein meaning with respect to a time frame (e.g., fractions of a second, seconds, minutes, etc.) specific to a resulting component or system being controlled, unless otherwise indicated:

- can improve battery lifetime by optimizing DC control variables, such as I (current), V (voltage) and R (amount of power being output)
- can improve battery lifetime by optimizing DC control variables (I, V, R) in conjunction with a prior characterization of battery chemistry, and can optimize at DC level to improve performance and longevity
- can optimize variables in real-time in DC domain to solve for objectives in AC phase
- can optimize AC output in real-time to match grid frequency resulting in resonant operation, such as via control of only battery output and no other grid components
- can improve charge/discharge cycles to improve long-term battery availability
- can improve AC load response
- can improve AC load response in combination with improving long-term battery availability
- battery controller can run as embedded software on a processor in a self-sufficient manner
- battery controller can be monitored and updated continuously from external location (e.g., the cloud or other network-accessible location)
- battery controller can transmit battery characteristics to improve performance
- can avoid expenses of static bar compensator hardware Various other benefits and advantages may be further realized in at least some embodiments, as discussed in part in greater detail below. For illustrative purposes, some additional details are included below regarding some embodiments in which specific types of operations are performed in specific manners, including with respect to particular types of target systems and for particular types of control activities determined in particular manners. These examples are provided for illustrative purposes and are simplified for the sake of brevity, and the inventive techniques may be used in a wide variety of other situations, including in other environments and with other types of automated control action determination techniques, some of which are discussed below.

Figure 3:
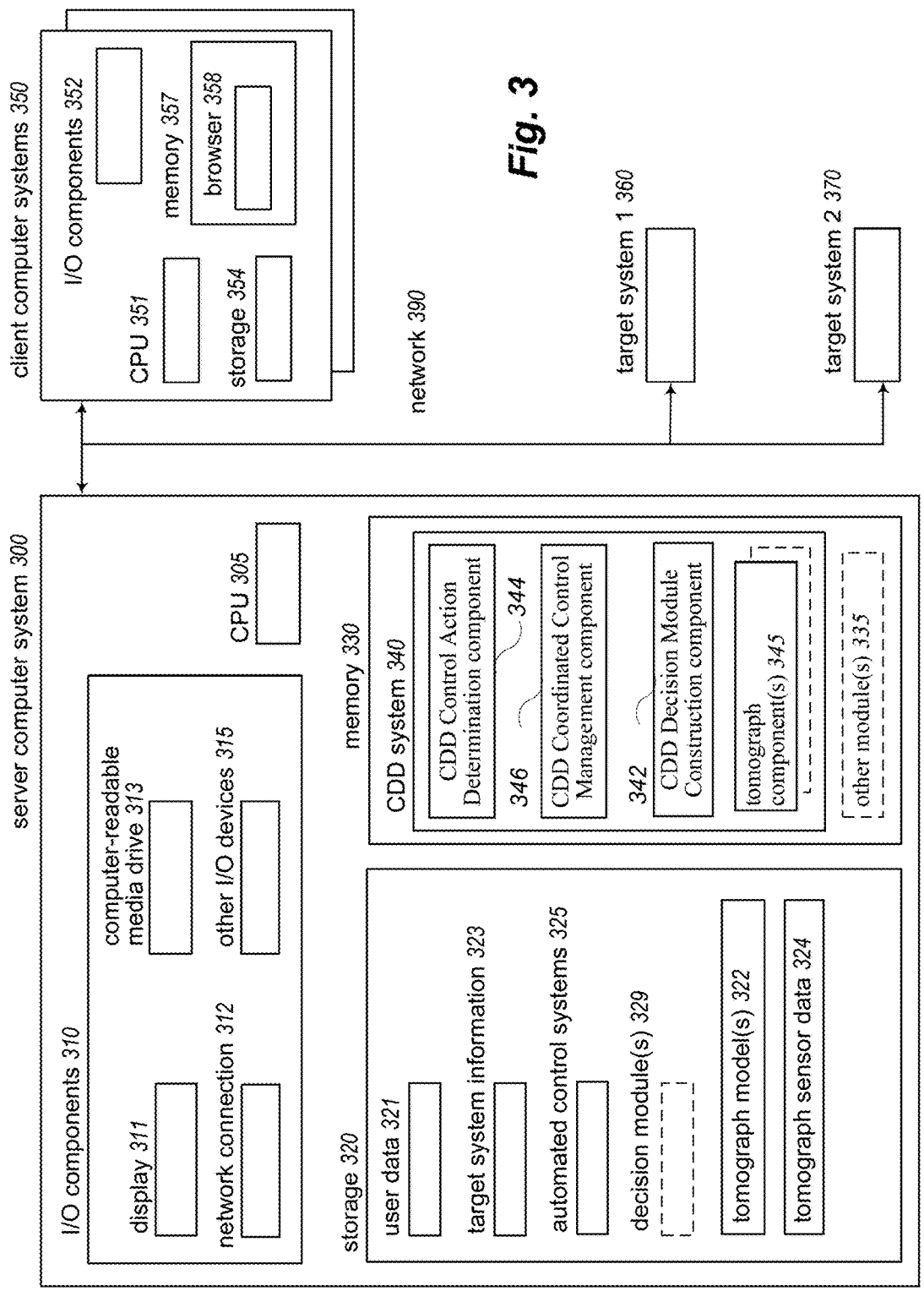
FIG. 3 is a block diagram illustrating example computing systems suitable for executing an embodiment of a system for performing cooperative distributed control of target systems in configured manners.

FIG. 3 is a block diagram illustrating example computing systems suitable for performing techniques for implementing automated control systems to control or otherwise manipulate at least some operations of specified physical systems or other target systems in configured manners based at least in part on state information generated using tomographic techniques, as discussed in greater detail elsewhere herein. In particular, FIG. 3 illustrates a server computing system 300 suitable for providing at least some functionality of a CDD system including one or more tomograph components, although in other embodiments multiple computing systems may be used for the execution (e.g., to have distinct computing systems executing the CDD Decision Module Construction component for initial configuration and setup before run-time control occurs, and one or more copies of the CDD Control Action Determination component 344 and/or the CDD Coordinated Control Managements component 346 and/or tomograph component 345 for the actual run-time control; to have one or more computing systems executing the tomograph components that are separate from one or more other computing systems executing some or all of a CDD system with which the tomograph components interact; to have different computing systems executing different tomograph components; etc.). FIG. 3 also illustrates various client computer systems 350 that may be used by customers or other users of the CDD system 340, as well as one or more target systems to be controlled (in this example, target system 1 360 and target system 2 370, which are accessible to the CDD system 340 and its tomograph components 345 over one or more computer networks 390).

In the illustrated embodiment, the one or more tomograph components 345 are executing in memory 330 as part of the CDD system 340, and in some embodiments the component(s) each includes various software instructions that when executed program one or more of the hardware CPU processors 305 to provide an embodiment of a tomograph component as described elsewhere herein. During operation, in at least some embodiments, each tomograph component may modify or otherwise generate one or more target system state models (e.g., in-memory copies of models 322 stored on storage 320), obtains various input data 324, and exchange various information with other executing components, as discussed in greater detail elsewhere herein.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more hardware CPUs 351, I/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, but such computing systems and components are also not illustrated in this example for the sake of brevity.

The CDD system 340 is executing in memory 330 and includes components 342-346, and in some embodiments the system and/or components each includes various software instructions that when executed program one or more of the CPU processors 305 to provide an embodiment of a CDD system as described elsewhere herein. The CDD system 340 may interact with computing systems 350 over the network 390 (e.g., via the Internet and/or the World Wide Web, via a private cellular network, etc.), as well as the target systems 360 and 370 in this example. In this example embodiment, the CDD system includes functionality related to generating and deploying decision modules in configured manners for customers or other users, as discussed in greater detail elsewhere herein, as well as generating or deploying tomograph components 345 at runtime to improve modeled state information of a corresponding target system. The other computing systems 350 may also be executing various software as part of interactions with the CDD system 340 and/or its components. For example, client computing systems 350 may be executing software in memory 357 to interact with CDD system 340 (e.g., as part of a Web browser, a specialized client-side application program, etc.), such as to interact with one or more interfaces (not shown) of the CDD system 340 to configure and deploy automated control systems (e.g., stored automated control systems 325 that were previously created by the CDD system 340 for use in controlling one or more physical target systems) or other decision modules 329, as well as to perform various other types of actions, as discussed in greater detail elsewhere. Various information related to the functionality of the CDD system 340 may be stored in storage 320, such as information 321 related to users of the CDD system (e.g., account information), and information 323 related to one or more target systems (e.g., systems that have batteries to be controlled).

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDD system 340 and its components may in some embodiments be distributed in additional components. Similarly, in some embodiments some of the functionality of the CDD system 340 and/or CDD components 342-346 may not be provided and/or other additional functionality may be available.

As part of implementing an automated control system for a particular target system, an embodiment of a Collaborative Distributed Decision (CDD) system may use the described techniques to perform various automated activities involved in constructing and implementing the automated control system, including one or more CDI agents (also referred to as a CDD decision module or system, or a portion of such module or system) for use in controlling particular target systems.

In particular, the CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules (also referred to at times as "decision elements" and/or "agents") to use in performing the control of the target system. When the one or more executable decision modules are deployed and executed, the CDD system may further provide various components within or external to the decision modules being executed to manage their control of the target system, such as a Control Action Determination component of each decision module to optimize or otherwise enhance the control actions that the decision module generates, a tomograph component to improve modeled state information for the target system, and/or one or more Coordinated Control Management components to coordinate the control actions of multiple decision modules that are collectively performing the control of the target system.

As noted above, a Collaborative Distributed Decision (CDD) system may in some embodiments use at least some of the described techniques to perform various automated activities involved in constructing and implementing a automated control system for a specified target system, such as to modify or otherwise manipulate inputs or other control elements of the target system that affect its operation (e.g., affect one or more outputs of the target system). An automated control system for such a target system may in some situations have a distributed architecture that provides cooperative distributed control of the target system, such as with multiple decision modules that each control a portion of the target system and that operate in a partially decoupled manner with respect to each other. If so, the various decision modules' operations for the automated control system may be at least partially synchronized, such as by each reaching a consensus with one or more other decision modules at one or more times, even if a fully synchronized convergence of all decision modules at all times is not guaranteed or achieved.

The CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules to use in performing the control of the target system. The Decision Module Construction component may thus operate as part of a configuration or setup phase that occurs before a later run-time phase in which the generated decision modules are executed to perform control of the target system, although in some embodiments and situations the Decision Module Construction component may be further used after an initial deployment to improve or extend or otherwise modify an automated control system that has one or more decision modules (e.g., while the automated control system continues to be used to control the target system), such as to implement functionality of a data tomograph component to improve and update a model of a target system being controlled, or to add, remove or modify decision modules for the automated control system.

In some embodiments, some or all automated control systems that are generated and deployed may further provide various components within them for execution during the runtime operation of the automated control system, such as by including such components within decision modules in some embodiments and situations. Such components may include, for example, a Control Action Determination component of each decision module (or of some decision modules) to optimize or otherwise determine and improve the control actions that the decision module generates, and/or a tomograph component of each decision module (or of some decision modules) to improve modeled state information for the target system. For example, such a Control Action Determination component in a decision module may in some embodiments attempt to automatically determine the decision module's control actions for a particular time to reflect a near-optimal solution with respect to or one more goals and in light of a model of the decision module for the target system that has multiple inter-related constraints and based on current state information that is modeled for the target system—if so, such a near-optimal solution may be based at least in part on a partially optimized solution that is within a threshold amount of a fully optimized solution. Such determination of one or more control actions to perform may occur for a particular time and for each of one or more decision modules, as well as be repeated over multiple times for ongoing control by at least some decision modules in some situations. In some embodiments, the model for a decision module is implemented as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function, as discussed in greater detail elsewhere herein.

In some embodiments, the components included within a generated and deployed automated control system for execution during the automated control system's runtime operation may further include one or more Coordinated Control Management components to coordinate the control actions of multiple decision modules that are collectively performing the control of a target system for the automated control system. For example, some or all decision modules may each include such a Control Action Determination component in some embodiments to attempt to synchronize that decision module's local solutions and proposed control actions with those of one or more other decision modules in the automated control system, such as by determining a consensus shared model with those other decision modules that simultaneously provides solutions from the decision module's local model and the models of the one or more other decision modules. Such inter-module synchronizations may occur repeatedly to determine one or more control actions for each decision module at a particular time, as well as to be repeated over multiple times for ongoing control. In addition, each decision module's model is implemented in some embodiments as a Hamiltonian function that reflects a set of coupled differential equations based in part on constraints representing at least part of the target system, such as to allow each decision module's model and its Hamiltonian function implementation to be combined with the models of one or more other decision modules by adding additional expressions for those other decision modules' models within the initial Hamiltonian function for the local model of the decision module, as discussed in greater detail elsewhere herein.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the tomograph components 345 and/or the CDD components 342-346, or more generally by the CDD system 340) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

Figure 4:
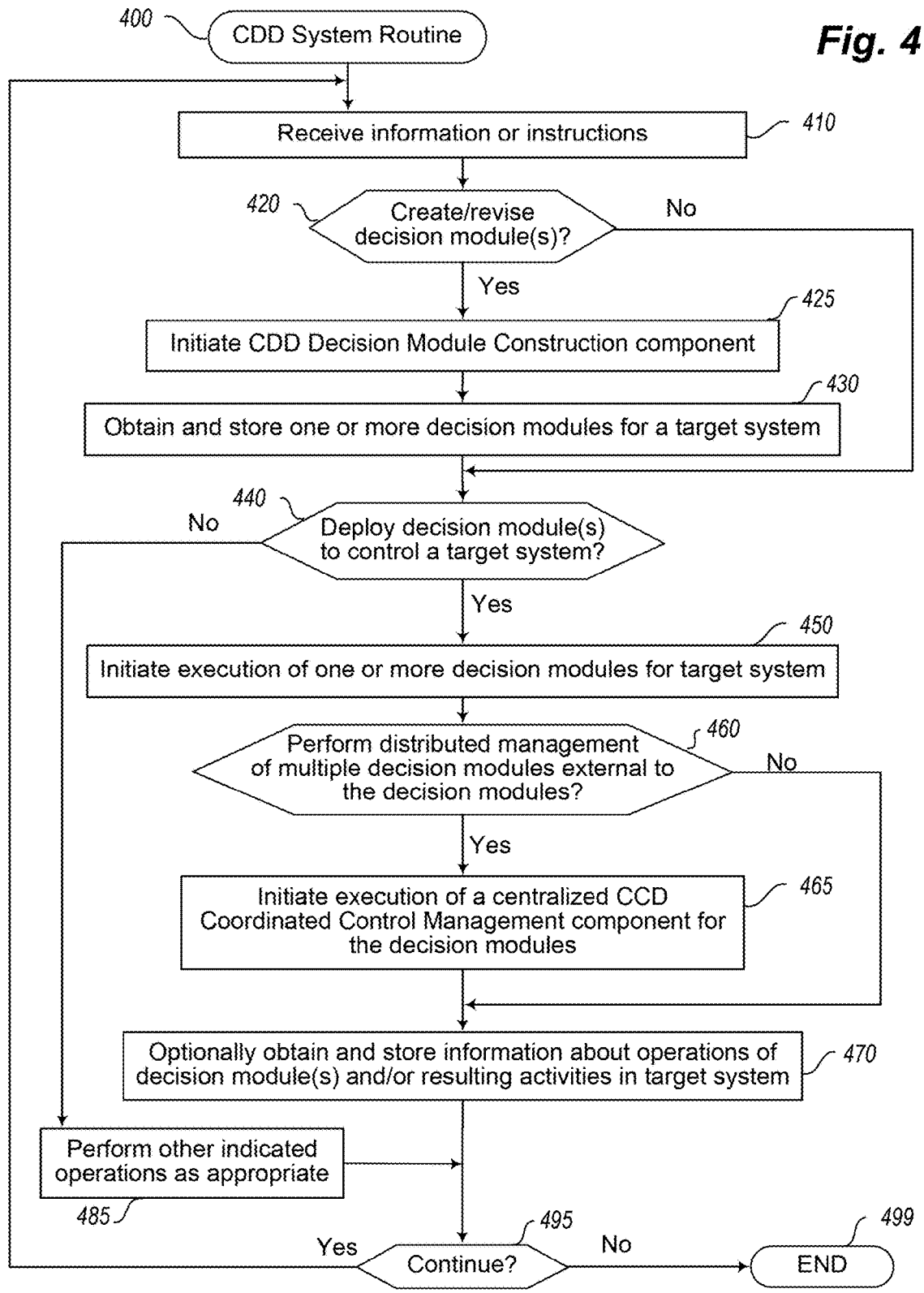
FIG. 4 illustrates a flow diagram of an example embodiment of a Collaborative Distributed Decision (CDD) System routine.

FIG. 4 is a flow diagram of an example embodiment of a Collaborative Distributed Decision (CDD) system routine 400. The routine may, for example, be provided by execution of the CDD system 340 of FIG. 3 and/or the CDD system 140 of FIG. 1A, such as to provide functionality to construct and implement automated control systems for specified target systems.

The illustrated embodiment of the routine begins at block 410, where information or instructions are received. If it is determined in block 420 that the information or instructions of block 410 include an indication to create or revise one or more decision modules for use as part of an automated control system for a particular target system, the routine continues to block 425 to initiate execution of a Decision Module Construction component, and in block 430 obtains and stores one or more resulting decision modules for the target system that are created in block 425. One example of a routine for such a Decision Module Construction component is discussed in greater detail with respect to FIGS. 5A-5C.

After block 430, or if it is instead determined in block 420 that the information or instructions received in block 410 are not to create or revise one or more decision modules, the routine continues to block 440 to determine whether the information or instructions received in block 410 indicate to deploy one or more created decision modules to control a specified target system, such as for one or more decision modules that are part of an automated control system for that target system. The one or more decision modules to deploy may have been created immediately prior with respect to block 425, such that the deployment occurs in a manner that is substantially simultaneous with the creation, or in other situations may include one or more decision modules that were created at a previous time and stored for later use. If it is determined to deploy one or more such decision modules for such a target system, the routine continues to block 450 to initiate the execution of those one or more decision modules for that target system, such as on one or more computing systems local to an environment of the target system, or instead on one or more remote computing systems that communicate with the target system over one or more intermediary computer networks (e.g., one or more computing systems under control of a provider of the CDD system).

After block 450, the routine continues to block 460 to determine whether to perform distributed management of multiple decision modules being deployed in a manner external to those decision modules, such as via one or more centralized Coordinated Control Management components. If so, the routine continues to block 465 to initiate execution of one or more such centralized CDD Coordinated Control Management components for use with those decision modules. After block 465, or if it is instead determined in block 460 to not perform such distributed management in an external manner (e.g., if only one decision module is executed, if multiple decision modules are executed but coordinate their operations in a distributed peer-to-peer manner, etc.), the routine continues to block 470 to optionally obtain and store information about the operations of the one or more decision modules and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of decision modules and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple decision modules for an automated control system in a partially decoupled manner allows various changes to be made while the automated control system is in operation, such as to add one or more new decision modules, to remove one or more existing decision modules, to modify the operation of a particular decision module (e.g., by changing rules or other information describing the target system that is part of a model for the decision module), etc. In addition, the partially decoupled nature of multiple such decision modules in an automated control system allows one or more such decision modules to operate individually at times, such as if network communication issues or other problems prevent communication between multiple decision modules that would otherwise allow their individualized control actions to be coordinated—in such situations, some or all such decision modules may continue to operate in an individualized manner, such as to provide useful ongoing control operations for a target system even if optimal or near-optimal solutions cannot be identified from coordination and synchronization between a group of multiple decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
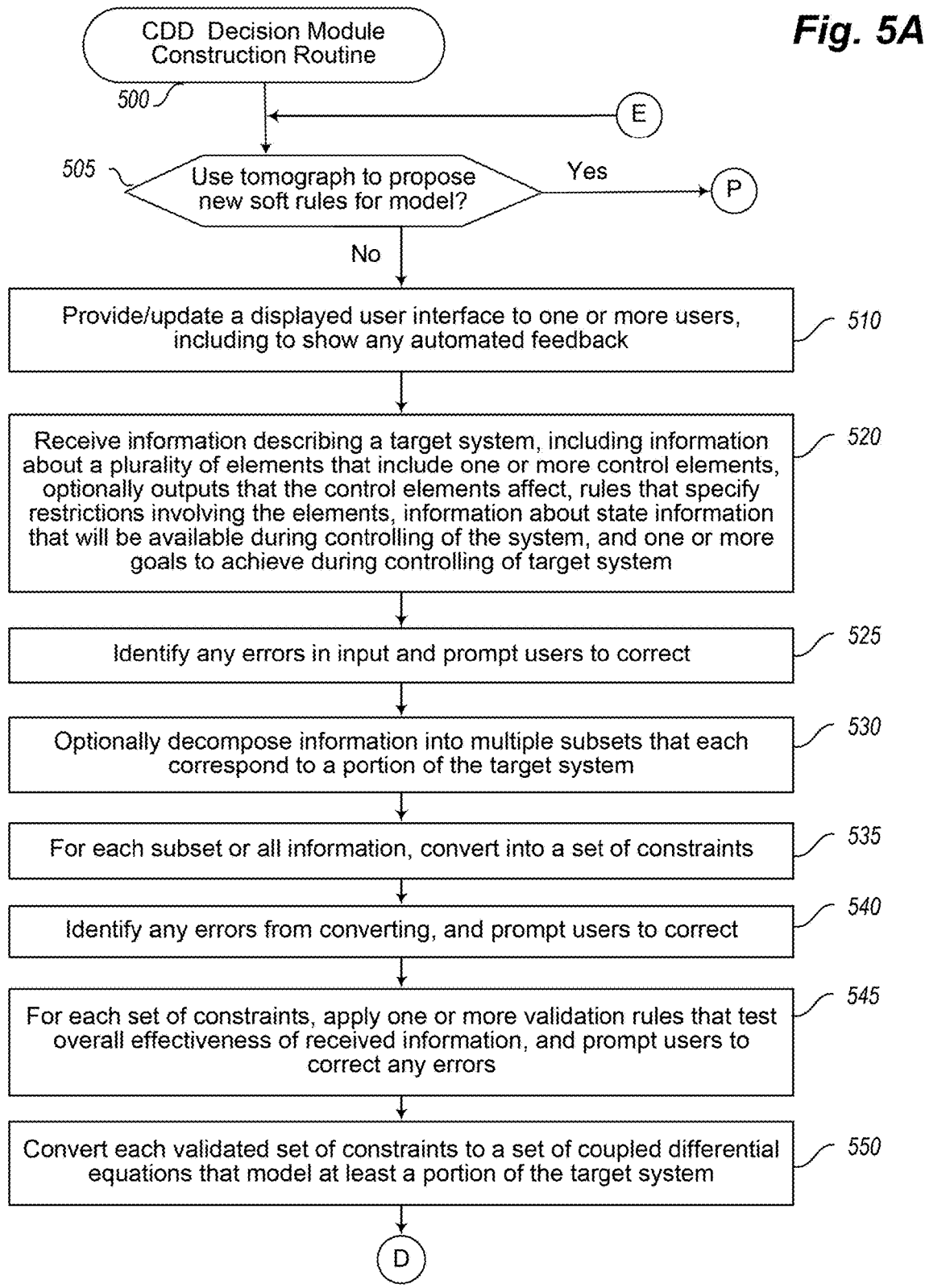
Figure 5B:
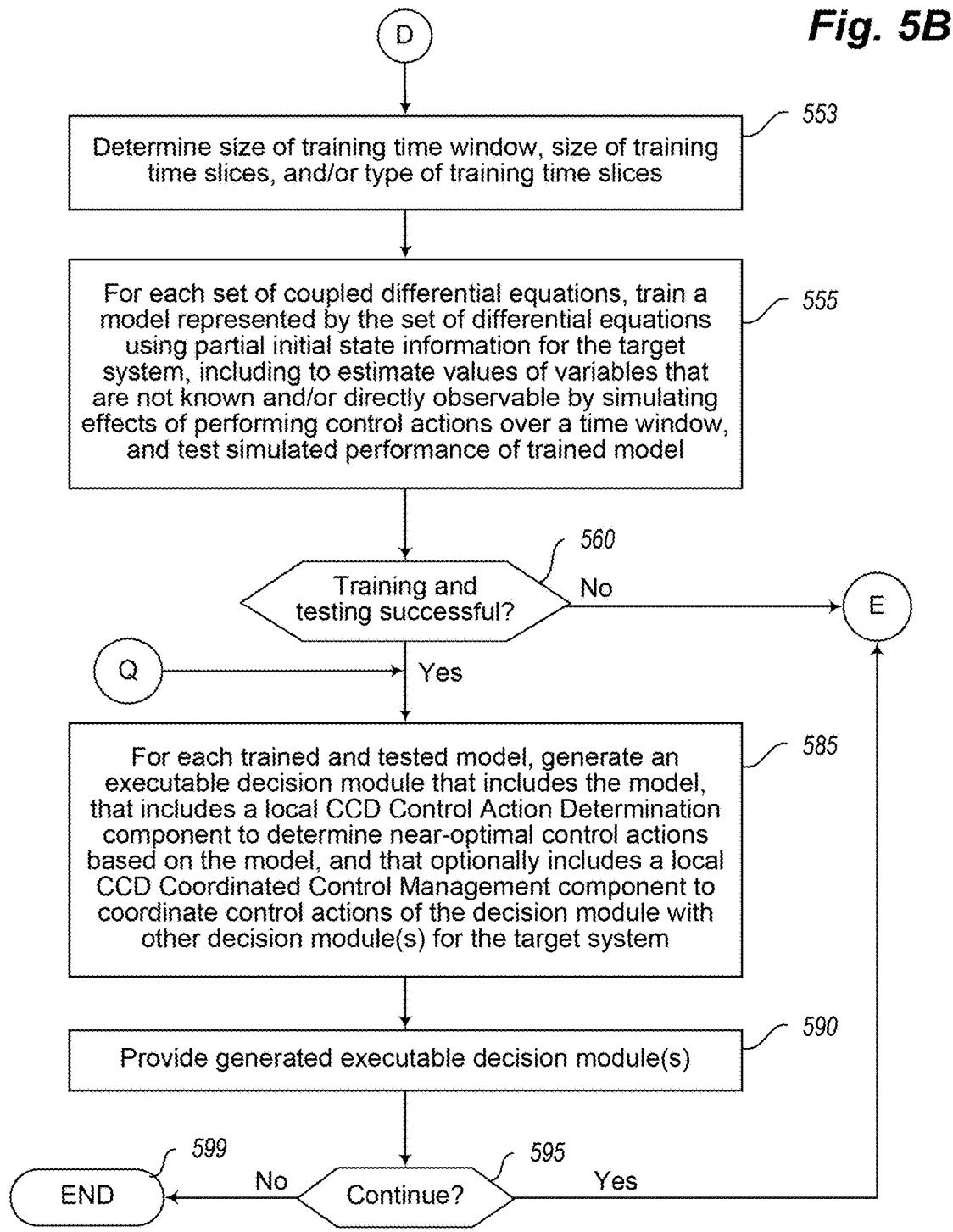

FIGS. 5A-5C illustrate a flow diagram of an example embodiment of a CDD Decision Module Construction routine 500. The routine may, for example, be provided by execution of the components 342 and/or 345 of FIG. 3 and/or the component 142 of FIG. 1A, such as to provide functionality to allow users to provide information describing a target system of interest, and to perform corresponding automated operations to construct one or more decision modules to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use, such as by implementing an online interface that is available to a variety of remote users over a public network such as the Internet, while in other embodiments a copy of the CDD system and/or particular CDD components may be used to support a single organization or other group of one or more users, such as by being executed on computing systems under the control of the organization or group. In addition, the CDD Decision Module Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

Figure 6A:
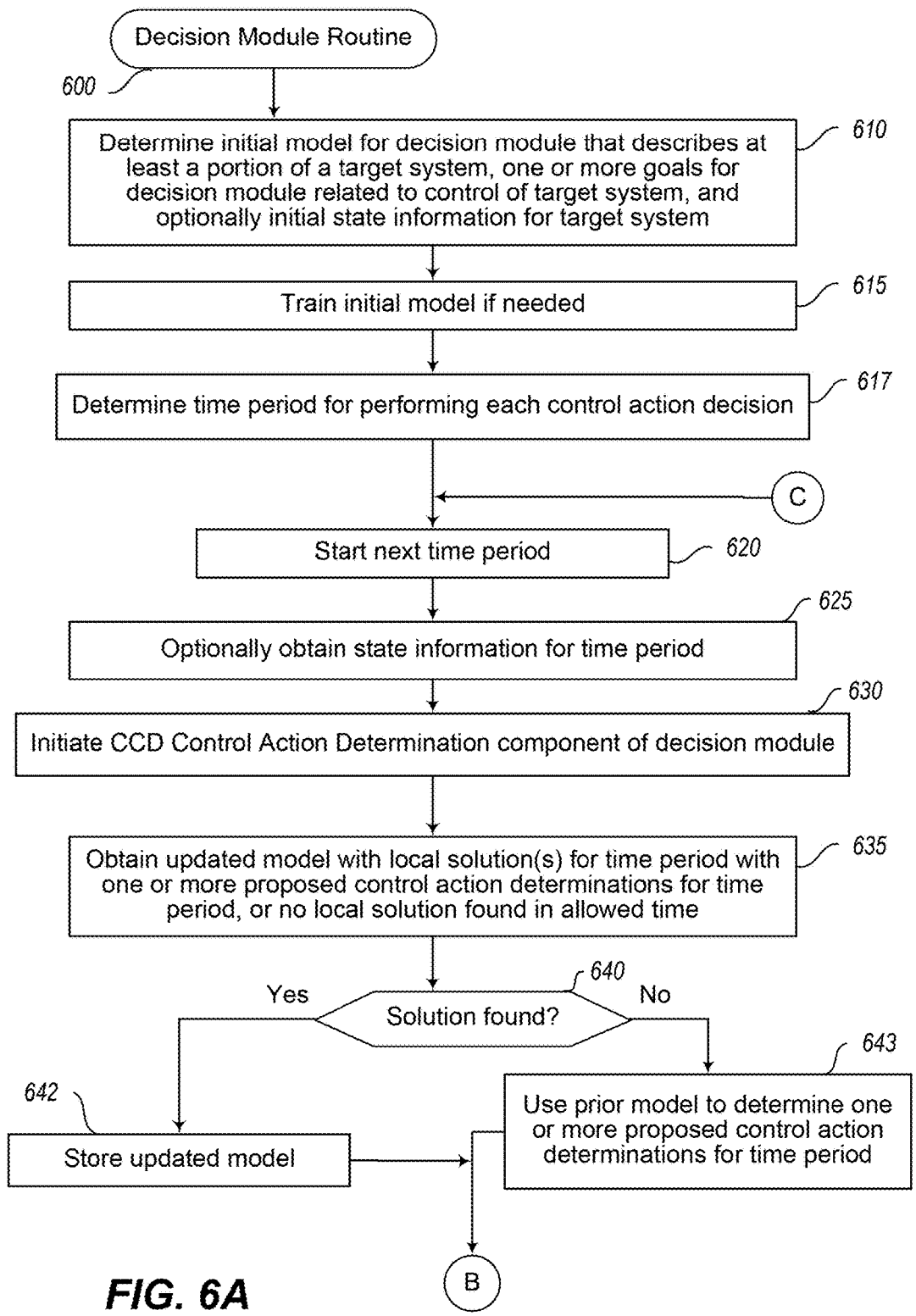
FIGS. 6A-6B illustrate a flow diagram of an example embodiment of a decision module routine.
Figure 6B:
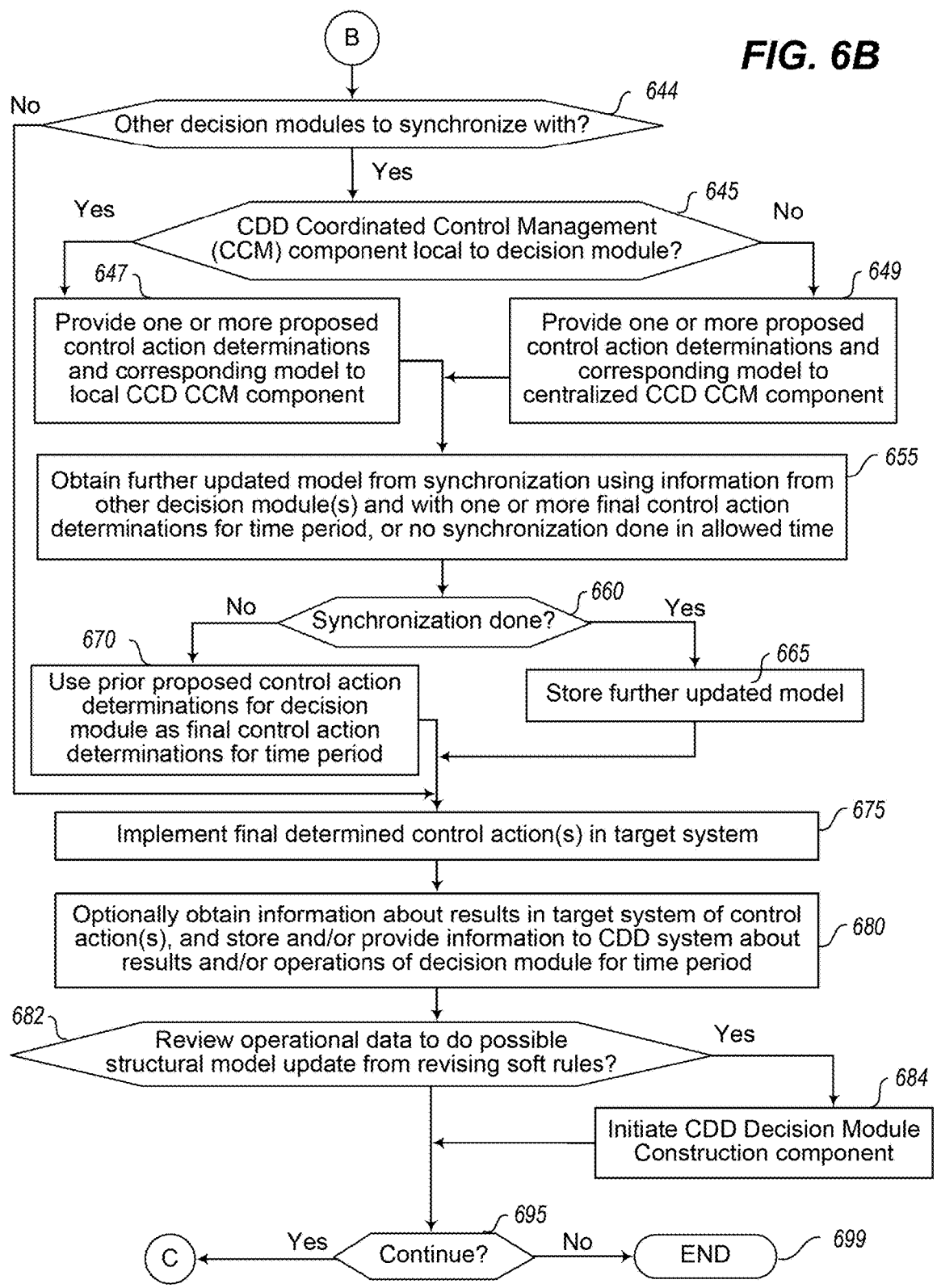

The illustrated embodiment of the routine 500 begins at block 505, where the routine determines whether to currently use a data tomograph component to learn new soft rules for potential addition to a model of a target system, such as periodically, in response to one or more triggering conditions being satisfied, based on being invoked by block 684 of FIG. 6B, etc. If so, the routine continues to block 563 of FIG. 5C, and otherwise continues to block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 520 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system.

After block 520, the routine continues to block 525 to identify any errors that have been received in the user input, and to prompt the user(s) to correct those errors, such as by updating the display in a corresponding manner as discussed with respect to block 510. While the identification of such errors is illustrated as occurring after the receiving of the information in block 520, it will be appreciated that some or all such errors may instead be identified as the users are inputting information into the user interface, such as to identify syntax errors in rules or other information that the users specify. After block 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different subgroups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 525 and 510. While not illustrated in this example, the routine may in some situations in blocks 525 and/or 540 return to block 510 when such errors are identified, to display corresponding feedback to the user(s) and to allow the user(s) to make corrections and re-perform following operations such as those of blocks 520-540. The errors identified in the converting process in block 540 may include, for example, errors related to inconsistent restrictions, such as if the restrictions as a group are impossible to satisfy.

After block 540, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 525, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or pre-specified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information for the target system, including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not returns to block 510 to display corresponding feedback information to the users to allow them to correct errors that caused the lack of success. If it is instead determined in block 560 that the testing and training were successful, however, or after block 581 of FIG. 5C with a model updated with one or more learned soft rules, the routine continues instead to block 585 to generate an executable decision module for each trained and tested model that includes that model, as well as a local CCD Control Action Determination component that the decision module will use when executed to determine optimal or near-optimal control actions to perform for the target system based on the information included in the model, and in light of the one or more goals for that decision module. The generated executable decision module may in some embodiments and situations further include a local CCD Coordinated Control Management component to coordinate control actions of multiple decision modules that collectively will provide an automated control system for the target system, such as by synchronizing respective models of the various decision modules over time. After block 585, the routine continues to block 590 to provide the generated executable decision modules for use, including to optionally store them for later execution and/or deployment.

It if was determined in block 505 to use a data tomograph component to learn new soft rules for potential addition to a model of a target system, the routine continues to block 563 of FIG. 5C, where one or more existing generated models (e.g., an initial model based on binary rules) for the target system are obtained. In block 565, the routine then gathers actual operational data from operation of the target system over time (e.g., as controlled by the one or more existing generated models), such as to retrieve previously generated and stored data from storage, to enter a data-gathering stage that continues until a specified amount of data is available, etc. After block 565, the routine continues to block 567 to use the data tomograph component to repeatedly query a data model from the gathered data to obtain answers regarding performance of the target system under varying situations and values for one or more sensors and/or controls, such as with respect to one or more outputs of the target system corresponding to a specified goal to achieve. In block 569, the routine then creates a total data model for the system based on the query/answer pairs, such as to construct a total Hamiltonian function. In block 571, the routine then obtains a rule-based model for the system (e.g., a rule-based Hamiltonian function), and compares the total model and rule-based model in order to identify any differences, which are then use to create zero or more potential soft rules related to the queries.

In block 573, the routine then determines an associated completeness value for each such potential soft rule, such as based on whether the execution of blocks 565 through 571 continue to produce new information with respect to the potential soft rules. If any such potential soft rules are not sufficiently complete (e.g., have completeness values below an associated threshold), the routine returns to block 567 to perform additional queries, and otherwise continues to block 577 to select any of the potential soft rules that are sufficiently complete as candidates to use in an improved updated model for the target system. In block 579, the routine then determines whether to automatically update an existing model, and if so continues to block 581 to use the learned candidate soft rule(s) to update an existing rule-based model, before continuing to block 585. Otherwise, the routine continues to block 583 to provide information about the learned candidate soft rule(s) to one or more users associated with the existing models and/or target system, such as to enable the user(s) to decide whether or not to use them to update an existing rule-based model, before continuing to block 505 (e.g., to receive further instructions from the user for such an update with respect to block 520.

After block 590, the routine continues to block 595 to determine whether to continue, such as until an explicit indication to terminate is received. If it is determined to continue, the routine returns to block 510, and otherwise continues to block 599 and ends.

FIGS. 6A-6B illustrate a flow diagram of an example embodiment of a routine 600 corresponding to a generic representation of a decision module that is being executed. The routine may, for example, be provided by execution of a decision module 329 or as part of an automated control system 325 of FIG. 3 and/or a decision module 124 or 128 of FIGS. 1A or 1B, such as to provide functionality for controlling at least a portion of a target system in a manner specific to information and a model encoded for the decision module, including to reflect one or more goals to be achieved by the decision module during its controlling activities. As discussed in greater detail elsewhere, in some embodiments and situations, multiple decision modules may collectively and cooperatively act to control a particular target system, such as with each decision module controlling one or more distinct control elements for the target system or otherwise representing or interacting with a portion of the target system, while in other embodiments and situations a single decision module may act alone to control a target system. The routine 600 further reflects actions performed by a particular example decision module when it is deployed in controlling a portion of a target system, although execution of at least portions of a decision module may occur at other times, such as initially to train a model for the decision module before the decision module is deployed, as discussed in greater detail with respect to the CDD Decision Module Construction routine 500 of FIGS. 5A-5C.

The illustrated embodiment of the routine 600 begins at block 610, where an initial model for the decision module is determined that describes at least a portion of a target system to be controlled, one or more goals for the decision module to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5C—in some embodiments and situations, such training for block 615 is performed only if initial training is not done by the routine 500 of FIGS. 5A-5C, while in other embodiments and situations the training of block 615 is performed to capture information about a current state of the target system at a time that the decision module begins to execute (e.g., if not immediately deployed after initial creation and training) and/or to re-train the model at times as discussed in greater detail with respect to routine 700 of FIGS. 7A-7B as initiated by block 630.

After block 615, the routine continues to block 617 to determine a time period to use for performing each control action decision for the decision module, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the decision module. Blocks 620-680 are then performed in a loop for each such time period going forward until execution of the decision module is suspended or terminated, although in other embodiments a particular decision module may execute for only a single time period each time that it is executed.

In block 625, the routine optionally obtains state information for the time period, such as current state information that has been received for the target system or one or more related external sources since the last time period began, and/or by actively retrieving current values of one or more elements of the target system or corresponding variables as needed. In block 630, the routine then initiates execution of a local CCD Control Action Determination component of the decision module, with one example of such a routine discussed in greater detail with respect to routine 700 of FIGS. 7A-7B. In block 635, the results of the execution of the component in block 630 are received, including to either obtain an updated model for the decision module with a local solution for the current time period and decision module that includes one or more proposed control action determinations that the decision module may perform for the current time period, or to receive an indication that no local solution was found for the decision module in the allowed time for the execution of the component in block 630. It is then determined in block 640 whether a solution was found, and if so continues to block 642 to store the updated model for the decision module, and otherwise continues to block 643 to use the prior model for the decision module to determine one or more control action determinations that are proposed for the current time period based on a previous model (e.g., that does not reflect recent changes in state information and/or recent changes in activities of other decision modules, if any), as discussed in greater detail with respect to routine 700 of FIGS. 7A-7B.

After blocks 642 or 643, the routine continues to block 644 to determine if other decision modules are collectively controlling portions of the current target system, such as part of the same automated control system as the local decision module, and if so continues to block 645. Otherwise, the routine selects the local proposed control actions of the decision module as a final determined control action to perform, and continues to block 675 to implement those control actions for the current time period.

If there are other operating decision modules, the routine in block 645 determines if the local decision module includes a local copy of a CDD Coordinated Control Management (CCM) component for use in synchronizing the proposed control action determinations for the decision module's local solutions with activities of other decision modules that are collectively controlling the same target system. If so, the routine continues to block 647 to provide the one or more proposed control action determinations of the decision module and the corresponding current local model for the decision module to the local CDD CCM component, and otherwise continues to block 649 to provide the one or more proposed control action determinations for the decision module and the corresponding local model of the decision module to one or more centralized CDD CCM components.

After blocks 647 or 649, the routine continues to block 655 to obtain results of the actions of the CDD CCM component(s) in blocks 647 or 649, including to either obtain a further updated model resulting from synchronization of the local model for the current decision module with information from one or more other decision modules, such that the further updated model indicates one or more final control action determinations to perform for the time period for the current decision module, or an indication that no such synchronization was completed in the allowed time. The routine continues to block 660 to determine whether the synchronization was completed, and if so continues to block 665 to store the further updated model from the synchronization, and otherwise continues to block 670 to use the prior proposed control action determinations locally to the decision module as the final control action determinations for the time period.

After blocks 665 or 670, the routine continues to block 675 to implement the one or more final determined control actions for the decision module in the target system, such as by interacting with one or more effectuators in the target system that modify values or otherwise manipulate one or more control elements of the target system, or by otherwise providing input to the target system to cause such modifications or other manipulations to occur. In block 680, the routine optionally obtains information about the results in the target system of the control actions performed, and stores and/or provides information to the CDD system about such obtained results and/or about the activities of the decision module for the current time period. After block 680, the routine continues to block 682 to determine whether to do a possible structural model adaptation update based on learned soft rules, such as periodically, based on whether or not a solution was found with respect to block 640, based on whether or not synchronization was done with respect to block 660, etc. If so, the routine continues to block 684 to initiate operations of the CDD Decision Module Construction component with respect to the data tomograph component in blocks 563-583, such as to return with an updated version of the model and/or a corresponding decision module.

After block 684, or if it was determined in block 682 to not do a possible structural model adaptation update based on learned soft rules, the routine continues to block 695 to determine whether to continue, such as until an indication to terminate or suspend is received (e.g., to reflect an end to current operation of the target system or an end of use of the decision module to control at least a portion of the target system). If it is determined to continue, the routine returns to block 620 to start the next time period, and otherwise continues to block 699 and ends.

Figure 7A:
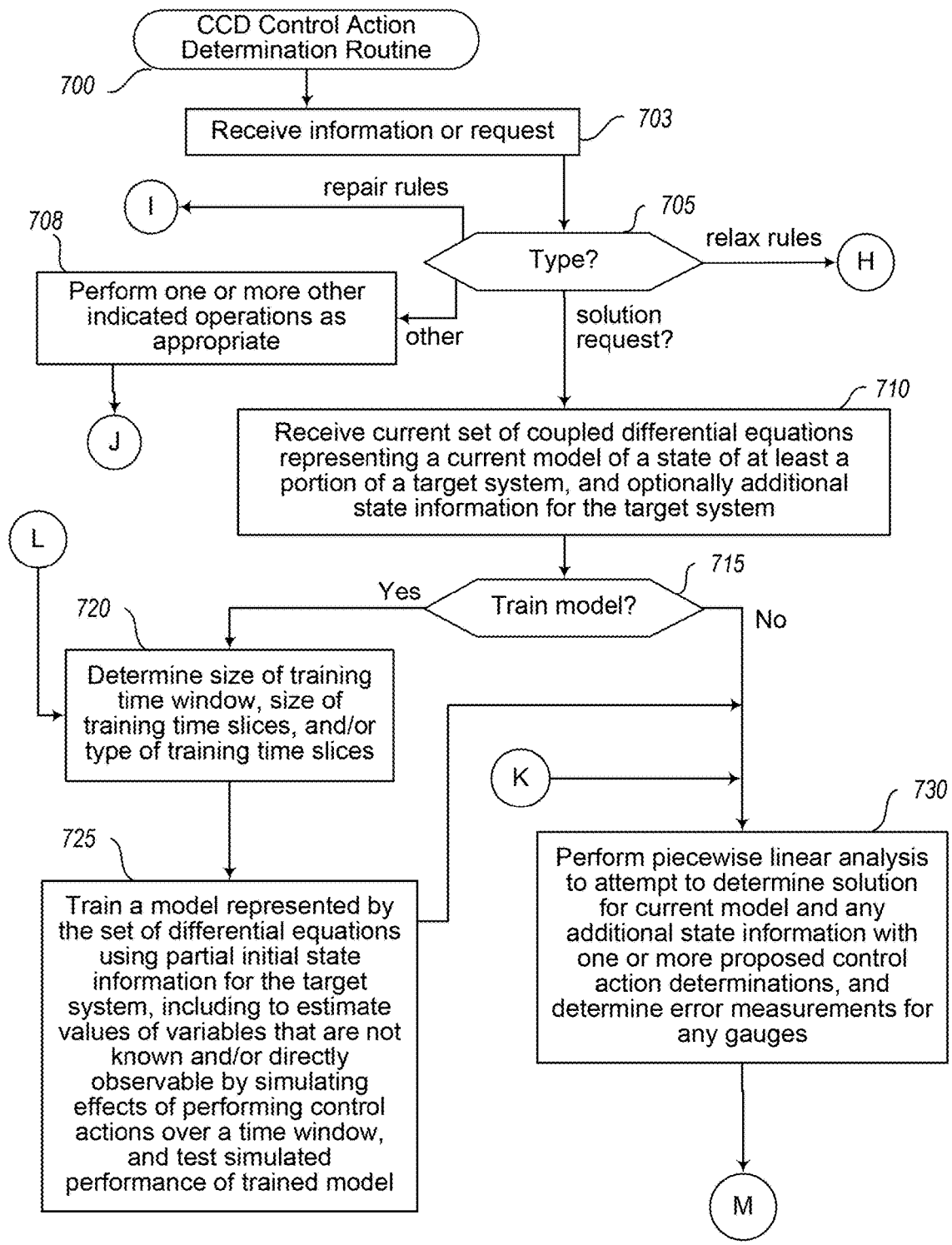
FIGS. 7A-7B illustrate a flow diagram of an example embodiment of a CDD Control Action Determination routine.
Figure 7B:
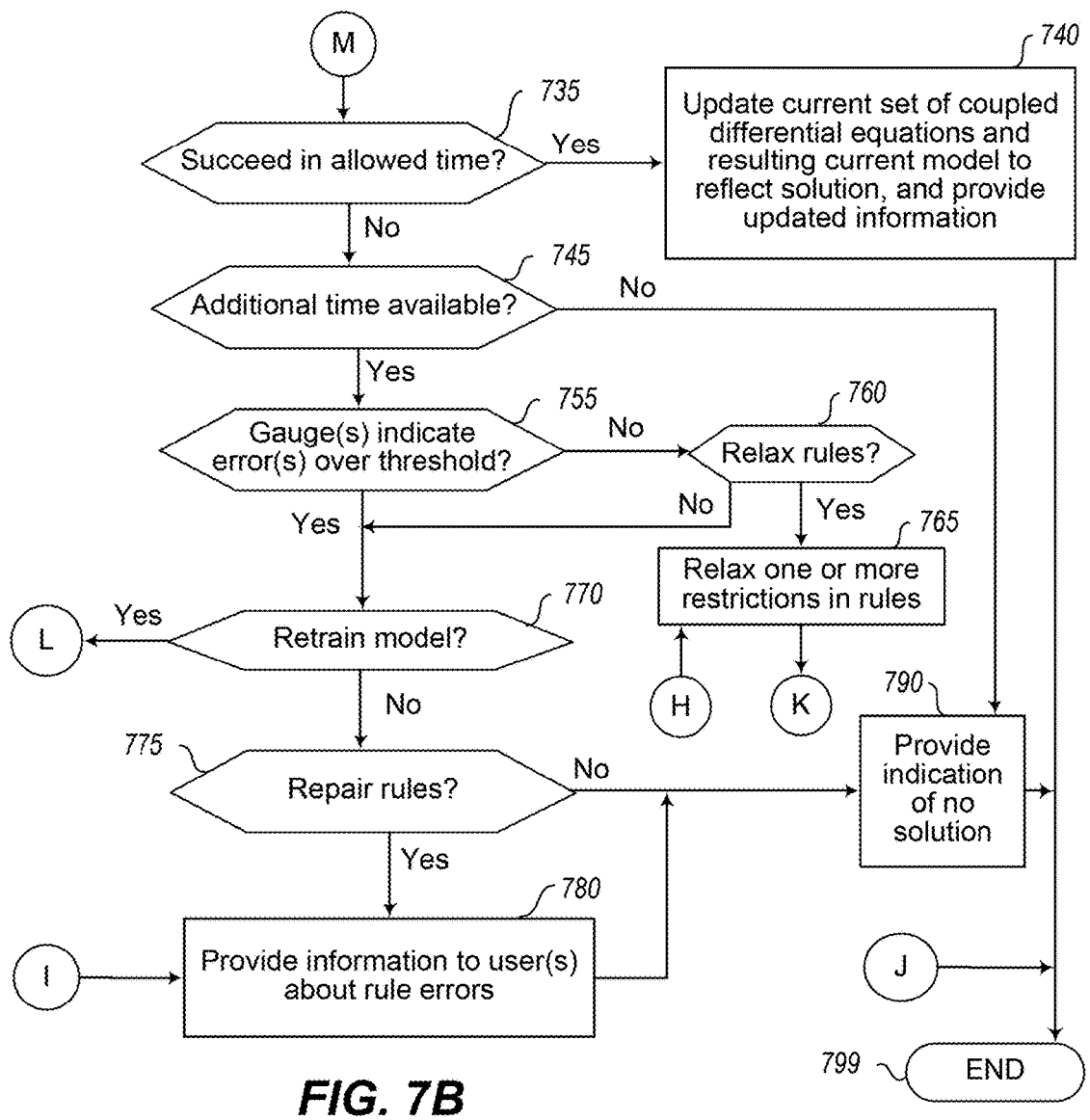

FIGS. 7A-7B are a flow diagram of a example embodiment of a CDD Control Action Determination routine 700. The routine may, for example, be provided by execution of the component 344 of FIG. 3 and/or components 144*a-n* or 184 of FIG. 1B, such as to determine control actions for a decision module to propose and/or implement for a target system during a particular time period, including in some embodiments to perform an optimization to determine near-optimal actions (e.g., within a threshold of an optimal solution) to perform with respect to one or more goals if possible. While the illustrated embodiment of the routine is performed in a manner local to a particular decision module, such that some or all decision modules may each implement a local version of such a routine, in other embodiments the routine may be implemented in a centralized manner by one or more components with which one or more decision modules interact over one or more networks, such as with a particular decision module indicated to be used at a particular time rather than acting on behalf of the local decision module.

The illustrated embodiment of the routine 700 begins at block 703, where information or a request is received. The routine continues to block 705 to determine a type of the information or request, and to proceed accordingly. In particular, if a request is received in block 703 to attempt to determine a solution for a current time period given a current model of the local decision module, the routine continues to block 710 to begin to perform such activities, as discussed in greater detail with respect to block 710-790. If it is instead determined in block 705 that a request to relax one or more rules or other restrictions for the current model of the local decision module is received, such as discussed in greater detail with respect to blocks 760 and 765, the routine continues to block 765. If it is determined in block 705 that a request is received to repair one or more rules or other restrictions for the current model of the local decision module, such as discussed in greater detail with respect to blocks 775 and 780, the routine continues to block 780 to obtain user input to use during the rule repair process (e.g., to interact with a CDD Decision Module Construction component, or to instead interact with one or more users in another manner), such as to allow the current model for the local decision module to later be updated and replaced based on further resulting user actions, or if operation of the target system can be suspended, to optionally wait to further perform the routine 700 until such an updated model is received. If it is instead determined in block 705 that the information or request is of another type, the routine continues instead to block 708 to perform one or more other indicated operations as appropriate, and to then proceed to block 799. Such other indicated operations may include, for example, receiving information about current models and/or control actions proposed or performed by one or more other decision modules that are collectively controlling a target system with the local decision module (such as for use in synchronizing the model of the local decision module with such other decision modules by generating a consensus or converged shared model, as discussed in greater detail with respect to routine 800 of FIGS. 8A-8B), to receive updates to a model or underlying information for the model for use in ongoing operation of the routine 700 (e.g., from a CDD Decision Module Construction component, such as results from interactions performed in block 780), to receive current state information for the target system, such as for use as discussed in routine 600 of FIGS. 6A-6B, etc.

If it determined in block 705 that a request for a solution was received in block 703 for a current time period and based on a current model of the local decision module, the routine continues to block 710 to receive a current set of coupled differential equations that represent the current model for the local decision module of at least a portion of the target system, optionally along with additional state information for the target system for the current time. The routine then continues to block 715 to determine whether to train or re-train the model, such as if the routine is called for a first time upon initial execution of a corresponding decision module or if error measurements from ongoing operations indicate a need for re-training, as discussed in greater detail with respect to blocks 755, 770 and 730. If it is determined to train or re-train the model, the routine continues to block 720 to determine one or more of the size of a training time window, size of training time slices within the time window, and/or type of training time slices within the training time window, such as in a manner similar to that previously discussed with respect to block 553 of routine 500 of FIGS. 5A-5C. After block 720, the routine continues to block 725 to use partial initial state information for the target system to train the model, including to estimate values of state variables for the target system that are not known and/or directly observable, by simulating effects of performing control actions over the time window for each of the time slices, as discussed in greater detail with respect to block 555 of routine 500 of FIGS. 5A-5C.

After block 725, or if it is instead determined in block 715 not to train or re-train the model, the routine continues to block 730 to perform a piecewise linear analysis to attempt to determine a solution for the current model and any additional state information that was obtained in block 710, with the solution (if determined) including one or more proposed control action determinations for the local decision module to take for a current time period, as well as in some embodiments to use one or more model error gauges to make one or more error measurements with respect to the current model, as discussed in greater detail elsewhere. The routine then continues to block 735 to determine if the operations in block 730 determined a solution within a amount of time allowed for the operation of block 730 (e.g., a defined subset or fraction of the current time period), and if so continues to block 740 to update the current set of coupled differential equations and the resulting current model for the local decision module to reflect the solution, with the resulting updated information provided as an output of the routine 700.

If it is instead determined in block 735 that the operations in block 730 did not determine a solution, the routine continues to block 745 to determine if additional time is available within the current time period for further attempts to determine a solution, and if not continues to block 790 to provide output of the routine 700 indicating that no solution was determined for the current time period.

If additional time is available within the current time period, however, the routine continues to perform blocks 755-780 to perform one or more further attempts to identify the solution—it will be appreciated that one or more of the operations of blocks 755-780 may be repeatedly performed multiple times for a given time period if sufficient time is available to continue further solution determination attempts. In particular, the routine continues to block 755 if additional time is determined to be available in block 745, where it determines whether the measurements from one or more gauges indicate model error measurements that are over one or more thresholds indicating modifications to the model are needed, such as based on the model error measurements from the gauges discussed with respect to block 730. If not, the routine continues to block 760 to determine whether there are one or more rules or other restrictions in the current model that are available to be relaxed for the current time period (that have not previously attempted to be relaxed during the time period, if this is not the first pass through this portion of the routing for the current time period), and if so continues to block 765 to relax one or more such rules or other restrictions and to return to block 730 to re-attempt the piecewise linear analysis with the revised model based on those relaxed rules or other restrictions.

If it is instead determined in block 755 that the model error measurements from one or more of the gauges are sufficient to satisfy one or more corresponding thresholds, the routine continues instead to block 770 to determine whether to re-train the model based on one or more of the gauges indicating sufficient errors to do so, such as based on accumulated errors over one or more time periods of updates to the model. If so, the routine returns to block 720 to perform such re-training in blocks 720 and 725, and then continues to block 730 to re-attempt the piecewise linear analysis with the resulting re-trained model.

If it is instead determined in block 770 not to re-train the model (or if the model was re-trained already for the current time period and the resulting re-attempt in block 730 again failed to find a solution), the routine continues to block 775 to determine whether the model error measurements from one or more of the gauges indicate a subset of one or more rules or other restrictions in the model that potentially have errors that need to be repaired. If so, the routine continues to block 780 to provide information to one or more users via the CDD Decision Module Construction component, to allow the users to revise the rules or other restrictions as appropriate, although in other embodiments some or all such rule repair activities may instead be attempted or performed in an automated manner. After block 780, or if it is instead determined in block 775 not to repair any rules, the routine continues to block 790 to provide an indication that no solution was determined for the current time period. After blocks 740, 708, or 790, the routine continues to block 799 and ends. It will be appreciated that if the routine 700 was instead implemented as a centralized routine that supports one or more decision modules remote from the executing component for the routine, the routine 700 may instead return to block 703 to await further information or requests.

Figure 8A:
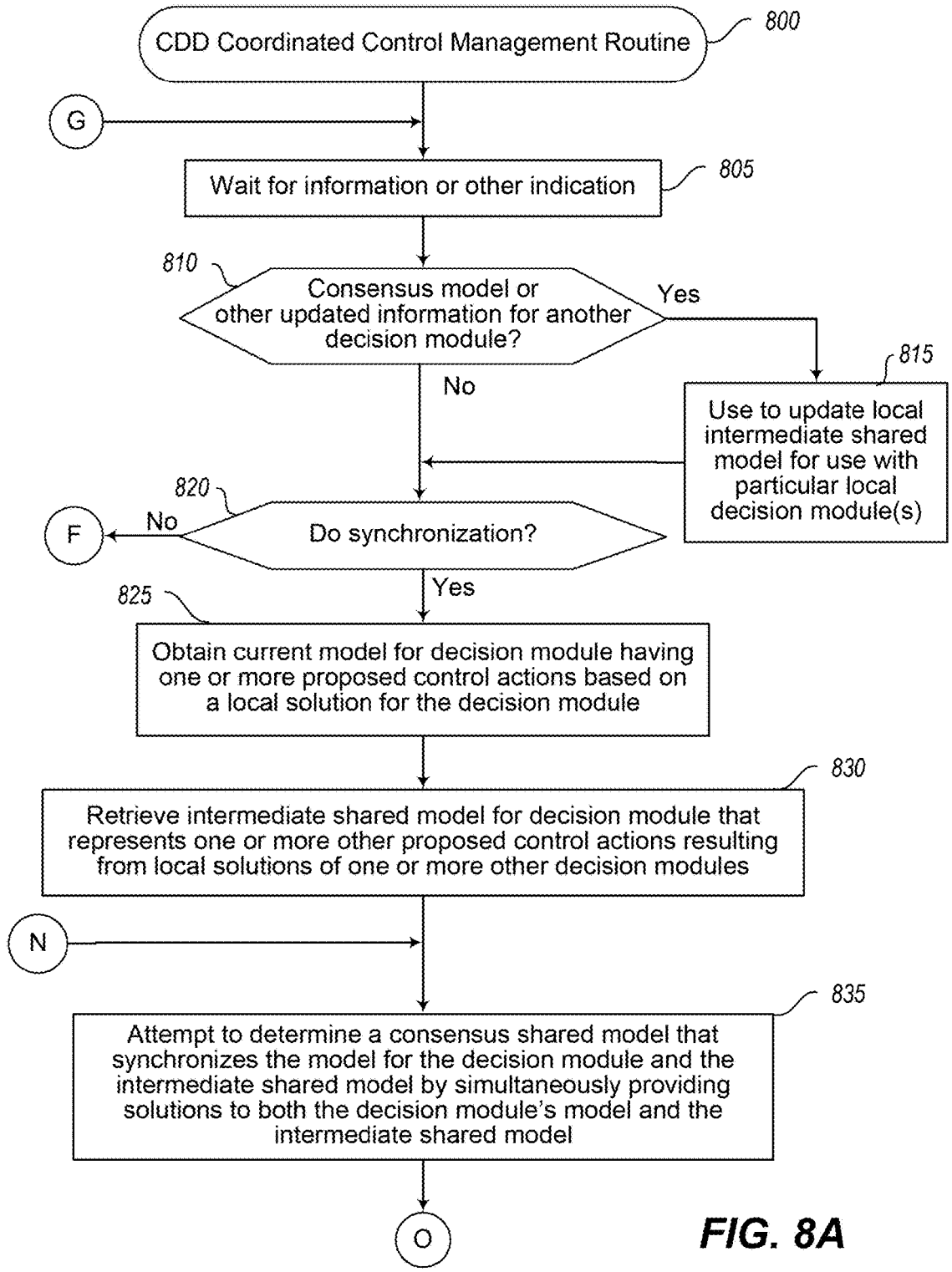
FIGS. 8A-8B illustrate a flow diagram of an example embodiment of a CDD Coordinated Control Management routine.
Figure 8B:
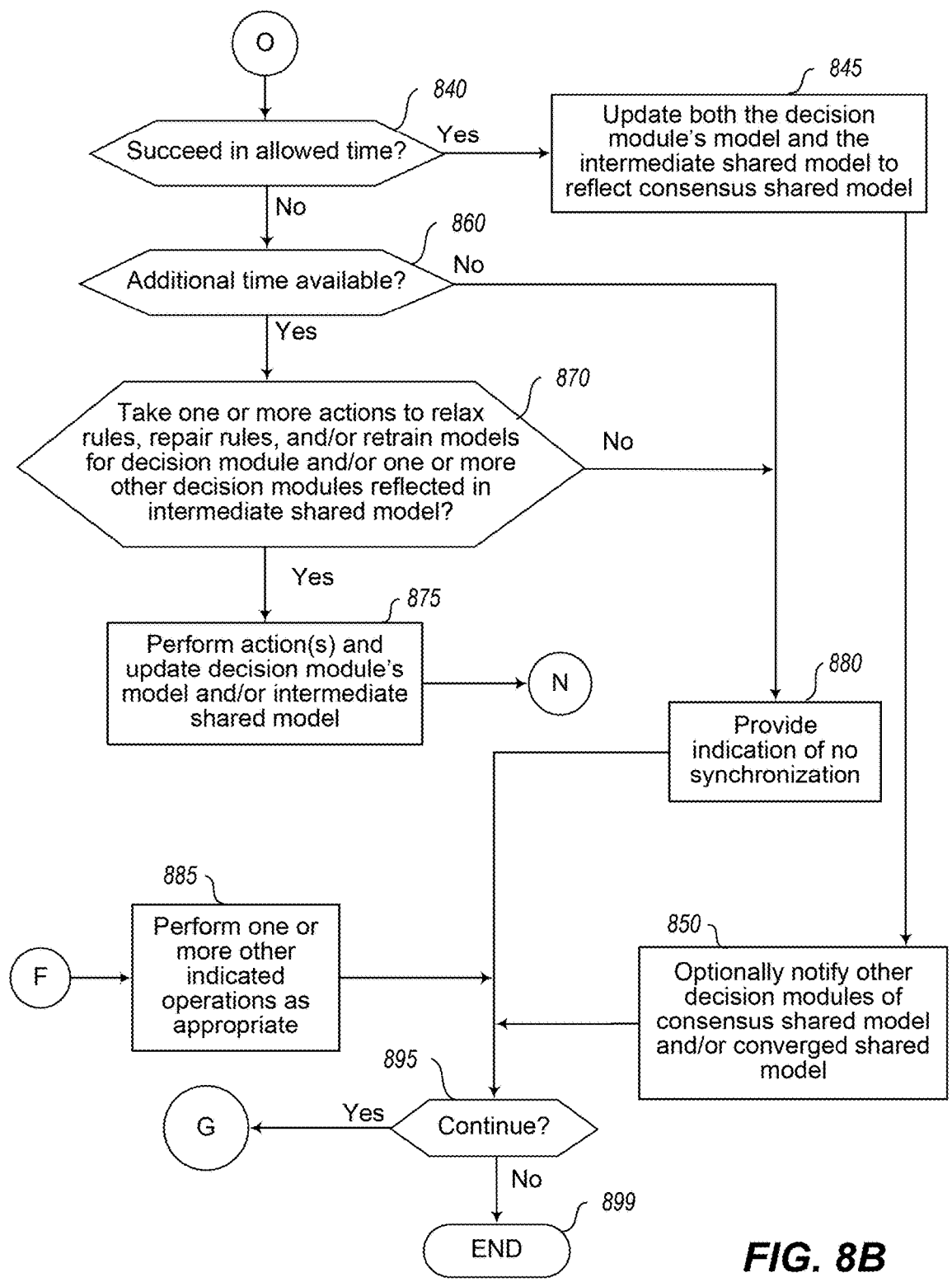

FIGS. 8A-8B are a flow diagram of an example embodiment of a CDD Coordinated Control Management routine 800. The routine may, for example, be provided by execution of the component 346 of FIG. 3 and/or the components 146a-n of FIG. 1B, such as to attempt to synchronize current models and their proposed control actions between multiple decision modules that are collectively controlling a target system. In the illustrated embodiment of the routine, the synchronization is performed in a pairwise manner between a particular local decision module's local current model and an intermediate shared model for that decision module that is based on information about the current state of one or more other decision modules, by using a Pareto game technique to determine a Pareto equilibrium if possible that is represented in a consensus shared model, although in other embodiments other types of synchronization methods may be used. In addition, in the illustrated embodiment, the routine 800 is performed in a local manner for a particular local decision module, such as by being included within that local decision module, although in other embodiments the routine 800 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module.

The illustrated embodiment of the routine 800 begins at block 805, where it waits to receive information or another indication. The routine continues to block 810 to determine if a consensus model or other updated information for another decision module has been received, such as from a copy of the routine 800 executing for that other decision module, and if so continues to block 815 to use the received information to update local intermediate shared model information for use with the local decision module on whose behalf the current copy of the routine 800 is executing, as discussed in greater detail with respect to block 830. If it is instead determined in block 810 that the information or request received in block 805 is not information related to one or more other decision modules, or after block 815, the routine continues to block 820 to determine whether to currently perform a synchronization for the current local model of the local decision module by using information about an intermediate shared model of the local decision module that includes information for one or more other decision modules, such as to do such synchronization each time that an update to the local decision module's model is received (e.g., based on operation of the routine 700 for a copy of the CDD Control Action Determination component local to that decision module) in block 805 and/or each time that information to update the local decision module's intermediate shared model is received in block 805 and used in block 815, or instead as explicitly indicated in block 805—if the synchronization is to currently be performed, the routine continues to block 825 and begins to perform blocks 820-880 related to such synchronization activities. Otherwise, the routine continues to block 885 to perform one or more other indicated operations as appropriate, such as to receive requests from the CDD system or other requestor for current information about operation of the routine 800 and/or to provide corresponding information to one or more entities (e.g., to reflect prior requests), etc.

If it is determined in block 820 that synchronization is to be currently performed, such as based on updated model-related information that is received in block 805, the routine continues to block 825 to obtain a current local model for the local decision module to use in the synchronizing, with the model including one or more proposed control actions to perform for a current time period based on a local solution for the local decision module. The routine then continues to block 830 to retrieve information for an intermediate shared model of the local decision module that represents information for one or more other decision modules (e.g., all other decision modules) that are collectively participating in controlling the target system, with that intermediate shared model similarly representing one or more other proposed control actions resulting from local solutions of those one or more other decision modules, optionally after partial or complete synchronization has been performed for those one or more other decision modules between themselves.

The routine then continues to block 835 to attempt to determine a consensus shared model that synchronizes the current model of the local decision module and the intermediate shared model by simultaneously providing solutions to both the local decision module's current model and the intermediate shared model. In some embodiments, the operations of block 835 are performed in a manner similar to that discussed with respect to blocks 710-730 of routine 700 of FIG. 7A-7B, such as if the local model and the intermediate shared model are combined to create a combination model for whom one or more solutions are to be identified. As discussed in greater detail elsewhere, in some embodiments, the local current model and intermediate shared model may each be represented by a Hamiltonian function to enable a straightforward creation of such a combined model in an additive manner for the respective Hamiltonian functions, with the operations of routines 600 and/or 700 of FIGS. 6A-6B and 7A-7B, respectively, similarly representing the models that they update and otherwise manipulate using such Hamiltonian functions.

After block 835, the routine continues to block 840 to determine whether the operations of block 835 succeeded in an allowed amount of time, such as a fraction or other portion of the current time period for which the synchronization is attempted to be performed, and if so the routine continues to block 845 to update both the local model and the intermediate shared model of the local decision module to reflect the consensus shared model. As earlier noted, if sufficient time is allowed for each decision module to repeatedly determine a consensus shared model with changing intermediate shared models representing one or more other decision modules of a collective group, the decision modules of the collective group may eventually converge on a single converged shared model, although in other embodiments and situations there may not be sufficient time for such convergence to occur, or other issues may prevent such convergence. After block 845, the routine continues to block 850 to optionally notify other decision modules of the consensus shared model determined for the local decision module (and/or of a converged shared model, if the operations of 835 were a last step in creating such a converged shared model), such as if each of the notified decision modules is implementing its own local version of the routine 800 and the provided information will be used as part of an intermediate shared model of those other decision modules that includes information from the current local decision module's newly constructed consensus shared model.

If it is instead determined in block 840 that a synchronization did not occur in the allowed time, the routine continues to perform blocks 860-875 to re-attempt the synchronization with one or more modifications, sometimes repeatedly if sufficient time is available, and in a manner similar to that discussed with respect to blocks 745-780 of routine 700 of FIGS. 7A-7B. In the illustrated example, the routine determines in block 860 if additional time is available for one or more such re-attempts at synchronization, and if not the routine continues to block 880 to provide an indication that no synchronization was performed within the allowed time. Otherwise, the routine continues to block 870 to take one or more actions to perform one or more of relaxing rules or other restrictions, repairing rules or other restrictions, and/or re-training a model, with respect to one or both of the current model of the local decision module and/or one or more other decision modules whose information is represented in the intermediate shared model of the local decision module. If it is determined in block 870 to proceed in this manner, the routine continues to block 875 to perform corresponding actions, sometimes one at a time in a manner similar to that discussed with respect to routine 700, including to cause resulting updates to the current model of the local decision module and/or to the local intermediate shared model of the local decision module, after which the routine returns to block 835 to re-attempt to synchronize the local model and the intermediate shared model of the local decision module.

If it is instead determined in block 870 that no further actions are to be performed with respect to relaxation, repair and/or re-training, the routine continues instead to block 880. After blocks 850, 880 or 885, the routine continues to block 895 to determine whether to continue, such as until an explicit indication to terminate or suspend operation of the routine 800 is received, such as to reflect an end to operation of the target system and/or an end to use of the local decision module and/or a collective group of multiple decision modules to control the target system. If it is determined to continue, the routine returns to block 805, and otherwise continues to block 899 and ends.

Figure 9:
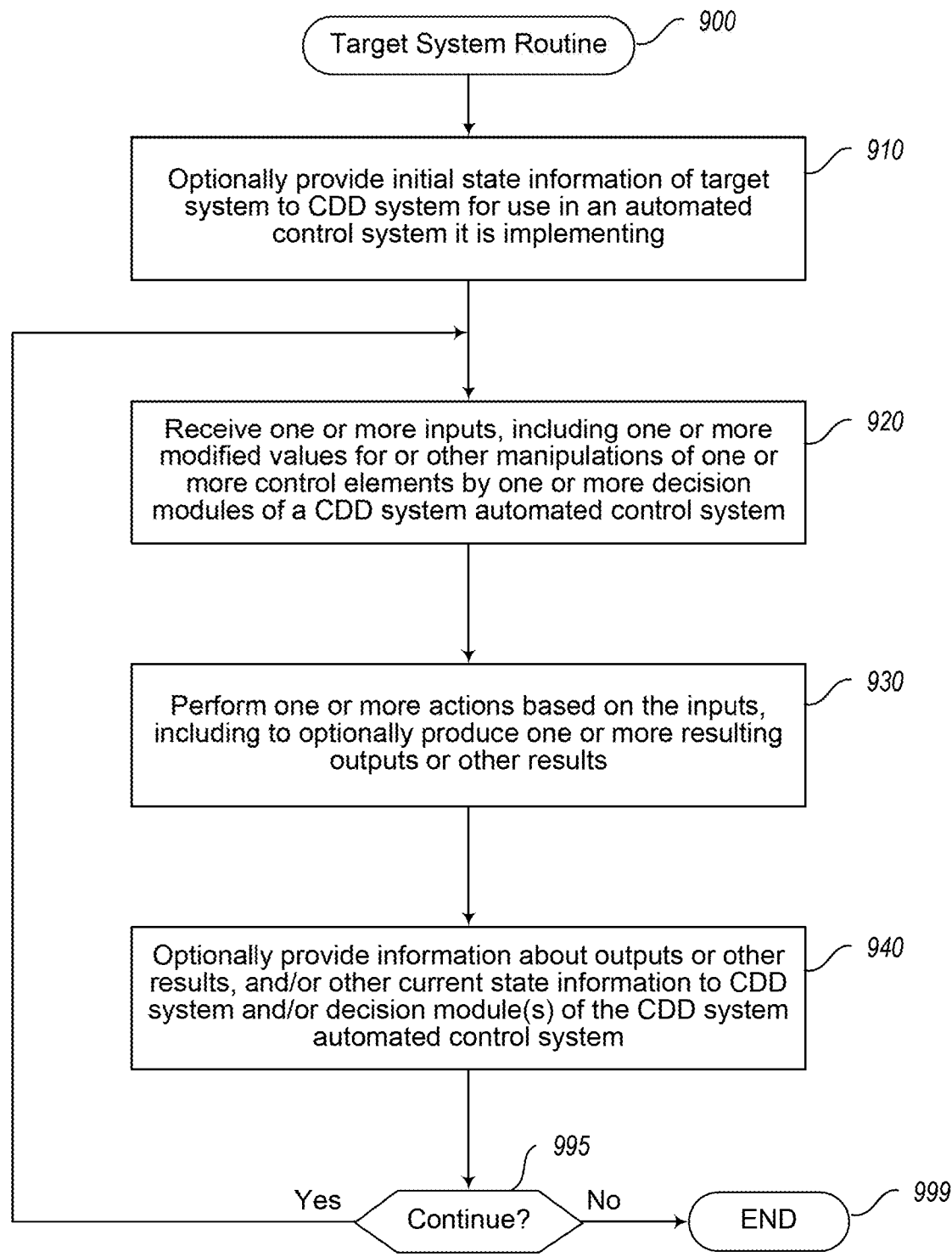
FIG. 9 illustrates a flow diagram of an example embodiment of a routine for a target system being controlled.

FIG. 9 illustrates a flow diagram of an example embodiment of a routine 900 performed for a representative generic target system, with respect to interactions between the target system and one or more decision modules that are controlling at least a portion of the target system. The routine may, for example, be provided by execution of a target system 360 and/or 370 of FIG. 3, and/or a target system 160 and/or 170 of FIGS. 1A and 1B, such as to implement operations specific to the target system. It will be appreciated that the illustrated embodiment of the routine focuses on interactions of the target system with the one or more decision modules, and that many or all such target systems will perform many other operations in a manner specific to those target systems that are not illustrated here for the purpose of brevity.

The routine begins at block 910, where it optionally provides initial state information for the target system to a CDD system for use in an automated control system of the CDD system for the target system, such as in response to a request from the CDD system or its automated control system for the target system, or instead based on configuration specific to the target system (e.g., to be performed upon startup of the target system). After block 910, the routine continues to block 920 to receive one or more inputs from a collective group of one or more decision modules that implement the automated control system for the target system, including one or more modified values for or other manipulations of one or more control elements of a plurality of elements of the target system that are performed by one or more such decision modules of the automated control system. As discussed in greater detail elsewhere, the blocks 920, 930, 940 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, etc.).

After block 920, the routine continues to block 930 to perform one or more actions in the target system based on the inputs received, including to optionally produce one or more resulting outputs or other results within the target system based on the manipulations of the control elements. In block 940, the routine then optionally provides information about the outputs or other results within the target system and/or provides other current state information for the target system to the automated control system of the CDD system and/or to particular decision modules of the automated control system. The routine then continues to block 995 to determine whether to continue, such as until an explicit indication to terminate or suspend operation of the target system is received. If it is determined to continue, the routine returns to block 920 to begin a next set of control actions for a next time period, and otherwise continues to block 999 and ends. As discussed in greater detail elsewhere, state information that is provided to a particular decision module may include requests from external systems to the target system, which the automated control system and its decision modules may determine how to respond to in one or more manners.

Figure 12A:
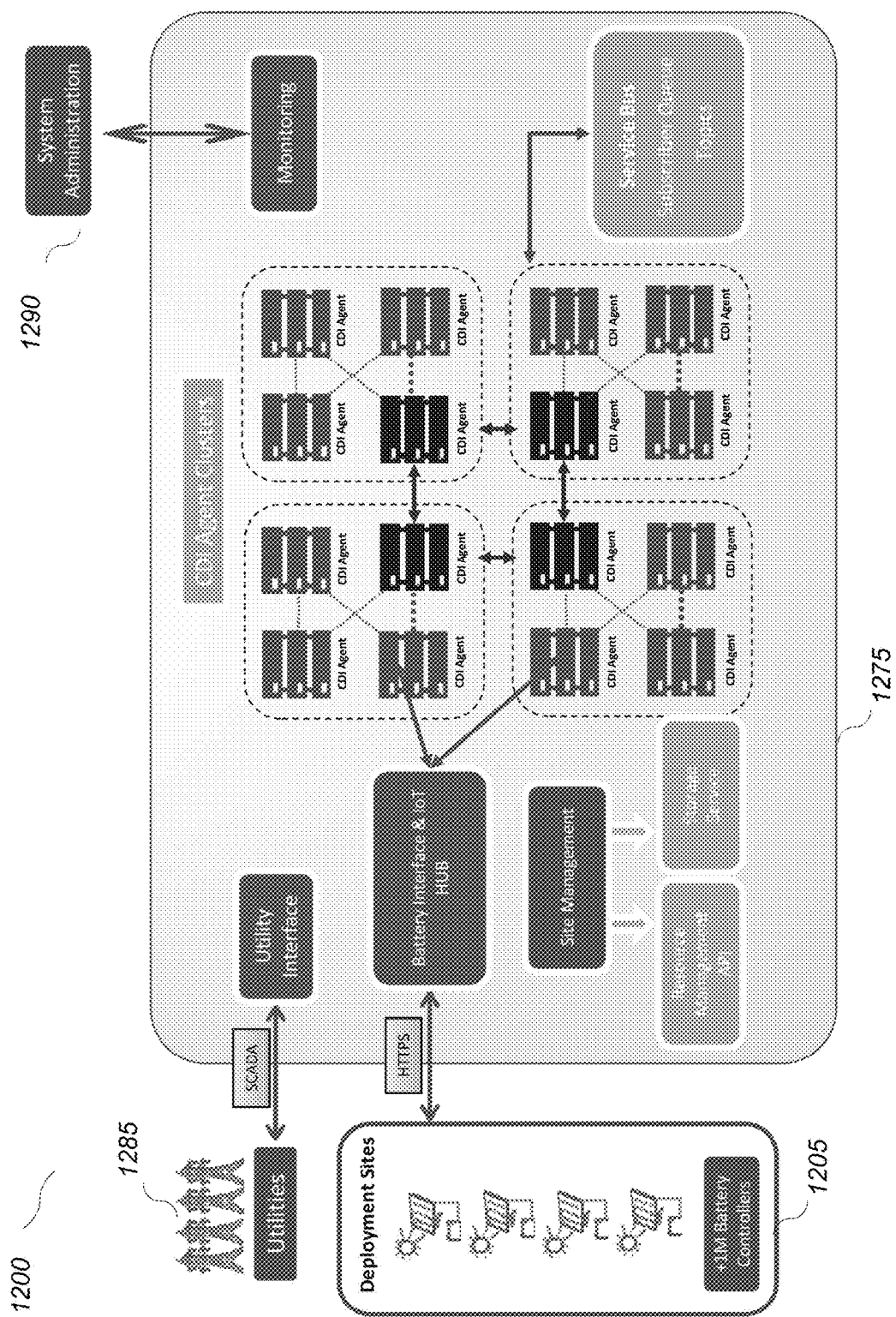
FIG. 12A is a block diagram illustrating example components of an embodiment of a system that includes a tomograph component and that performs automated control of DC power from multiple batteries in a coordinated manner.
Figure 12B:
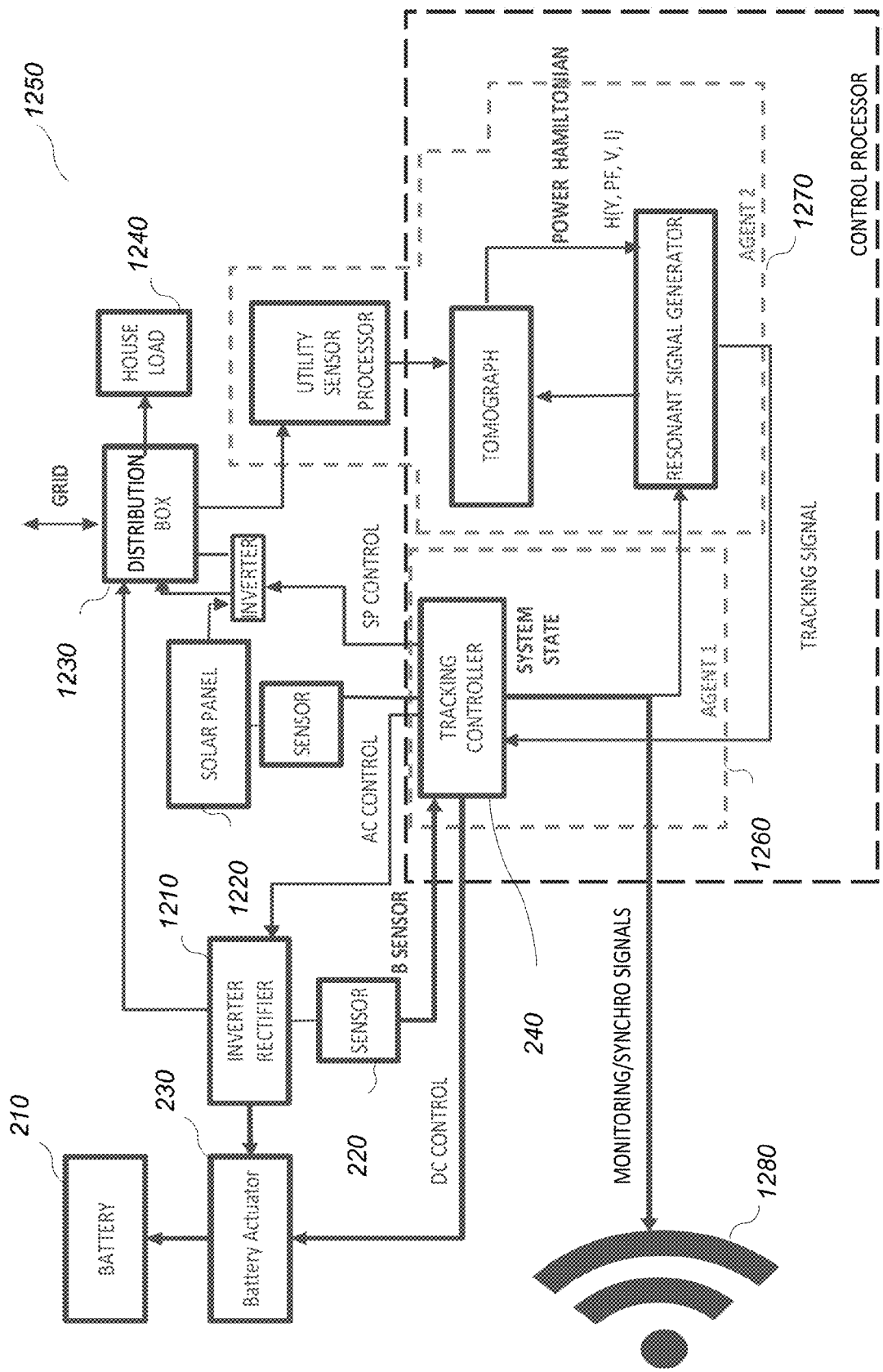
FIG. 12B is a block diagram illustrating example components of an embodiment of a system for performing automated control of DC power from a battery that is part of a home electrical power system with solar power being generated, with the home power generation and use being monitored and synchronized by an external entity.

FIG. 12B illustrates an embodiment of controlling a battery as part of a larger target system, which in this example is a system 1250 involving a home power system that includes a solar panel—thus, the example embodiments discussed previously with respect to FIG. 2A and/or elsewhere herein may in some situations be used as part of a larger system such as the example system 1250. In particular, the block diagram of FIG. 12B illustrates example components of an embodiment of a system 1250 for performing automated control of DC power from a battery that is part of a home electrical power system with solar power being generated, such as in a real-time manner and/or to optimize long-term operation of the battery, and with the home power generation and use being monitored and synchronized by an external entity, such as an entity providing or managing one or more CDI agents to control the battery of the system 1250. In the example of FIG. 12B, the example home's power system is also connected to an external electrical grid from which it receives power and provides power at various times, with the battery serving to store electrical power generated by the solar power system and to supply power to the house and/or to the electrical grid as appropriate.

In the illustrated example of FIG. 12B, components similar to those of FIG. 2A continue to be illustrated, including a battery 210, a hardware sensor module 220, an actuator 230 for the battery, an on-site battery tracking controller 240, etc. In the example of FIG. 12B, however, the CDI agent 250 of FIG. 2A is not illustrated as part of the components present at the physical location of the example house, such as if the CDI agent 250 in use with respect to FIG. 12B instead executes in a remote location (e.g., in the cloud or other computer network location) and provides tracking and/or synchronization signals to the battery tracking controller 240 of FIG. AD9B in a manner similar to that illustrated with respect to FIG. 2A. Such tracking and/or synchronization signals may, for example, include desired power output of the battery and/or desired battery parameters (e.g., internal temperature, voltage, current, etc.) for a current time or immediately subsequent time. In addition, as discussed in greater detail elsewhere herein, the CDI agent(s) may generate such tracking and/or synchronization signals based on monitored information about the battery 210 (and any other batteries being controlled), power requests from the utility managing the external electrical grid, defined constraints or other rules to be used, forecasted power-related values, etc.

In addition, a number of additional components are illustrated in FIG. 12B, including an inverter/rectifier module 1210 that receives output power from the battery and/or supplies electrical power to the battery for storage, a solar panel 1220 that generates electrical power and that has its own associated hardware sensor and inverter, a distribution box 1230 that receives and/or supplies power to an external electrical grid and that controls power distribution to a load 1240 for the house, etc. In addition, two local control agents 1260 and 1270 are illustrated to assist in controlling operation of the battery tracking controller 240 of FIG. 12B, with Agent1 1260 interacting directly with the battery tracking controller, and Agent2 1270 performing activities that include synchronizing the AC phase of the power for the battery with that of the house power system and/or grid, such as to provide resonance for the power being received and/or provided. The battery tracking controller 240 and agents 1260 and 1270 (other than the utility sensor processor) are together referred to as a 'control processor' in this example, with the battery tracking controller providing system status updates, and with communications between the agents being managed to support such a multi-agent architecture. The tomograph of Agent2 may be used to track dynamic changes in the battery state and generate corresponding modeled state information as described elsewhere herein, such as by obtaining and using sensor information in a manner analogous to using a non-destructive x-ray to obtain information about internal physical structure of a physical object of interest. In addition, an external entity 1280 (e.g., the utility providing or managing the external electrical grid) is providing monitoring and synchronization signals in this example to the battery tracking controller 240, such as coordinate the power being used and/or provided via numerous such home power systems and/or other customers.

While the example of FIG. 12B involves use of the battery 210 in a solar panel system, it will be appreciated that batteries may be charged and/or discharged in a variety of types of environments and systems, and similar activities of a corresponding CDI agent may be used to control such activities in the manner described herein.

FIG. 12A is a block diagram illustrating example components of an embodiment of a system 1200 that performs automated control of DC power from multiple batteries in a coordinated manner, such as in a real-time manner and to optimize long-term operation of the batteries. In particular, the system 1200 of FIG. 12A has some similarities to that of FIG. 12B, but illustrates an example architecture of a system to support coordinated control of large numbers of batteries and associated systems (e.g., over one million such batteries and associated systems in this example, such as to correspond to one or more regions, states, countries, etc.). In particular, in the illustrated example, various batteries and associated systems 1205 (e.g., home power systems with solar panels) having on-site battery tracking controllers are illustrated, along with one or more utilities 1285 that provide power requests for the batteries and associated systems 1205, and one or more entities 1290 serving as system administration to manage a distributed control system 1275 for the batteries and associated systems 1205. While separate tomograph components are not illustrated in this example embodiment, they may operate as part of, for example, one or more other components such as the CDI Agents in the clusters.

In this example, the distributed control system 1275 is implemented in a centralized manner in a network-accessible location, such as via an online computing environment (e.g., Microsoft Azure), although it may be implemented in other manners in other embodiments. The distributed control system 1275 includes one or more components to interface with and interact with the utilities 1285, one or more components to interface with and interact with the batteries and associated systems 1205, and one or more monitoring and/or configuration components with which the system administration entities 1290 may interact to monitor and/or control the distributed control system 1275. In addition, the various CDI agents that support the batteries and associated systems 1205 (e.g., with one CDI agent per battery pack and associated system) are executed in the network-accessible location and are clustered together, with various inter-cluster communication mechanisms used (e.g., a publish/subscribe system with various topics, a communication service bus between at least some CDI agents and/or clusters, etc.). The clusters may be formed in various manners in various embodiments, such as to group CDI agents based on having associated batteries and systems that share one or more characteristics, such as geographical location (e.g., being part of the system electrical grid substation area) and/or operating characteristics. In addition, the clusters may be used to coordinate the CDI agents in stages and/or tiers, such as to first coordinate the CDI agents within a cluster, then coordinate between two or more clusters, etc., and optionally with multiple tiers of clusters (e.g., structured in a hierarchical manner). Various additional components may be provided and used as part of the distributed control system 1275, such as a site management system to manage changes in CDI agents and/or batteries and associated systems (e.g., to add new CDI agents for new battery systems and/or to remove existing CDI agents for existing battery systems being removed from system 1275 management; to add new CDI agents to particular clusters and/or to remove existing CDI agents from clusters; to create, remove and modify clusters; etc.), storage services available from the network-accessible location to store and exchange state information and other information being used, resource management services available from the network-accessible location to manage computing resources provided by the network-accessible location, etc.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
receiving, by one or more configured computing systems, a set of binary rules that model operation of a specified type of physical system having multiple sensors and one or more controls and one or more outputs, wherein each sensor measures at least one type of state information related to the operation of the specified type of physical system, wherein each control is manipulatable to modify at least one output of the specified type of physical system, and wherein the binary rules specify conditions involving state information to be evaluated to reach true or false values for resulting control actions that manipulate the one or more controls;
obtaining, by the one or more configured computing systems, data that describes actual operation of a target physical system of the specified type over a period of time, the data including, for each of multiple times during the period of time, information about values of the sensors at the time for the target physical system and of one or more control actions performed to manipulate the controls for the target physical system for the time and of the outputs from the target physical system resulting from the one or more control actions for the time;
generating, by the one or more configured computing systems and from the obtained data, a data model representing the actual operation of the target physical system;
automatically learning, by the one or more configured computing systems and from the generated data model, one or more soft rules that further model the actual operation of the target physical system, wherein each soft rule specifies one or more additional conditions to be evaluated to reach one of multiple possible values, wherein the multiple possible values represent probabilistic values, wherein the one possible value has an associated likelihood, and wherein the learning includes:
querying the data model to obtain results from the actual operation of the target physical system in specified situations in which one or more sensors of the target physical system have each of multiple values;
determining differences between the results obtained from the querying of the data model and expected results of the specified situations from the set of binary rules; and
constructing the one or more soft rules to represent the determined differences; and
providing, by the one or more configured computing systems, information about the learned one or more soft rules, for use in further control of the target physical system.

2. The computer-implemented method of claim 1 further comprising:
obtaining, by a collaborative distributed decision system executing on the one or more configured computing systems, sensor information that identifies current state information for at least one sensor of the target physical system;
creating, by the collaborative distributed decision system, a model describing a current state of the target physical system that includes coupled differential equations from at least the binary rules and the obtained sensor information and a goal specified for the specified type of physical system;
performing, by the collaborative distributed decision system and based on the created model, a piecewise linear analysis of the coupled differential equations to identify at least one control action that manipulates at least one control of the target physical system and that provides a solution for the goal; and
initiating performance of the at least one control action in the target physical system to manipulate the at least one control and to cause resulting changes in at least one output of the target physical system.

3. The computer-implemented method of claim 2 wherein the target physical system includes a battery with at least electrical load and at least one electrical source, wherein the controls include providing instructions to cause supplying a specified amount of energy from the battery or receiving a specified amount of energy by the battery, wherein the outputs include the energy being provided to or from the battery, and wherein the specified goal for the specified type of physical system is to maximize life of the battery while supplying energy from the battery according to indicated criteria.

4. The computer-implemented method of claim 2 wherein the target physical system includes a building with multiple rooms and with one or more temperature control units to perform at least one of heating and cooling the rooms of the building, wherein the controls include providing instructions to cause supplying a specified amount of the at least one of heating and cooling from the temperature control units, wherein the outputs include the at least one of heating and cooling being supplied from the temperature control units, and wherein the specified goal for the specified type of physical system is to minimize an amount of energy used by the temperature control units to perform the at least one of heating and cooling for the rooms of the building according to indicated criteria.

5. The computer-implemented method of claim 2 wherein the providing of the information about the learned one or more soft rules includes automatically updating, by the collaborative distributed decision system, the created model to include representations of the learned one or more soft rules, and using the updated created model to determine and perform one or more additional control actions in the target physical system.

6. The computer-implemented method of claim 5 wherein the creating of the model is performed before the obtaining of the data and is further based in part on one or more initial soft rules received to model the operation of the specified type of physical system, wherein one or more structural modifications to the target physical system occur between the creating of the model and the obtaining of the data, wherein the automatic learning of the one or more soft rules include learning at least one additional soft rule related to the one or more modifications, and wherein the automatic updating of the created model includes adapting the created model to represent the one or more structural modifications.

7. The computer-implemented method of claim 1 wherein the receiving of the set of binary rules includes receiving, by the one or more configured computing systems, the set of binary rules from a user who is building a model of the target physical system, and wherein the providing of the information about the learned one or more soft rules includes providing the information to the user for use in further building of the model of the target physical system.

8. The computer-implemented method of claim 1 wherein the learning of the one or more soft rules further includes:
   generating, by the one or more configured computing systems, a total Hamiltonian function that expresses the results obtained from the querying of the data model; and
   generating, by the one or more configured computing systems and based at least in part on the binary rules, a binary rule-based Hamiltonian function that expresses a rule-based model of the specified type of physical system,
   and wherein the determining of the differences includes generating, by the one or more configured computing systems, a soft rule-based Hamiltonian function that represents differences between the total Hamiltonian function and the binary rule-based Hamiltonian function, and wherein the constructing of the one or more soft rules includes performing, by the one or more configured computing systems, a natural logarithm of the soft rule-based Hamiltonian function.

9. The computer-implemented method of claim 8 wherein the determining of the differences further includes approximating, by the one or more configured computing systems, the soft rule-based Hamiltonian function by determining at least one of one or more splines or one or more piecewise polynomial functions to represent the soft rule-based Hamiltonian function.

10. The computer-implemented method of claim 1 wherein the obtaining of the data further includes obtaining, for each of multiple additional times during the period of time, additional information about values of the sensors at the additional time for the target physical system and of the outputs from the target physical system for the additional time, and wherein the generating of the obtained data is further based in part on the obtained additional information.

11. The computer-implemented method of claim 1 wherein the learning of the one or more soft rules further includes:
   determining that the results obtained from the querying of the data model do not provide enough information to satisfy a threshold for the associated likelihoods of the one or more soft rules; and
   performing further querying of the data model to obtain additional results from the actual operation of the target physical system until the additional results provide enough information to satisfy the threshold for the associated likelihoods of the one or more soft rules, and wherein the determined differences further include differences between the additional results from the data model and additional expected results from the set of binary rules.

12. The computer-implemented method of claim 1 wherein the learning of the one or more soft rules further includes:
   before the querying of the data model to obtain the results, performing other querying of the data model to obtain initial results from the actual operation of the target physical system in other specified situations in which the one or more sensors of the target physical system have each of multiple other values;
   determining that the results obtained from the querying of the data model provide new information relative to the initial results that satisfy a threshold; and
   performing further querying of the data model to obtain additional results from the actual operation of the target physical system until the additional results do not provide enough new information relative to prior results to satisfy the threshold,
   and wherein the determined differences further include differences between the additional results from the data model and additional expected results from the set of binary rules.

13. The computer-implemented method of claim 1 further comprising:
   obtaining, by the one or more configured computing systems, second data that describes actual operation of a second target physical system of the specified type over a second period of time, the data including, for each of multiple times during the second period of time, information about values of the sensors at the time for the second target physical system and of one or more control actions performed to manipulate the controls for the second target physical system for the time and of the outputs from the second target physical system resulting from the one or more control actions for the time;
   generating, by the one or more configured computing systems and from the obtained data, a second data model representing the actual operation of the second target physical system;
   automatically learning, by the one or more configured computing systems and from the generated second data model, one or more second soft rules that further model the actual operation of the second target physical system, wherein the one or more second soft rules differ from the learned one or more soft rules for the target physical system to reflect differences between the target physical system and the second target physical system; and
   providing, by the one or more configured computing systems, information about the learned one or more second soft rules, for use in further control of the second target physical system.

14. The computer-implemented method of claim 1 wherein the binary rules of the set include one or more absolute rules that specify non-modifiable restrictions that are requirements regarding the operation of the specified type of physical system, and further include one or more hard rules that specify restrictions regarding the operation of the specified type of physical system that can be modified in specified situations.

15. A non-transitory computer-readable medium having stored contents that cause one or more computing systems to perform operations, the operations comprising:

receiving, by the one or more computing systems, binary rules that model operation of a target system having sensors and one or more controls and one or more outputs, wherein the sensors measure information about a physical state of elements of the target system, wherein at least one control is manipulatable to modify at least one output of the target system, and wherein the binary rules specify conditions involving state information to be evaluated to reach true or false values for resulting control actions that manipulate the one or more controls;

obtaining, by the one or more computing systems, data that describes the operation of the target system over a period of time, the data including, for each of multiple times during the period of time, information about sensor values at the time for the target system and of one or more control actions that manipulate the controls for the target system for the time and of one or more outputs from the target system for the time;

automatically learning, by the one or more computing systems and from the obtained data, one or more soft rules that further model the operation of the target system, wherein each soft rule specifies one or more additional conditions to be evaluated to reach possible values, wherein the possible values represent probabilistic values and have an associated likelihood, and wherein the learning includes:

performing queries to obtain results from the obtained data about the operation of the target system in specified situations in which one or more sensors of the target system have each of multiple values;

determining differences between the results obtained from the queries and expected results of the specified situations from the binary rules; and constructing the one or more soft rules to represent the determined differences; and providing, by the one or more computing systems, information about the learned one or more soft rules, for use in further control of the target system.

16. The non-transitory computer-readable medium of claim 15 wherein the stored contents include software instructions that, when executed, further cause the one or more computing systems to perform additional operations comprising:

obtaining sensor information that identifies state information for at least one sensor of the target system;

creating a model describing a state of the target system that includes coupled differential equations from at least the binary rules and the obtained sensor information and a goal specified for the target system;

performing, based on the created model, a piecewise linear analysis of the coupled differential equations to identify at least one control action that manipulates at least one control of the target system and that provides a solution for the goal; and initiating performance of the at least one control action in the target system to manipulate the at least one control and to cause resulting changes in at least one output of the target system.

17. The non-transitory computer-readable medium of claim 16 wherein the target system is a physical system of a specified type, wherein the received binary rules are further to model operation of the specified type of physical system, and wherein the providing of the information about the learned one or more soft rules includes automatically updating the created model to include representations of the learned one or more soft rules, and using the updated created model to determine and perform one or more additional control actions in the target system.

18. The non-transitory computer-readable medium of claim 15 wherein the learning of the one or more soft rules further includes:

generating a total Hamiltonian function that expresses the results obtained from the queries; and generating, based at least in part on the binary rules, a binary rule-based Hamiltonian function that expresses a rule-based model of the target system, and wherein the determining of the differences includes generating a soft rule-based Hamiltonian function that represents differences between the total Hamiltonian function and the binary rule-based Hamiltonian function.

19. The non-transitory computer-readable medium of claim 15 wherein the learning of the one or more soft rules further includes:

determining that the results obtained from the queries do not provide enough information to satisfy a threshold for the associated likelihoods of the one or more soft rules; and performing further queries to obtain additional results from the obtained data until the additional results provide enough information to satisfy the threshold for the associated likelihoods of the one or more soft rules, and wherein the determined differences further include differences between the additional results from the queries and additional expected results from the binary rules.

20. The non-transitory computer-readable medium of claim 15 wherein the learning of the one or more soft rules further includes:

before the performing of the queries to obtain the results, performing other queries to obtain initial results from the obtained data about the operation of the target system in other specified situations in which the one or more sensors of the target system have each of multiple other values;

determining that the results obtained from the queries provide new information relative to the initial results sufficient to satisfy a threshold; and performing further queries to obtain additional results from the obtained data about the operation of the target system until the additional results do not provide enough new information relative to prior results to satisfy the threshold, and wherein the determined differences further include differences between the additional results from the further queries and additional expected results from the binary rules.

21. A system comprising:

one or more hardware processors of one or more computing systems; and one or more memories storing instructions that, when executed by at least one of the one or more hardware processors, cause the system to implement an automated control system for a target system, by:

receiving binary rules that model operation of a target system having sensors and one or more controls and one or more outputs, wherein the sensors measure state information related to the target system, wherein at least one control is manipulatable to modify at least one output of the target system, and wherein the binary rules specify conditions involving the state information to be evaluated to reach true or false values for resulting control actions that manipulate the one or more controls;

creating an initial model based on the binary rules that describes the target system and includes coupled differential equations from the binary rules and obtained sensor information and a goal specified for the target system;

using the created initial model to control the operation of the target system for multiple times during a period of time and obtaining data that describes the controlled operation, wherein controlling the operation of the target system includes performing piecewise linear analysis of the coupled differential equations for each of the multiple times to identify at least one control action to perform for the time that manipulates at least one control of the target system and that provides a solution for the goal, and wherein the obtained data includes information about sensor values and about control actions that manipulate the controls for the target system and about outputs from the target system;

automatically learning, from the obtained data, one or more soft rules that further model the operation of the target system, wherein each soft rule specifies one or more additional conditions to be evaluated to reach possible values, wherein the possible values represent probabilistic values and have an associated likelihood, and wherein the learning includes:

performing queries to obtain results from the obtained data about the operation of the target system in specified situations in which one or more sensors of the target system have each of multiple values;

determining differences between the results obtained from the queries and expected results of the specified situations from the created initial model; and constructing the one or more soft rules to represent the determined differences; and providing information about the learned one or more soft rules, for use in further control of the target system.

22. The system of claim 21 wherein the providing of the information about the learned one or more soft rules includes automatically updating the created initial model to include representations of the learned one or more soft rules, and using the updated created model to determine and perform one or more additional control actions in the target system.

23. The system of claim 21 wherein the target system is a physical system of a specified type, wherein the received binary rules are further to model operation of the specified type of physical system, and wherein the learning of the one or more soft rules further includes:

generating a total Hamiltonian function that expresses the results obtained from the queries; and generating, based at least in part on the binary rules, a rule-based Hamiltonian function that expresses the created initial model, and wherein the determining of the differences includes generating a soft rule-based Hamiltonian function that represents differences between the total Hamiltonian function and the rule-based Hamiltonian function.

24. The system of claim 21 wherein the learning of the one or more soft rules further includes:

determining that the results obtained from the queries do not provide enough information to satisfy a threshold for the associated likelihoods of the one or more soft rules; and performing further queries to obtain additional results from the obtained data until the additional results provide enough information to satisfy the threshold for the associated likelihoods of the one or more soft rules, and wherein the determined differences further include differences between the additional results from the queries and additional expected results from the binary rules.

25. The system of claim 21 wherein the learning of the one or more soft rules further includes:

before the performing of the queries to obtain the results, performing other queries to obtain initial results from the obtained data about the operation of the target system in other specified situations in which the one or more sensors of the target system have each of multiple other values;

determining that the results obtained from the queries provide new information relative to the initial results sufficient to satisfy a threshold; and performing further queries to obtain additional results from the obtained data about the operation of the target system until the additional results do not provide enough new information relative to prior results to satisfy the threshold, and wherein the determined differences further include differences between the additional results from the further queries and additional expected results from the binary rules.

* * * * *